(12) United States Patent
Sylvia

(10) Patent No.: US 11,739,516 B2
(45) Date of Patent: Aug. 29, 2023

(54) TOILET SEAT ASSEMBLY

(71) Applicant: Bemis Manufacturing Company, Sheboygan Falls, WI (US)

(72) Inventor: Jacqueline Sylvia, Dartmouth, MA (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 603 days.

(21) Appl. No.: 16/681,041

(22) Filed: Nov. 12, 2019

(65) Prior Publication Data

US 2021/0017753 A1 Jan. 21, 2021

Related U.S. Application Data

(63) Continuation-in-part of application No. 16/511,882, filed on Jul. 15, 2019, now Pat. No. 11,445,869.

(51) Int. Cl.
| | | |
|---|---|---|
| *E03D 9/08* | (2006.01) | |
| *G05D 9/02* | (2006.01) | |
| *G05D 23/27* | (2006.01) | |
| *G05D 23/19* | (2006.01) | |

(52) U.S. Cl.
CPC ............... *E03D 9/085* (2013.01); *G05D 9/02* (2013.01); *G05D 23/1917* (2013.01); *G05D 23/27* (2013.01)

(58) Field of Classification Search
CPC ...... E03D 9/085; G05D 9/02; G05D 23/1917; G05D 23/27; A47K 13/302; A47K 13/305
USPC .......................................................... 4/447
See application file for complete search history.

(56) References Cited

U.S. PATENT DOCUMENTS

| | | |
|---|---|---|
| 2,875,450 A | 3/1959 | Umann |
| D198,085 S | 4/1964 | Rich |
| 3,810,260 A | 5/1974 | Lodi |
| 3,995,326 A | 12/1976 | Umann |

(Continued)

FOREIGN PATENT DOCUMENTS

| | | |
|---|---|---|
| EM | 025022450001 | 7/2014 |
| EP | 2138640 | 12/2009 |

(Continued)

OTHER PUBLICATIONS

International Search Report and Written Opinion for International Application No. PCT/US2020/070018 dated Aug. 28, 2020.

(Continued)

*Primary Examiner* — David P Angwin
*Assistant Examiner* — William R Klotz
(74) *Attorney, Agent, or Firm* — Michael Best & Friedrich LLP

(57) ABSTRACT

A toilet seat assembly is provided including a seat base with a housing and a seat lid, and further including a washing apparatus, a drying apparatus, and a spray canister device positioned in the housing. A controller having a user interface is configured to communicate with a control unit of the toilet seat assembly to control operation of the components of the toilet seat assembly. So configured, a user may operate the toilet seat assembly to clean the user's perineal region via the washing apparatus, dry the user's perineal region via the drying apparatus, and spray the user's perineal region with one or more liquid products via the spray canister device.

16 Claims, 38 Drawing Sheets

(56) References Cited

U.S. PATENT DOCUMENTS

| | | | |
|---|---|---|---|
| 4,279,362 A | | 7/1981 | Pursell |
| 4,287,618 A | | 9/1981 | Silver |
| 4,327,560 A | | 5/1982 | Leon |
| D266,758 S | | 11/1982 | Johannsen |
| 4,422,189 A | | 12/1983 | Couvrette |
| D279,184 S | | 6/1985 | Sakamoto |
| 4,595,825 A | * | 6/1986 | Gordbegli ............ F24H 9/2007 392/471 |
| 4,628,548 A | | 12/1986 | Kurosawa |
| D303,966 S | | 10/1989 | Fritzsche |
| 4,903,347 A | | 2/1990 | Garcia |
| 4,987,617 A | | 1/1991 | Furukawa |
| 5,031,252 A | | 7/1991 | Oyama |
| 5,090,067 A | * | 2/1992 | Cogdill ................ E03D 9/085 4/420.4 |
| 5,101,520 A | | 4/1992 | Lockhart |
| 5,201,080 A | | 4/1993 | Tanaka |
| 5,203,037 A | | 4/1993 | Kang |
| 5,247,711 A | | 9/1993 | Kwon |
| 5,272,774 A | | 12/1993 | Ivko |
| 5,335,855 A | | 8/1994 | Borod |
| D355,246 S | | 2/1995 | Kawamura |
| 5,409,167 A | | 4/1995 | Borod |
| D367,922 S | | 3/1996 | Kobayashi |
| 5,504,948 A | | 4/1996 | Chandler |
| 5,551,098 A | | 9/1996 | Wilk |
| 5,566,402 A | | 10/1996 | Agha el-Rifai |
| 5,630,234 A | | 5/1997 | Childs |
| D387,851 S | | 12/1997 | Pieters |
| 5,720,054 A | | 2/1998 | Nakayama |
| 5,765,238 A | | 6/1998 | Furukawa |
| 5,813,060 A | | 9/1998 | Klopocinski |
| 5,864,894 A | | 2/1999 | Fedele |
| 5,898,956 A | | 5/1999 | Kurisaki |
| 5,911,516 A | | 6/1999 | Chang |
| 5,953,765 A | | 9/1999 | Hayashi |
| 5,987,659 A | | 11/1999 | Cannizzaro |
| 6,003,159 A | | 12/1999 | Sadegh |
| 6,009,570 A | | 1/2000 | Hargest |
| D423,655 S | | 4/2000 | Otte |
| 6,073,275 A | | 6/2000 | Klopocinski |
| 6,105,178 A | | 8/2000 | Kurisaki |
| D432,220 S | | 10/2000 | Hulsebus |
| D435,638 S | | 12/2000 | Merry |
| 6,167,577 B1 | | 1/2001 | Hammad |
| 6,178,568 B1 | | 1/2001 | Boulieris |
| 6,192,527 B1 | | 2/2001 | Paul |
| D451,076 S | | 11/2001 | Sommer |
| D451,177 S | | 11/2001 | Scholpp |
| 6,339,852 B1 | | 1/2002 | Huang |
| 6,397,406 B1 | | 6/2002 | Moshkovich |
| 6,430,366 B1 | | 8/2002 | Mizutani |
| 6,449,780 B1 | | 9/2002 | Merry |
| 6,481,590 B1 | | 11/2002 | Simkins |
| D471,966 S | | 3/2003 | Kazuya |
| 6,618,864 B2 | * | 9/2003 | Veal ...................... A47K 13/10 4/313 |
| D481,016 S | | 10/2003 | Hillis |
| D485,337 S | | 1/2004 | Tani |
| 6,688,500 B1 | | 2/2004 | Cheng |
| 6,754,912 B1 | | 6/2004 | Hayashi |
| D500,130 S | | 12/2004 | Jung |
| D508,733 S | | 8/2005 | Peng |
| D512,425 S | | 12/2005 | Satoshi |
| 6,973,679 B1 | | 12/2005 | Schad |
| 7,096,518 B2 | | 8/2006 | Takenaga |
| D528,991 S | | 9/2006 | Katsuyama |
| 7,120,946 B1 | | 10/2006 | Lazar |
| 7,127,750 B2 | | 10/2006 | Lim |
| D533,788 S | | 12/2006 | Kleiman |
| 7,155,755 B2 | | 1/2007 | Olivier |
| D538,907 S | | 3/2007 | Kaule |
| 7,191,473 B2 | | 3/2007 | Matsumoto |
| D541,225 S | | 4/2007 | Katsuyama |
| 7,216,374 B2 | | 5/2007 | Hassan |
| 7,284,285 B2 | | 10/2007 | Scalzi |
| 7,287,286 B2 | | 10/2007 | Lee |
| D554,613 S | | 11/2007 | Takeshi |
| D558,181 S | | 12/2007 | Takada |
| D564,976 S | | 3/2008 | Duncan |
| D565,554 S | | 4/2008 | Fan |
| D578,515 S | | 10/2008 | Ikeda et al. |
| D579,342 S | | 10/2008 | Paul |
| D583,030 S | | 12/2008 | Kobayashi |
| D594,537 S | | 6/2009 | Driedger |
| D594,945 S | | 6/2009 | Nakasaki et al. |
| 7,543,339 B1 | | 6/2009 | Harris |
| D608,426 S | | 1/2010 | Hiroaki |
| D616,445 S | | 5/2010 | Wong et al. |
| D634,735 S | | 3/2011 | Maier |
| D639,399 S | | 6/2011 | Takeuchi |
| D639,400 S | | 6/2011 | Kang |
| 7,954,181 B2 | | 6/2011 | Lim |
| 8,060,953 B1 | | 11/2011 | Dorra |
| 8,065,755 B2 | | 11/2011 | Chen |
| D654,808 S | | 2/2012 | Gidlow |
| 8,161,580 B2 | | 4/2012 | Hashidume |
| 8,261,377 B2 | | 9/2012 | Oh |
| D668,642 S | | 10/2012 | Feldman et al. |
| 8,291,527 B2 | | 10/2012 | Pan |
| D670,659 S | | 11/2012 | Yuji |
| D671,935 S | | 12/2012 | Mao |
| 8,365,317 B1 | | 2/2013 | Dorra |
| 8,425,475 B2 | | 4/2013 | Sodo |
| D682,246 S | | 5/2013 | Boqueho |
| D688,359 S | | 8/2013 | Ogata et al. |
| D692,417 S | | 10/2013 | Tu |
| D692,541 S | | 10/2013 | Hosoi et al. |
| D698,754 S | | 2/2014 | Bertrand |
| D703,797 S | | 4/2014 | Shinozaki |
| D704,316 S | | 5/2014 | Yuji |
| D704,317 S | | 5/2014 | Yoshihiko |
| D706,402 S | | 6/2014 | Yeung |
| D708,954 S | | 7/2014 | Barnes |
| 8,776,278 B1 | | 7/2014 | Dorra |
| D713,815 S | | 9/2014 | Ookawa |
| D715,774 S | | 10/2014 | Lee et al. |
| D716,768 S | | 11/2014 | Ki-Soo |
| D717,930 S | | 11/2014 | Kergoet |
| 8,904,575 B1 | | 12/2014 | Lindheimer |
| D724,058 S | | 3/2015 | Chandel |
| D724,059 S | | 3/2015 | Kim |
| D750,765 S | | 3/2016 | Giametta |
| 9,273,454 B2 | | 3/2016 | Slawinski |
| 9,279,241 B2 | | 3/2016 | Morioka |
| D753,095 S | | 4/2016 | Evangeline |
| 9,464,425 B2 | | 10/2016 | Bailey |
| D781,808 S | | 3/2017 | Pista |
| D792,867 S | | 7/2017 | Patrick |
| D805,615 S | | 12/2017 | Shao-Yu |
| 9,889,982 B2 | | 2/2018 | Falcon |
| 10,907,334 B2 | * | 2/2021 | Yaoka ...................... A47K 7/08 |
| 2003/0140407 A1 | | 7/2003 | Matsumoto |
| 2004/0050959 A1 | | 3/2004 | Mazooji |
| 2004/0055080 A1 | | 3/2004 | Marshall |
| 2005/0000006 A1 | | 1/2005 | Takenaga |
| 2005/0010997 A1 | | 1/2005 | Olivier |
| 2006/0000012 A1 | | 1/2006 | Schad |
| 2006/0047055 A1 | | 3/2006 | Agostini |
| 2006/0207002 A1 | | 9/2006 | Bradshaw |
| 2006/0265801 A1 | | 11/2006 | Riccobon |
| 2007/0241929 A1 | | 10/2007 | Marchetto |
| 2008/0055394 A1 | | 3/2008 | Shiue |
| 2008/0201837 A1 | | 8/2008 | Oh |
| 2008/0251551 A1 | | 10/2008 | Huber |
| 2009/0126100 A1 | * | 5/2009 | Kenoyer ................ F24H 1/54 29/428 |
| 2009/0313752 A1 | | 12/2009 | Kunimoto |
| 2010/0012685 A1 | | 1/2010 | Ramsey |
| 2010/0152475 A1 | | 6/2010 | Raichle |
| 2010/0176224 A1 | | 7/2010 | Hasselschwert |
| 2011/0113540 A1 | | 5/2011 | Plate |
| 2011/0132929 A1 | | 6/2011 | Bennett |

(56) References Cited

U.S. PATENT DOCUMENTS

| | | | |
|---|---|---|---|
| 2011/0186154 A1* | 8/2011 | Klicpera | B67D 7/08 137/551 |
| 2011/0191950 A1 | 8/2011 | Liu | |
| 2011/0203044 A1 | 8/2011 | Lim | |
| 2012/0005817 A1 | 1/2012 | Jeong | |
| 2012/0011647 A1 | 1/2012 | Mochita | |
| 2012/0017367 A1* | 1/2012 | Reeder | E03C 1/057 4/597 |
| 2012/0150148 A1 | 6/2012 | Shi | |
| 2012/0180785 A1 | 7/2012 | Trill | |
| 2012/0218106 A1 | 8/2012 | Zaima | |
| 2012/0266483 A1 | 10/2012 | Palermo | |
| 2013/0133131 A1 | 5/2013 | Peng | |
| 2013/0267890 A1 | 10/2013 | Li | |
| 2014/0042195 A1 | 2/2014 | Geis | |
| 2014/0047626 A1 | 2/2014 | Dorra | |
| 2014/0068862 A1 | 3/2014 | Al-Jafar | |
| 2014/0107409 A1 | 4/2014 | Bailey | |
| 2014/0373263 A1 | 12/2014 | Plate | |
| 2015/0000025 A1 | 1/2015 | Clements | |
| 2015/0059076 A1 | 3/2015 | Tiagai | |
| 2015/0203279 A1 | 7/2015 | Falcon | |
| 2015/0225167 A1 | 8/2015 | Andersen | |
| 2015/0337525 A1 | 11/2015 | Bailey | |
| 2015/0354190 A1 | 12/2015 | Willers | |
| 2016/0010319 A1 | 1/2016 | Willers | |
| 2016/0316978 A1 | 11/2016 | Peng | |
| 2017/0021116 A1 | 1/2017 | Rahmel | |
| 2017/0101838 A1 | 4/2017 | Razvi | |
| 2017/0142306 A1 | 5/2017 | Peng | |
| 2017/0265624 A1 | 9/2017 | Wilson | |
| 2017/0319794 A1 | 11/2017 | Schwab | |
| 2017/0321406 A1 | 11/2017 | Schwab | |
| 2017/0321407 A1 | 11/2017 | Schwab | |
| 2017/0321408 A1 | 11/2017 | Schwab | |
| 2018/0015238 A1 | 1/2018 | Schwab | |
| 2018/0028797 A1 | 2/2018 | Schwab | |
| 2018/0036473 A1 | 2/2018 | Schwab | |
| 2018/0044903 A1 | 2/2018 | Schwab | |
| 2019/0186116 A1 | 6/2019 | Schwab | |

FOREIGN PATENT DOCUMENTS

| | | |
|---|---|---|
| IN | 2689190001 | 10/2015 |
| JP | H0893034 | 4/1996 |
| JP | H0988165 | 3/1997 |
| JP | H1163666 | 3/1999 |
| JP | 2001279778 | 10/2001 |
| JP | 2010084344 | 4/2010 |
| KR | 20030064724 | 8/2003 |
| KR | 100786217 | 12/2007 |
| KR | 1020090127708 | 12/2009 |
| KR | 1020120083971 | 7/2012 |
| KR | 1020120006514 | 9/2012 |
| KR | 101320587 | 10/2013 |
| WO | 2008024005 | 2/2008 |
| WO | 2013020240 | 2/2013 |
| WO | 2012044086 | 4/2017 |

OTHER PUBLICATIONS

International Search Report and Written Opinion for International Application No. PCT/US2020/041966 dated Dec. 10, 2020.
U.S. Appl. No. 15/847,594, dated Dec. 19, 2019, Brian Schawb.
Final Office Action for U.S. Appl. No. 15/588,640 dated Dec. 3, 2018.
Kohler, Self-Cleaning Wand, https://www.youtube.com/watch?v=z629hpdnWj8, published Oct. 12, 2016.
PCT Notification of Transmittal of the International Search Report and the Written Opinion of the International Searching Authority, or Declaration, PCT/US2017/031482, filed on May 6, 2017 by Whole Bath, LLC.
PCT Notification of Transmittal of the International Search Report and the Written Opinion of the International Searching Authority, or Declaration, PCT/US2017/031483, filed on May 6, 2017 by Whole Bath, LLC.
PCT Notification of Transmittal of the International Search Report and the Written Opinion of the International Searching Authority, or Declaration; PCT/US2017/031484, filed on May 6, 2017 by Whole Bath, LLC.
PCT Notification of Transmittal of the International Search Report and the Written Opinion of the International Searching Authority, or Declaration; PCT/US2017/031485, filed on May 6, 2017 by Whole Bath, LLC.
PCT Notification of Transmittal of the International Search Report and the Written Opinion of the International Searching Authority, PCT/2017/031484, dated Aug. 14, 2017.
PCT Notification of Transmittal of the International Search Report and the Written Opinion of the International Searching Authority, PCT/US2016/45932, dated Oct. 24, 2016.
PCT Notification of Transmittal of the International Search Report and the Written Opinion of the International Searching Authority, PCT/US2017/042288, dated Sep. 28, 2017.
PCT Notification of Transmittal of the International Search Report and the Written Opinion of the International Searching Authority, PCT/US2017/42253, dated Nov. 21, 2017.
Schwabcare website 2017, http://schwabcare.com/, site visited Jan. 21, 2018.

* cited by examiner

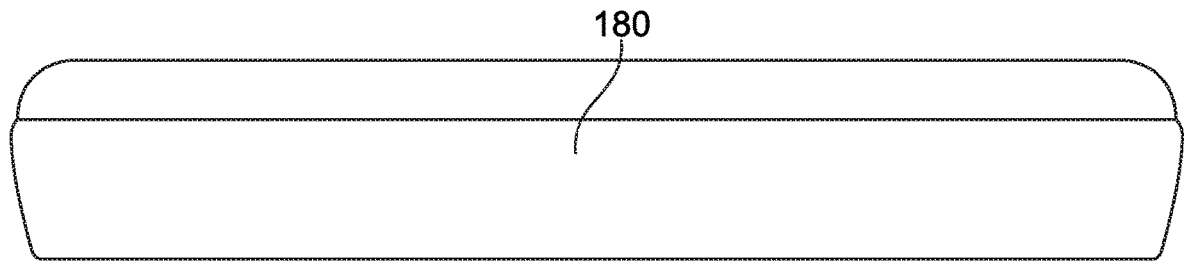
FIG. 23C
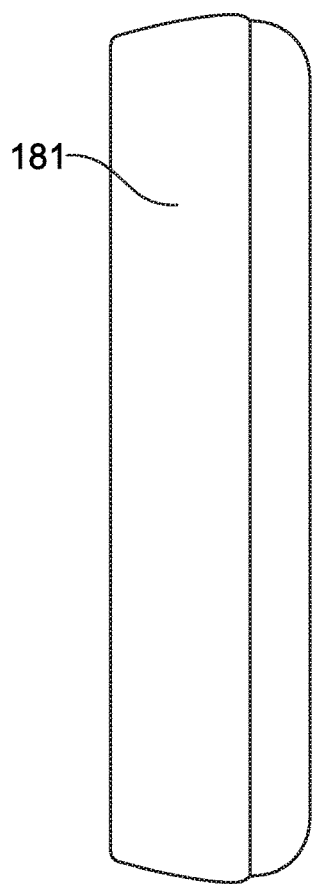    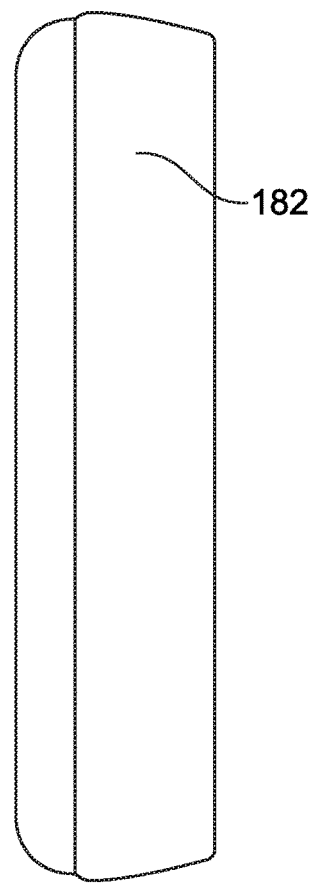
FIG. 23D            FIG. 23E

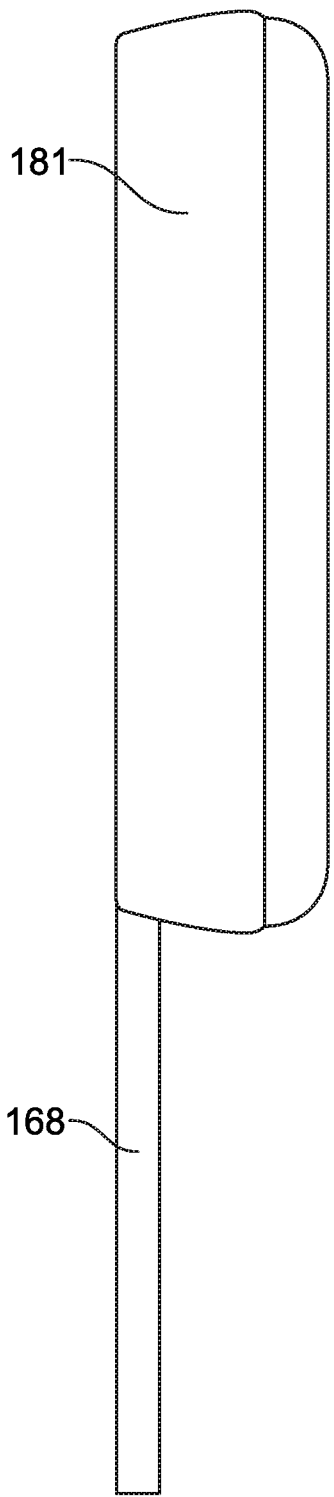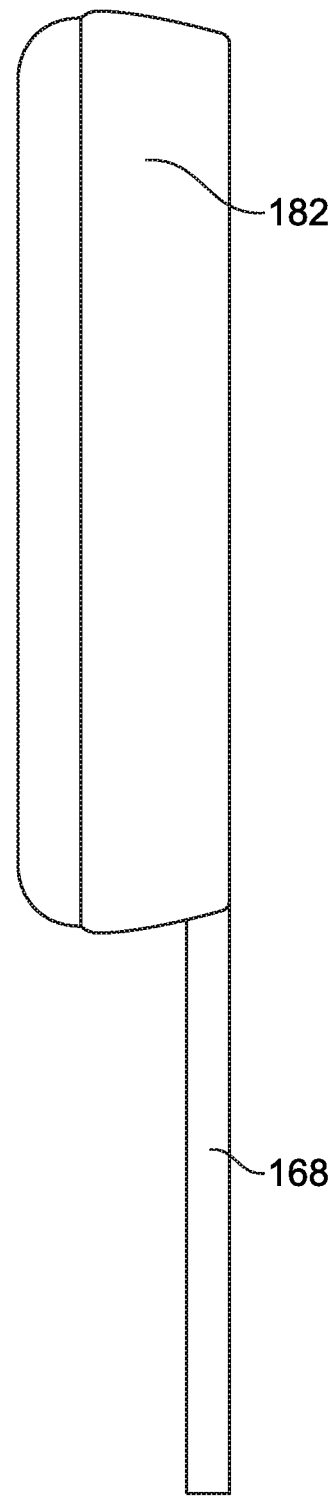
FIG. 23F  FIG. 23G

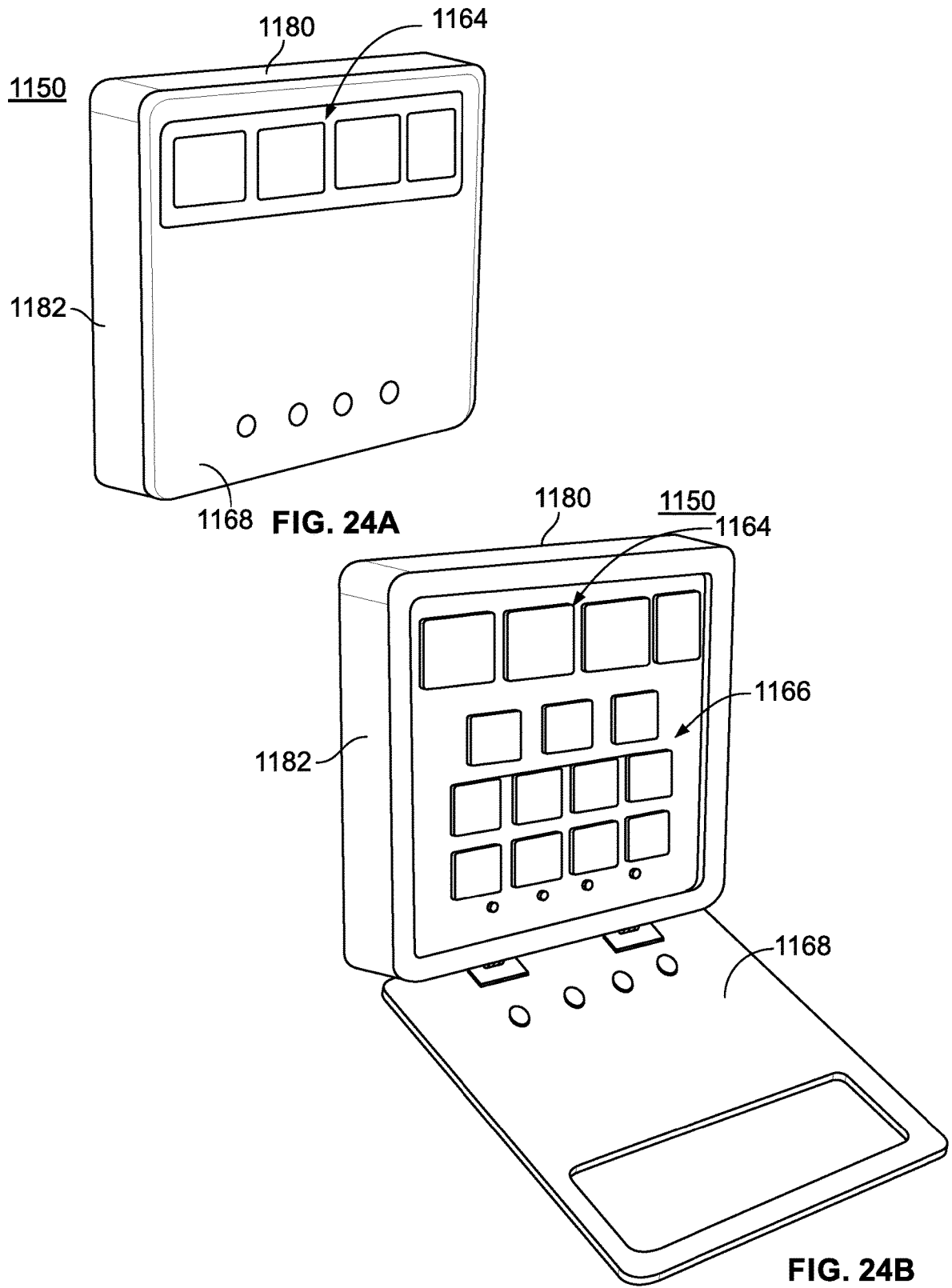

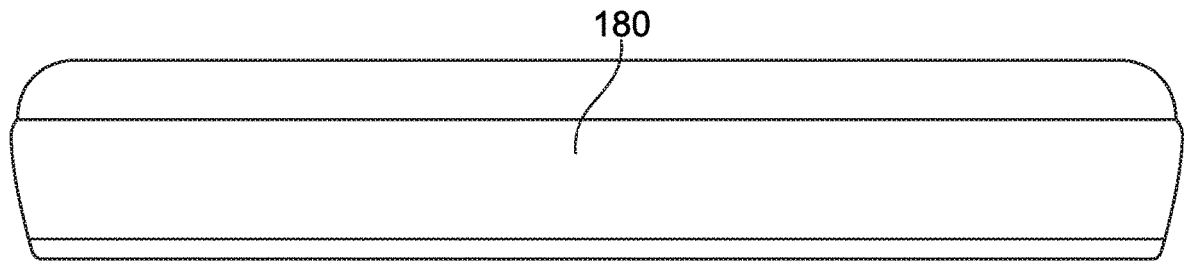
FIG. 24C
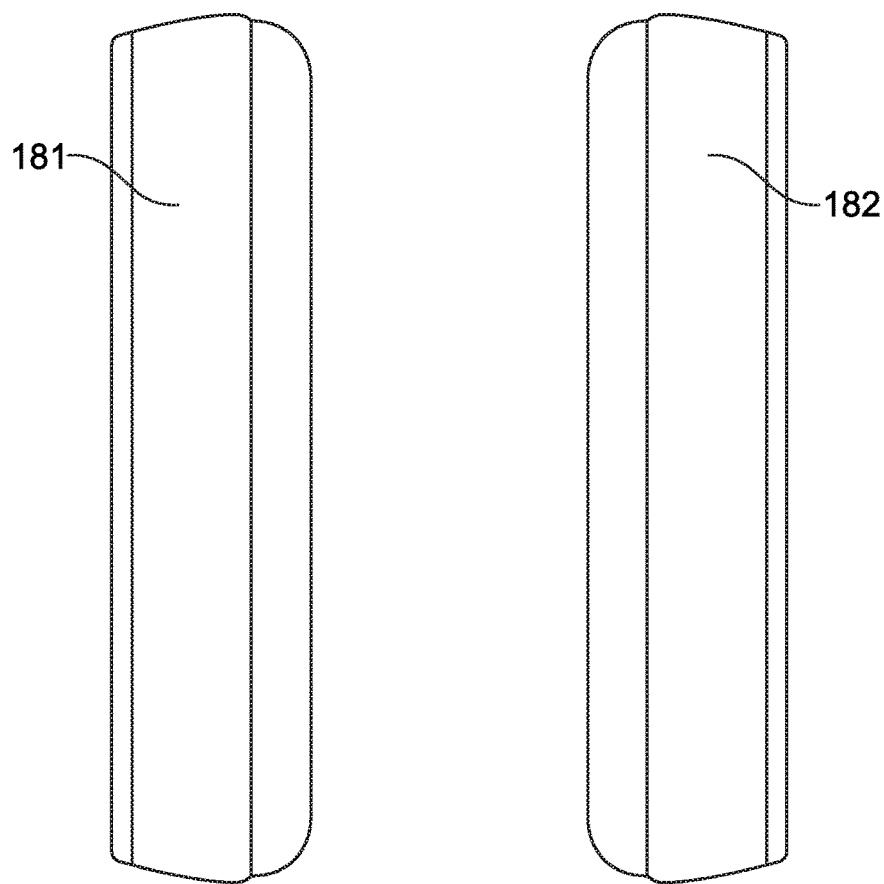
FIG. 24D  FIG. 24E

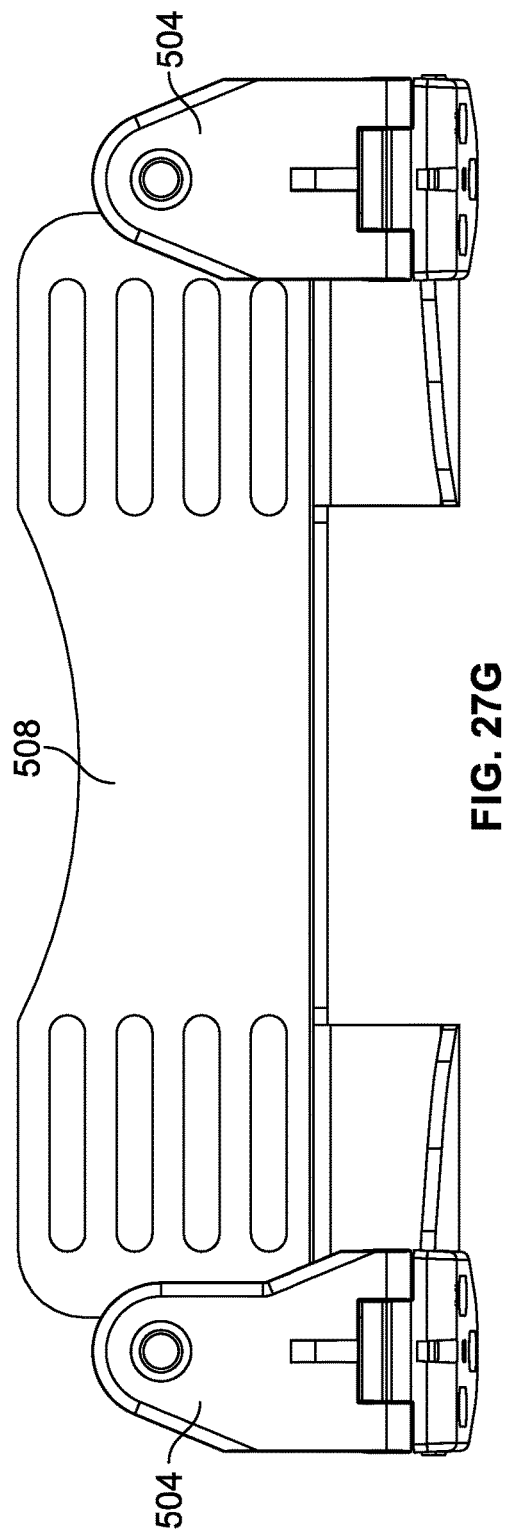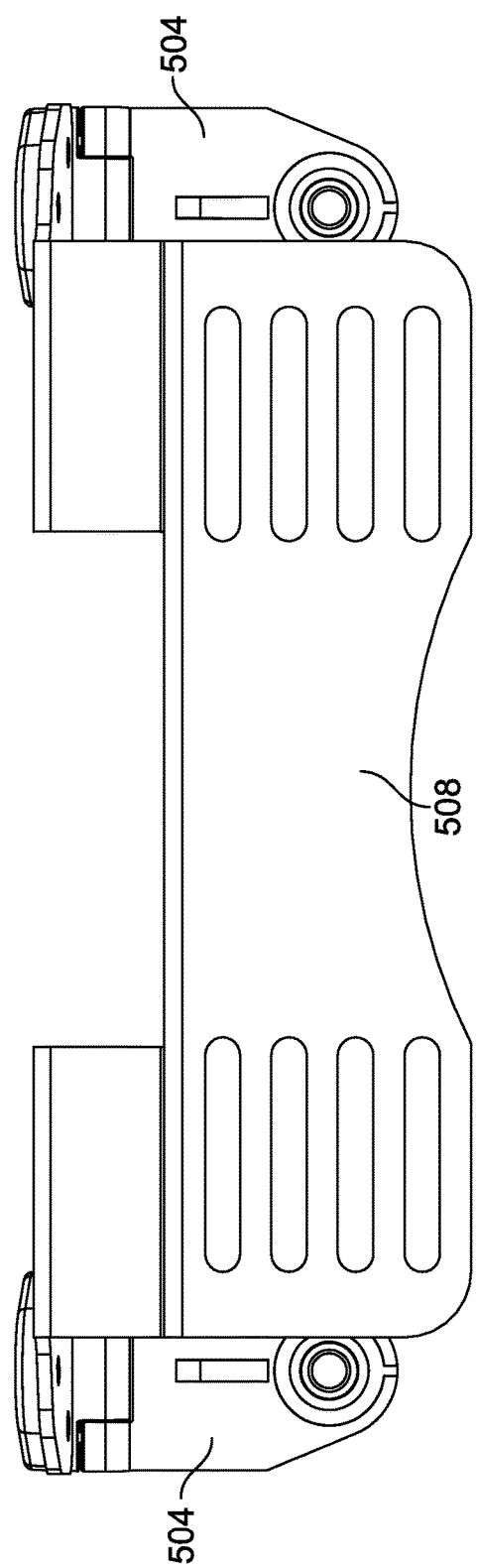

TOILET SEAT ASSEMBLY

RELATED APPLICATIONS

This is a continuation-in-part of U.S. patent application Ser. No. 16/511,882 filed Jul. 15, 2019, entitled TOILET SEAT ASSEMBLY, which is incorporated by reference in its entirety herein.

FIELD

This disclosure relates to a toilet seat assembly, and more specifically, a toilet seat assembly for assisting users with personal hygiene.

BACKGROUND

Toilet seat assemblies, such as those including a water-based toileting system, are known for washing and cleaning the perineal region of a user. Such assemblies are also of interest for medical and assisted living applications for individuals with dexterity or mobility impairments who may not be able to effectively care for themselves and otherwise wash or clean themselves without help. To assist those individuals, toilet seat assemblies may include spray nozzles for delivering water and/or other liquid products to the perineal region of a user to clean the region after urinating or defecating. Thereafter, the perineal region may be dried using a dryer of the toilet seat assembly.

For older individuals who may be less dexterous, operating, servicing, and cleaning the toilet seat assembly may become difficult and burdensome. Additionally, these toilet seat assemblies may be difficult to operate for individuals with early onset dementia, Alzheimer's, or neurodegenerative diseases due to complex operation instructions. Specifically, such individuals may forget how to use the toilet seat assembly if there are too many buttons involved or if too many steps are required. Replacement of cleanser or other medicaments can also become difficult for less dexterous individuals where toilet seat assemblies have complicated instructions for refilling certain liquids or solutions.

In addition, although conventional spray nozzles are designed to extend for spraying the perineal region of the user and to retract thereafter to avoid contact with bodily fluids, various contaminants may still need to be cleaned from the spray nozzle or other portions of the toilet seat assembly over time. However, as discussed above, this can be difficult for less-dexterous individuals who may have difficulty caring for themselves.

It would be beneficial to have a toilet seat assembly that is designed for ease of use and includes components to simplify operation thereof. Additionally, it would be desirable if the toilet seat assembly could disinfect certain portions thereof after a cleaning operation without requiring manual cleaning by the user.

BRIEF DESCRIPTION OF THE DRAWINGS

FIG. 23C is top-side plan view of the controller of FIG. 23A;

FIG. 23D is a right-side elevational view of the controller of FIG. 23A;

FIG. 23E is a left-side elevational view of the controller of FIG. 23A;

FIG. 23F is a view similar to FIG. 23D with the flip cover of the controller in the open position;

FIG. 23G is a view similar to FIG. 23E with the flip cover of the controller in the open position;

FIG. 24A is a perspective view of an alternative embodiment of a controller associated with a toilet seat assembly, the controller including a flip cover;

FIG. 24B is a perspective view of the controller of FIG. 24A with the flip cover in an open position;

FIG. 24C is top-side plan view of the controller of FIG. 24A;

FIG. 24D is a right-side elevational view of the controller of FIG. 24A;

FIG. 24E is a left-side elevational view of the controller of FIG. 24A;

FIG. 27G is a top-side plan view of the bracket assembly of FIG. 27A not including the base plate;

FIG. 27H is a bottom-side plan view of the bracket assembly of FIG. 27A not including the base plate;

DETAILED DESCRIPTION

Figure 1:
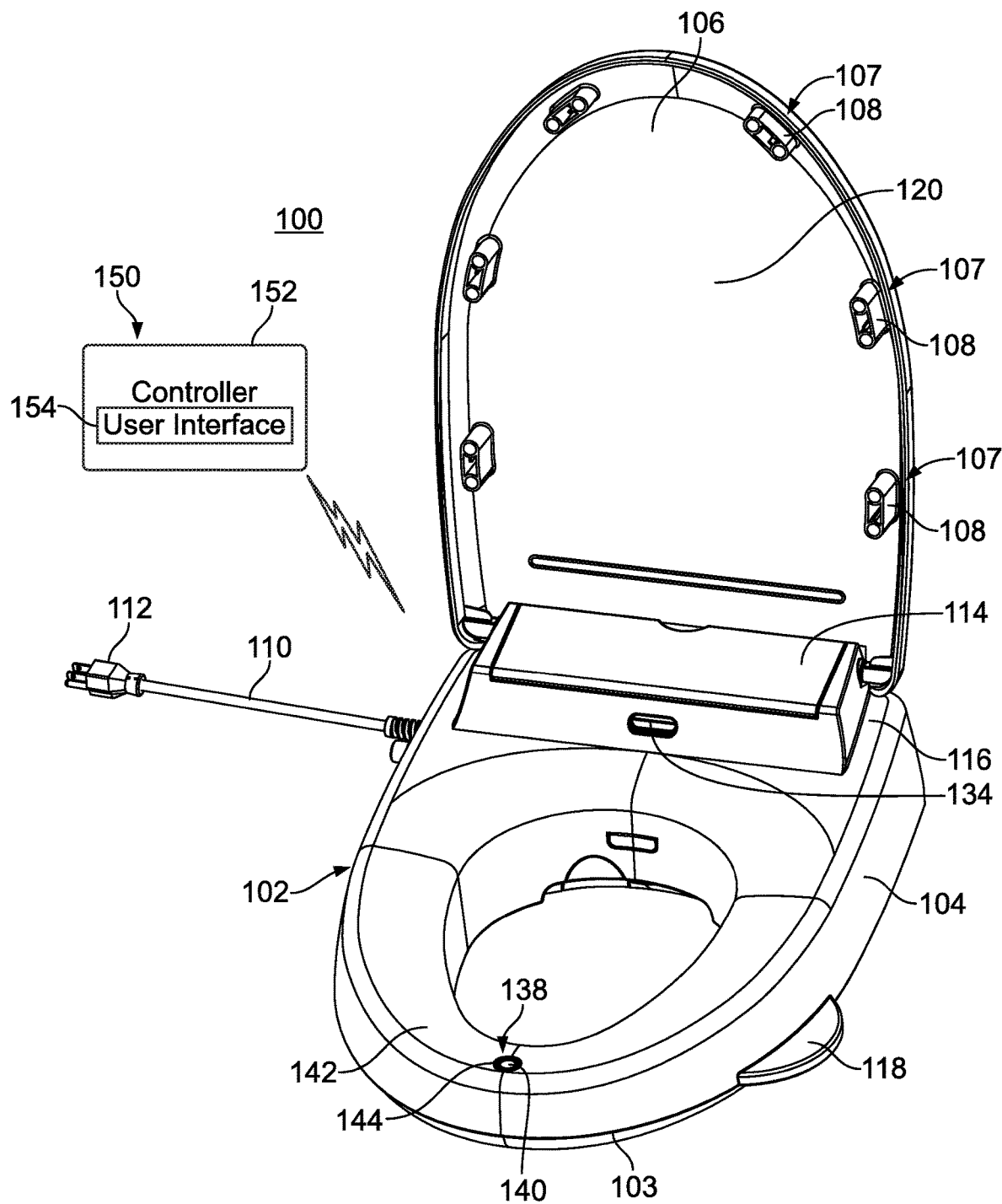
FIG. 1 is a perspective view of an example toilet seat assembly configured to communicate with a controller, the toilet seat assembly having a seat base and a lid.

In accordance with the present disclosure, a toilet seat assembly is provided including a seat base and a seat lid, and further including a washing apparatus, a drying apparatus, and a spray canister device positioned in the seat base. A controller having a user interface is configured to communicate with a control unit of the toilet seat assembly to control operation of the components of the toilet seat assembly, as discussed in further detail below. So configured, a user may operate the toilet seat assembly to clean the user's perineal region via the washing apparatus, dry the user's perineal region via the drying apparatus, and spray the user's perineal region with one or more liquid products via the spray canister device.

As described above, the toilet seat assembly includes a washing apparatus. The washing apparatus is positioned in the seat base and includes a spray wand fluidically coupled to a cleanser reservoir and a water reservoir, and collar shroud extending at least partially around an exterior surface of the spray wand. The spray wand has a body portion and a head portion with one or more nozzles and is configured to deliver water from the water reservoir and/or liquid from the cleanser reservoir through the one or more nozzles thereof. The collar shroud of the washing apparatus may include one or more bactericidal light sources positioned proximate the spray wand such that the bactericidal light sources may shine bactericidal light on the spray wand to promote disinfection thereof.

One or more motors may be operatively coupled to the washing apparatus, and one of the one or more motors may be configured to cause the spray wand to move between the retracted position and the extended position. Additionally, one of the one or more motors may be configured to rotate the head portion of the spray wand to deliver water and/or cleanser to the perineal region. In operation, the motors may be configured to extend and rotate the spray wand in response to the user interface of the controller receiving a user input.

In some forms, the collar shroud may include one or more tubular apertures extending therethrough and permitting access to the exterior surface of the spray wand. The one or more apertures permitting access to the exterior surface of the spray wand may be fluidically coupled to the water reservoir of the toilet seat assembly such that water may be delivered therefrom to the spray wand for rinsing and cleaning the exterior surface thereof.

In some embodiments, the toilet seat assembly further includes a drying apparatus. The drying apparatus generally includes a fan, a heating unit, and a conduit for delivering air from the fan to the perineal region of the user. The fan is configured to blow air through the conduit and the heating unit positioned therein to deliver the air after the perineal region has been washed with water and/or cleanser via the washing apparatus. The speed of the air or the temperature of the air delivered by the fan is configured to be adjusted by the controller associated with the toilet seat assembly.

In some configurations, a spray canister device is also provided including a canister containing a liquid product, a canister housing having an opening, a chassis element, and a tray that is slidably coupled to the chassis element. The spray canister device and operation thereof are substantially disclosed in U.S. application Ser. No. 16/426,436, filed on May 30, 2019, which is incorporated herein by reference in its entirety. Particularly, the spray canister device may be positioned in the toilet seat assembly such that the spray canister device may be used to apply a liquid product to the perineal region of a user. A motor, controlled by the control unit of the toilet seat assembly, may be operatively coupled to the tray to slidably move the tray between a retracted position within the toilet seat assembly and an extended position extending outward from an opening in the toilet seat assembly. So configured, the canister housing and canister positioned therein may be moved with the tray between the retracted position and the extended position such that the liquid product may be sprayed onto the perineal region of a user. In some forms, the spray canister device may be configured to spray the liquid product after the perineal region of the user has been washed and dried by the washing apparatus and the drying apparatus, respectively.

The controller associated with the toilet seat assembly is configured to control operation of the components included in the toilet seat assembly. The controller includes a user interface for receiving a user input, a processor or control circuit, communication circuitry, and a memory. In some forms, upon receiving the user input at the user interface, the processor of the controller is configured to cause the communication circuitry to communicate a control signal to the control unit of the toilet seat assembly to cause operation of a component thereof. For example, the controller may communicate a control signal configured to cause the motor of the washing apparatus to move the spray wand to the extended position for delivering the water and/or cleanser to the perineal region of the user.

Additionally, the user may adjust various features of the toilet seat assembly via the user interface of the controller such as, for example, the temperature of the water in the water reservoir, the speed and temperature of the air from the drying apparatus, among others as discussed in further detail below. Additionally, or alternatively, the toilet seat assembly may further include an auxiliary user interface coupled to the control unit to operate the toilet seat assembly. In some forms, the auxiliary user interface coupled to the control unit is in the form of a piezoelectric button positioned on the housing of the seat base for convenient access by a user.

The example toilet seat assembly may further include a bracket assembly for securing the toilet seat assembly to an existing toilet bowl and water tank structure. For example, a seat and lid of the existing toilet bowl may be removed, and the toilet seat assembly may be affixed on the existing toilet bowl via the bracket assembly. The bracket assembly may include a base plate, an arm plate, and a pair of hinges for attaching the toilet seat assembly to the existing toilet bowl and water tank. In other forms, the bracket assembly may only include the arm plate and the hinges. The base plate, arm plate, and hinges each include means for adjustment depending on the size of the existing toilet bowl such that the toilet bowl assembly may be affixed to a plurality of different sized toilet bowl and water tank structures. For example, the base plate, arm plate, and hinges may include slots to be aligned depending on the size and height of the selected toilet bowl. In some forms, the base plate may include a sleeve portion configured for attachment to one or more grab bars to be positioned proximate the toilet bowl assembly to facilitate standing up from and sitting down on the toilet seat assembly for the user.

Referring now to the figures, and more specifically FIG. 1, a toilet seat assembly 100 is shown including a seat base 102 having a base portion 103 and a housing 104 coupled thereto, and further including a lid 106 with a plurality of supports 107. A power cord 110 having a wall connector 112 for connection to a standard wall outlet, such as a ground fault circuit interrupter (GFCI) outlet, is shown extending from the toilet seat assembly 100 and is configured to supply power to the components of the toilet seat assembly 100. As mentioned above, a washing apparatus 200, a drying apparatus 300, and a spray canister device 400 (all shown in FIG. 2) are positioned in the seat base 102 of the toilet seat assembly 100. A controller 150, in the form of remote control 152, is shown associated with the toilet seat assembly 100 and configured to control operation thereof via a user interface 154. A maintenance cover 114 is positioned on a rear portion 116 of the housing 104 in a closed position covering one or more apertures (shown in FIG. 14) for servicing components of the toilet seat assembly 100. Each component of the toilet seat assembly 100 will be discussed in turn below.

The housing 104 of the seat base 102 may be shaped and contoured for comfort of the user. For example, the housing 104 may be sloped at an angle to facilitate and assist individuals with mobility impairments in sitting down on, and standing up from, the toilet seat assembly 100. More particularly, the seat base 102 may be angled downward toward the front thereof. As described below, various electrical components are positioned in the seat base 102 of the toilet seat assembly 100. To inhibit ingress of water or bodily fluids in the seat base 102 that would otherwise interfere with the electrical components positioned therein, the housing 104 and base portion 103 that comprise the seat base 102 may be coupled together such that the housing 104 overlaps an edge of the seat base portion 103. Additionally or alternatively, a seal (not shown) may be included that is positioned between the housing 104 and the base portion 103, such as a rubber gasket, to insulate the seat base 102 from water or bodily fluids. As shown, a handle 118 may be positioned on a side of the housing 104 to facilitate standing up from, and sitting down on, the toilet seat assembly 100.

The seat base 102, including the base portion 103 and housing 104, may be formed of a polycarbonate and polybutylene terephthalate (PC-PBT) composition for ease of cleaning. In other forms, the seat base 102 may be formed of other plastics or resins typically used in both acute and post-acute care settings. The lid 106 and other components of the toilet seat assembly 100, such as the maintenance cover 114, may also be formed of a plastic or resin material to promote ease of cleaning and ease of disinfection. For example, the lid 106 and other components may also be formed of a polycarbonate and polybutylene terephthalate (PC-PBT) composition.

As illustrated, the lid 106 includes supports 107 in the form of six reinforced rib members 108 on an interior surface 120 thereof such that the rib members 108 support the lid 106 when the lid 106 is in a closed position proximate the housing 104 of the seat base 102. In other forms, the lid 106 may include any number of reinforced rib members 108. In some embodiments, the supports 107 may alternatively be formed as support posts, wedges, and ridges, among other structures that are configured to support the lid 106. So configured, when the lid 106 is in the closed position the user may sit on the lid with enhanced support such that there is a lower risk of the lid 106 breaking, bending, or otherwise buckling under the weight of the user. In some forms, the lid 106 is made of a resilient, durable plastic or resin material to promote enhanced rigidity. In one illustrative embodiment, the toilet seat assembly 100 is configured to support a user of up to 325 lbs. when the lid is in the closed position. Further, the toilet seat assembly 100, in some configurations, is configured to support a user of up to 325 lbs. in both the lid closed and lid open positions.

Figure 2:
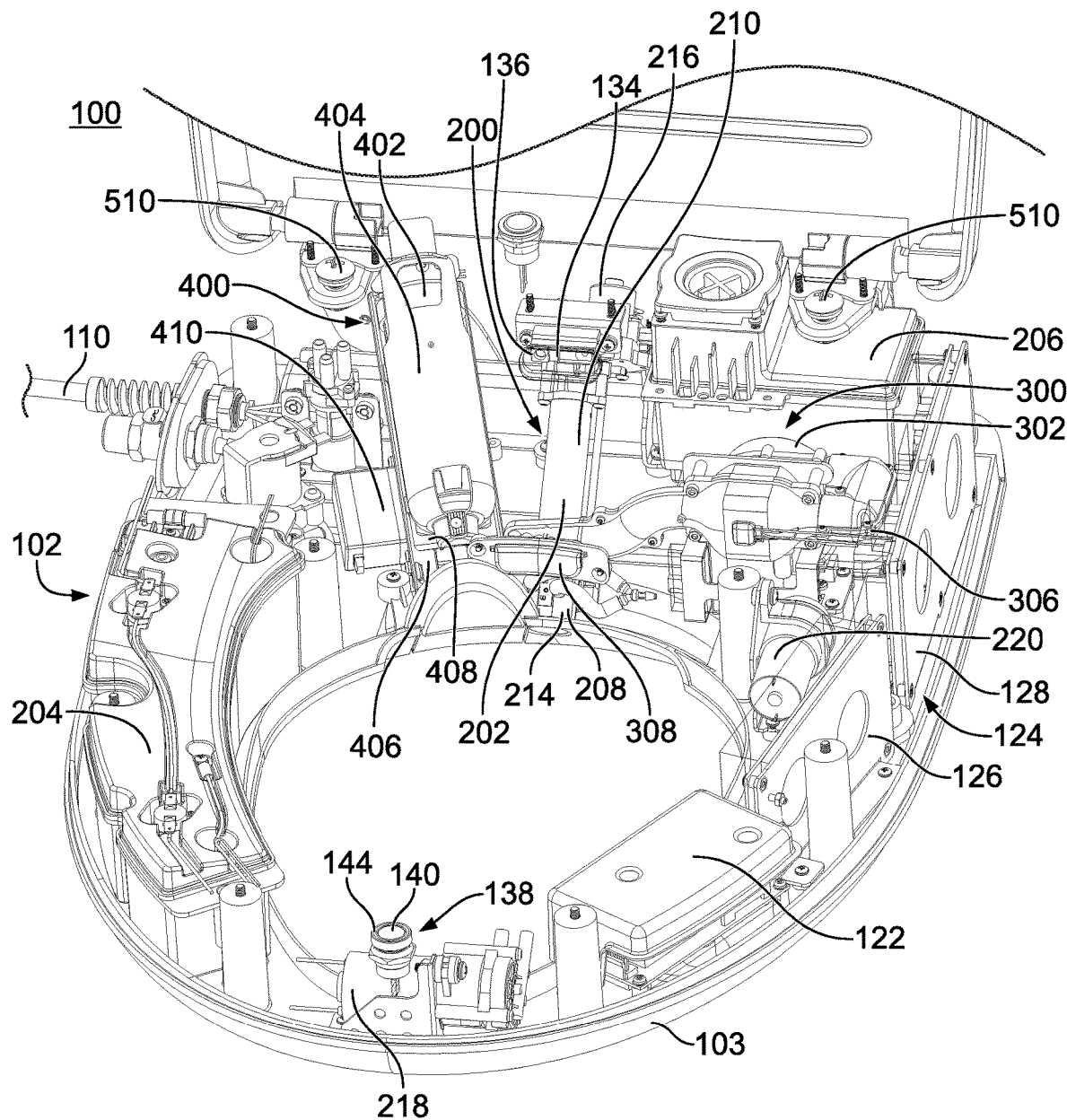
FIG. 2 is a perspective view of the toilet seat assembly of FIG. 1 with a housing of the seat base removed to show internal components of the seat base including a washing apparatus, a drying apparatus, and a spray canister device.

FIG. 2 shows the toilet seat assembly of FIG. 1 with the housing 104 of the seat base 102 removed to reveal the internal components of the toilet seat assembly 100 including, for example, the washing apparatus 200, the drying apparatus 300, and the spray canister device 400. As illustrated, the washing apparatus 200 includes a spray wand 202 that is fluidically coupled to a water reservoir 204 and a cleanser reservoir 206 for delivering water and/or cleanser to the perineal region of a user. Due to the number of components positioned in the seat base 102, for ease of illustration, the fluidic connections (e.g., plastic or rubber tubing) between the components of the washing apparatus 200 are not shown in FIG. 2 and can instead be seen in more detail in FIG. 3.

Additionally, the washing apparatus 200 may include a collar shroud 208 extending around at least a portion of an exterior surface 210 of the spray wand 202. In a preferable form, the collar shroud 208 includes one or more bactericidal light sources (shown in FIG. 7) for disinfecting the spray wand 202 after the perineal region of the user has been sprayed with the water and/or cleanser, as discussed in further detail below. The collar shroud 208 may include one or more apertures (i.e., apertures 212, 212' shown in FIG. 6) through a sidewall 214 thereof permitting access to the exterior surface 210 of the spray wand 202 such that water may be delivered through the apertures 212, 212' to rinse the spray wand 202 after a cleaning operation.

As shown, the spray wand 202 is coupled to a motor 216, and the motor 216 is configured to move the spray wand 202 between a retracted position (i.e., positioned in the seat base 102 of the toilet seat assembly 100) and an extended position (i.e., extending out of the seat base 102 of the toilet seat assembly 100). Once the spray wand 202 is in the extended position, one or more pumps (such as water pump 218, or cleanser pump 220) coupled to the water and cleanser reservoirs 204, 206 may cause water and/or cleanser to be delivered to the spray wand 202 to be sprayed out of a nozzle 222 thereof to the perineal region of a user. Additionally, the spray wand 202, in some configurations, is coupled to an auxiliary motor, as described below, for rotating the spray wand 202.

The example drying apparatus 300 seen in FIG. 2 includes a fan 302, a heating unit 304 (shown in FIG. 12), and a conduit 306. One end of the conduit 306 may be covered by a drying cover 308. The fan 302 is configured to blow air through the conduit 306, and through the heating unit 304 positioned therein, to deliver the air to the perineal region of the user after the perineal region has been washed with water and/or cleanser via the washing apparatus 200. The speed of the air delivered by the fan 302 or the temperature of the air may be adjusted by the user via a user interface 154 of the controller 150.

The spray canister device 400 includes a canister 402 containing a liquid product, a canister housing 404 having an opening, a chassis element 406, and a tray 408 slidably coupled to the chassis element 406. In the illustrated form, the spray canister device 400 is positioned in the toilet seat assembly 100. A motor 410 is operatively coupled to the tray 408 to slidably move the tray 408 between a retracted position within the seat base 102 and an extended position extending outward from an opening of the seat base 102. So configured, the canister housing 404 and canister 402 positioned therein may be moved with the tray 408 between the retracted position and the extended position such that the liquid product may be sprayed onto the perineal region of a user, and thereafter, be retracted back to an initial position.

In some forms, the spray canister device 400 may be configured to spray the liquid product after the perineal region of the user has been washed and dried by the washing apparatus 200 and the drying apparatus 300, respectively. The spray canister device 400 is configured to be operated via the controller 150 associated with the toilet seat assembly 100.

A power supply 122 may be positioned in the seat base 102 that receives power from the power cord 110 and is coupled to a control unit 124 of the toilet seat assembly 100. The control unit 124 may include one or more circuit boards 126, 128 for controlling the components of the toilet seat assembly 100. For example, circuit board 126 may be a power circuit board including a power circuit and circuit board 128 may be a control circuit board including a control circuit. Circuit boards 126, 128 may be manufactured, for example, as printed circuit boards (PCBs) known in the art.

Figure 16:
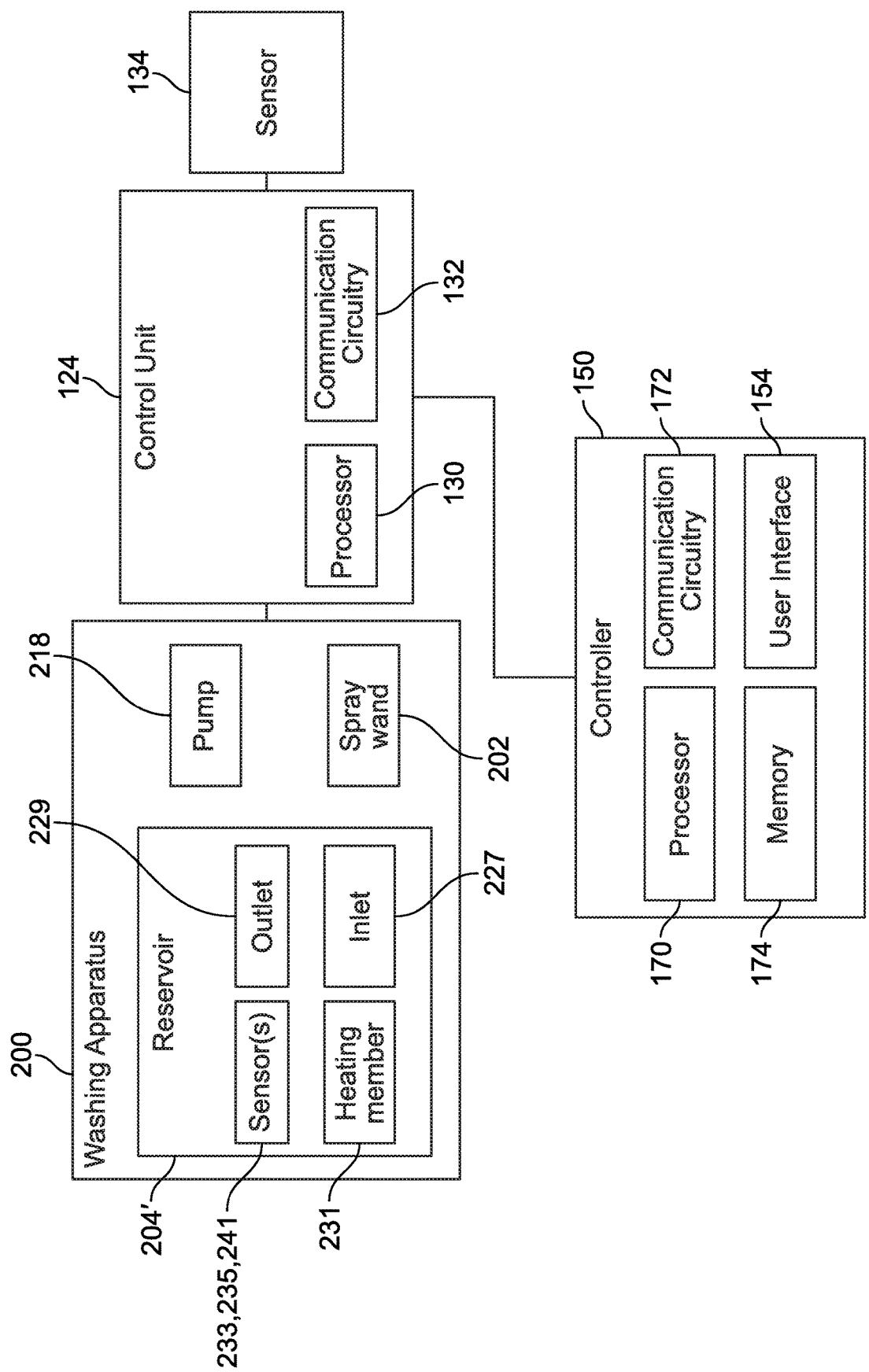
FIG. 16 is a schematic diagram of the controller, the control unit of the toilet seat assembly, and the washing apparatus including the reservoir, pump, and spray wand.

The control unit 124 may be configured to cause operation of the washing apparatus 200 to spray water and/or cleanser, cause operation of the drying apparatus 300, and cause operation of the spray canister device 400, as discussed in further detail below. The control unit 124 may include a processor 130 and communication circuitry 132 (shown in FIG. 16) to receive communications from the controller 150 associated with the toilet seat assembly 100, such as the remote control 152. So configured, the user interface 154 of the controller 150 may receive a user input configured to cause the controller 150 to communicate a control signal to the control unit 124 to cause operation or adjustment of one of the components of the toilet seat assembly 100.

As seen in both FIGS. 1 and 2, a sensor 134 may be placed proximate the seat base 102 to determine whether a user is present on the toilet seat assembly 100. For example, the sensor 134 may be positioned behind a window 136 made of translucent material such as glass or thin plastic such that the sensor 134 may detect when a user is present. In some forms, the sensor 134 may be an infrared sensor, a photoelectric sensor, or an ultrasonic sensor coupled to the control unit 124 of the toilet seat assembly 100. If the sensor 134 does not detect that a user is present, the sensor 134 may, for example, inhibit the control unit 124 from operating the washing apparatus 200 such that water and/or cleanser is not sprayed from the toilet seat assembly 100 into a surrounding area when a user is not present. Alternatively, a pressure sensor (not shown) may be incorporated into the housing 104 of the seat base 102 to assess presence of a user.

The toilet seat assembly 100 may further include a speaker (not shown) configured to emit sound upon, for example, the toilet seat assembly 100 completing a cleaning and/or drying operation. In some forms, the speaker may be coupled to or integrated with the controller 150 to generate sound therefrom. In other forms, the speaker may be positioned proximate the housing 104 of the seat base 102. The volume of the speaker may be adjusted via the controller 150 associated with the toilet seat assembly 100. In some embodiments, the speaker may be configured to connect with a mobile communication device of the user (e.g., a cellular phone or smart phone) via a wireless short-range communication protocol such as, for example, Bluetooth, to play audio selected by the user.

In some forms, the toilet seat assembly 100 may additionally include a light source (not shown) positioned proximate the housing 104 of the seat base 102 to illuminate portions thereof. For example, the light source may be turned on or off via the controller 150, and may be desirable for using and/or cleaning the toilet seat assembly 100 in a dimly lit area.

Additionally or alternatively, an auxiliary user interface 138 communicatively coupled with the controller 150 and/or control unit 124 may be included. For example, the auxiliary user interface 138 may be positioned proximate a surface of the housing 104 of the seat base 102 for convenient access. As shown in FIGS. 1 and 2 the auxiliary user interface 138 is in the form of a piezoelectric button 140. The piezoelectric button 140 may be mechanically sealed (e.g., using a flexible film or plastic) to inhibit ingress of water or bodily fluids in the interior of the seat base 102. In the illustrated form, the auxiliary user interface 138 is positioned on a front portion 142 of the housing 104 for convenient access to an individual using the toilet seat assembly 100 (e.g., between where the user's legs would be positioned).

In some forms, the auxiliary user interface 138 may be actuated multiple times to activate different features of the toilet seat assembly 100. For example, one touch may cause the toilet seat assembly 100 to operate the spray wand 202 to clean the perineal region of a user, and two presses may cause both washing and drying operations. In other embodiments, the user may program a specified order of operations to occur in response to the auxiliary user interface 138 receiving a user input. For example, the user may select that only operation of the washing apparatus 200 and drying apparatus 300 occur upon the auxiliary user interface 138 receiving the user input. So configured, both the user interface 154 of the controller 150 and the auxiliary user interface 138 may be used to operate the toilet seat assembly 100. Additionally, the auxiliary user interface 138 may include one or more indicators, such as in the form of LED 144, that are configured to indicate various operating conditions to a user. For example, in embodiments where the indicator is an LED 144, illumination of the LED 144 could indicate the end of a cleaning operation via a blue light or the LED 144 could indicate an error in the toilet seat assembly 100, such as a broken component, via an amber-colored light. In other forms, any color may be selected to indicate different information to the user.

In some embodiments, the toilet seat assembly 100 includes a seat base heater (not shown) positioned in the interior of the seat base 102 to heat the surface of the housing 104. For some individuals located in cold climates, it may be desirable for the housing 104 of the seat base 102 to be heated prior to using the toilet seat assembly 100. The seat base heater may be controlled by the controller 150 associated with the toilet seat assembly 100, and additionally, may include various heating settings such as low, medium, and high depending on user preference that may be selected at the user interface 154 of the controller 150.

Figure 3:
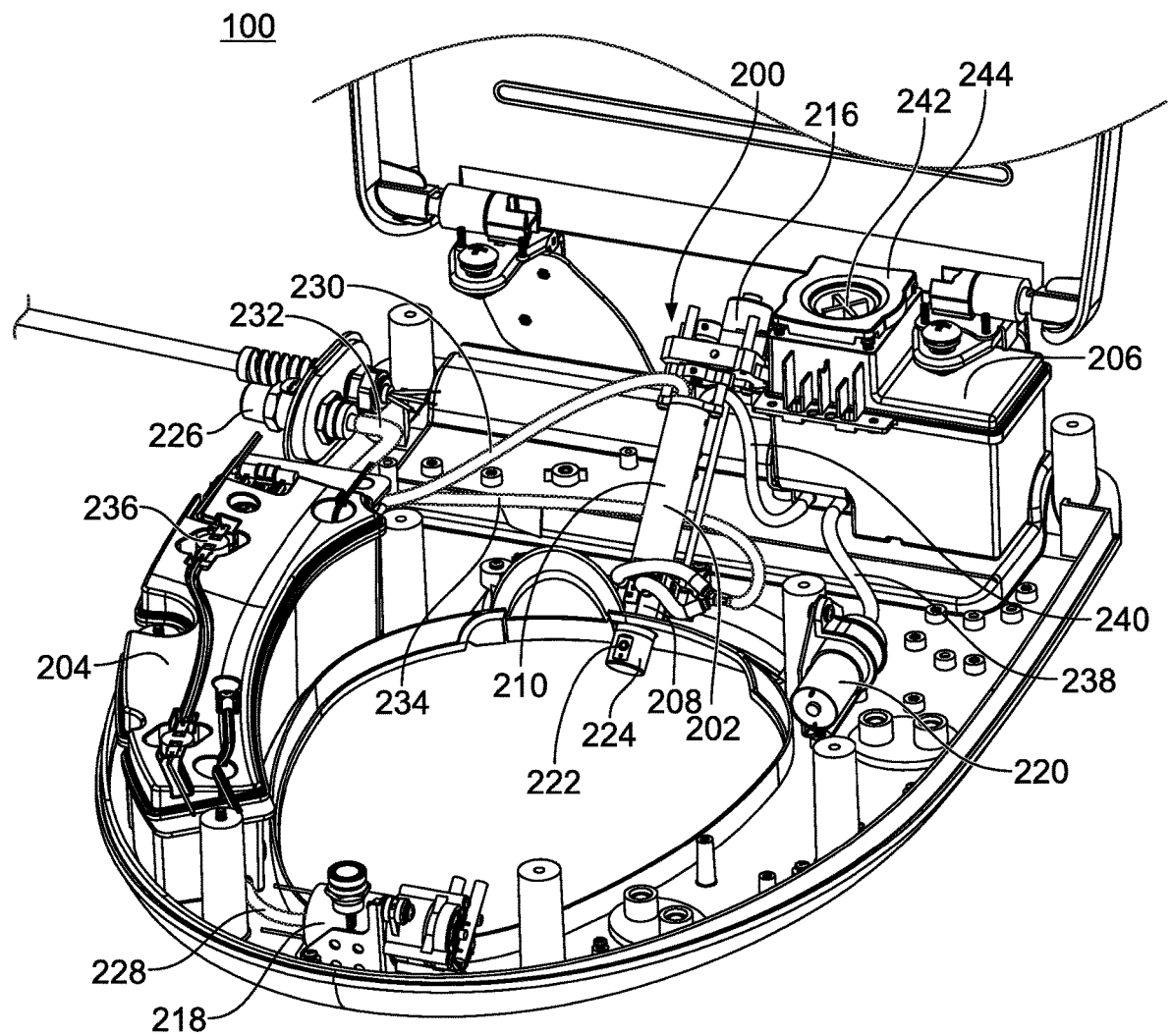
FIG. 3 is a perspective view of the toilet seat assembly of FIG. 2 with various internal components removed to show the washing apparatus having a spray wand, a collar shroud, and a motor, the washing apparatus coupled to a water reservoir and a cleanser reservoir via tubing.

The washing apparatus 200 will be discussed in more detail with respect to FIGS. 3-11. Referring now to FIG. 3, for simplicity and ease of explanation, various other components of the toilet seat assembly 100 including the housing 104, the drying apparatus 300, and the spray canister device 400 are removed to show the washing apparatus 200 and the components connected thereto more clearly. As shown, the washing apparatus 200 includes the spray wand 202 and the collar shroud 208 extending around the exterior surface 210 of the spray wand 202. A motor 216 is coupled to the spray wand 202 and is configured to move the spray wand 202 between a retracted position and an extended position for delivering water and/or cleanser to the perineal region of the user.

As shown in FIG. 3, the spray wand 202 is in transit between the retracted position (i.e., inside the seat base 102) and the extended position (i.e., outside the seat base 102) with a head portion 224 thereof extending partially out of the seat base 102 of the toilet seat assembly 100. So configured, the motor 216 may cause the spray wand 202 to extend out of the seat base 102 of the toilet seat assembly 100 to deliver water and/or cleanser to the perineal region of a user, as discussed in further detail below. In some forms, the spray wand 202 may be configured to stop at different predetermined points between the retracted position and the extended position. For example, depending on user preference, the spray wand 202 may be configured to extend about 10 mm to about 50 mm out of the seat base 102. In other forms, the spray wand 202 may be extended even further out of the seat base 102 of the toilet seat assembly 100. In some forms, the spray wand 202 may be made of stainless steel to inhibit germ or bacteria growth thereon.

As described above, the controller 150 of the toilet seat assembly 100 may be configured to operate the washing apparatus 200. For example, in response to the user interface 154 of the controller 150 receiving a user input, the controller 150 may be configured to cause the motor 216 coupled to the spray wand 202 to move the spray wand 202 to the extended position. Additionally, the user input may cause rotation of the spray wand 202 by either motor 216 or another, separate motor, as described below. So configured, the controller 150 may cause the spray wand 202 to move between the retracted and extended positions and rotate the spray wand 202 to deliver the water and/or cleanser to precise areas of the perineal region.

As described in further detail hereinafter, the user may also program selected spray patterns of the spray wand 202 depending on a desired coverage of the perineal region via the user interface 154 of the controller 150. Additionally, the user may select a water time (e.g., an amount of time the spray wand 202 will spray the water and/or cleanser) via the user interface 154 of the controller 150. Such features may be programmed and stored in a memory of the controller 150, as described further with respect to FIGS. 16A and 16B.

The water reservoir 204 and the cleanser reservoir 206 are shown positioned in the seat base 102 of the toilet seat assembly 100. In operation, the water reservoir 204 is configured to contain an amount of water and the cleanser reservoir 206 is configured to contain an amount of cleanser or other liquid product. For example, the water reservoir 204 may be configured to contain between about 600 and 605 cubic centimeters of water and the cleanser reservoir 206 may be configured to contain between about 300 and 350 cubic centimeters of cleanser.

Both the water reservoir 204 and the cleanser reservoir 206 may be fluidically coupled to the spray wand via tubes, channels, or like such that either water and/or cleanser may be delivered to the perineal region of the user via the nozzle 222 of the spray wand 202. In other embodiments, the head portion 224 of the spray wand 202 may include two separate nozzles with one nozzle fluidically coupled to, and configured to deliver the water from, the water reservoir 204 and the other nozzle fluidically coupled to, and configured to deliver the cleanser from, the cleanser reservoir 206. Additionally, both the water reservoir 204 and the cleanser reservoir 206 are operatively coupled to the water pump 218 and the cleanser pump 220, respectively, to pump the respective liquid from each reservoir 204, 206 to the spray wand 202 of the washing apparatus 200. By one approach, the water reservoir 204 and water pump 218 are configured to dispense between about 600 mL to about 800 mL per minute. In another illustrative embodiment, the water reservoir 204 and water pump 218 dispense about 605 mL to about 750 mL per minute.

The cleanser or other liquid product to be contained in the cleanser reservoir may include, for example, an amount of water, aloe-vera, moisturizers, deodorizers, vitamins, fragrance, cocamidopropyl betaine, lauryl sulphate, diazolidinyl urea, methylparaben propylene glycol, and/or citric acid, among other ingredients.

In the illustrated embodiment, a water inlet 226 is shown positioned adjacent to the power cord 110 and is configured to be coupled to an exterior water source, such as existing plumbing in a bathroom where the toilet seat assembly 100 is located. In some forms, the water inlet 226 may be coupled directly to the water reservoir 204 such that water from the water inlet 226 will continually fill the water reservoir 204 for operation of the washing apparatus 200. In other forms, the water inlet 226 may be coupled to a water regulator (not shown) positioned in the toilet seat assembly 100 which is in turn coupled to the water reservoir 204. The water regulator is configured to decrease the water pressure of the water coming in through the water inlet 226 such that the water does not flow into the water reservoir 204 at too high a pressure that could rupture any fluidic connections, overfill the water reservoir 204, or otherwise damage the components of the toilet seat assembly 100.

In addition, as shown in FIG. 3, the water reservoir 204 is connected to the water pump 218 via tube 228 and the water reservoir 204 is further connected to the spray wand via tube 230. In embodiments where the collar shroud 208 includes apertures 212, 212' permitting access to the exterior surface 210 of the spray wand 202 therethrough, a diverter valve (not shown) may be included such that the water from the water reservoir 204 may be supplied to both the spray wand 202 and the apertures 212, 212' of the collar shroud 208 for rinsing the spray wand 202. So configured, the water in the water reservoir 204 may be received through the water inlet 226, flow to the water reservoir 204 through a tube 232, and thereafter be pumped via pump 218 to the spray wand through tube 230 and/or the apertures 212, 212' of the collar shroud 208 through tube 234.

The water reservoir 204 may further include a heater or heating member such that the temperature of the water within the water reservoir 204 may be regulated by the user. For example, an immersion heater 231 (shown in FIG. 15) may be used to heat the water contained in the water reservoir 204 to a desired temperature. A user may desire that warmer or colder water be used to perform a cleaning operation with the washing apparatus 200 and the temperature may be adjusted via the user interface 154 of the controller 150. For example, the user interface 154 may provide the user with temperature options such as low, medium, and high. In other forms the user interface 154 may include a sliding scale or dial to precisely select the temperature of the water in the water reservoir 204. In order to prevent the water within the water reservoir 204 from getting too hot for spraying on a user, a thermistor 236 may be incorporated in a circuit configured to control the heater and may be used to inhibit the washing apparatus 200 from spraying the water through the spray wand 202 when the temperature of the water rises above a threshold determined at least in part by the resistance value of the thermistor 236.

In a similar manner, the cleanser reservoir 206 is fluidically connected to the cleanser pump 220 via tube 238 and is further connected to the spray wand 202 via tube 240. In operation, the cleanser in the cleanser reservoir 206 may be pumped via the cleanser pump 220 to the spray wand 202 to deliver the cleanser to the perineal region of the user through the nozzle 222 thereof. Alternatively, as described above, the cleanser may be delivered through a separate nozzle positioned on the head portion 224 of the spray wand 202.

The cleanser reservoir 206 includes a valve 242 positioned at a top side 244 thereof for receiving additional cleanser. As described above, the maintenance cover 114 (shown in FIG. 1) covers the valve 242 for refilling when the maintenance cover 114 is in the closed position. In some forms, the valve 242 may include a keyed connection such that a fill bottle containing additional cleanser requires a corresponding lid to depress the valve 242 and refill the cleanser reservoir. For example, the valve 242 may include a spring (not shown) to continually bias the valve 242 into a closed position. Upon depression of the valve 242 via the lid of the fill bottle, the cleanser contained therein may flow into the cleanser reservoir 206 to refill the reservoir 206 with cleanser or other liquid product. So configured, this pressure activated configuration inhibits any potential spilling of the cleanser for older, less dexterous users. Additionally, no manipulation of the fill bottle is required once the lid of the fill bottle has been matingly coupled to the valve 242 (e.g., no squeezing or manipulation of the fill bottle is required to cause flow of the cleanser from the fill bottle to the cleanser reservoir 206).

Additionally, both the water reservoir 204 and the cleanser reservoir 206 may include a level sensor 241 (e.g., float switch 243 shown in FIG. 15 to detect when the level of liquid contained therein drops below a predetermined threshold. Each sensor may be coupled to an indicator associated with the toilet seat assembly 100 to indicate when a level of liquid therein is low and in need of replacement. For example, each sensor may be coupled to the LED 144 of the piezoelectric button 140 or an LED on the controller 150 such that when the sensor detects that the level of cleanser/water is low, the LED 144 or LED on the controller 150 will be illuminated to indicate the same to a user. In some forms, different colored LEDs may be used for each sensor such that one color may indicate that the liquid in the water reservoir 204 is low and another color may indicate that the liquid in the cleanser reservoir 206 is low. Alternatively, the sensors may be communicatively coupled to the user interface 154 of the controller 150 to indicate to a user on, for example, a screen thereof that the level of water and/or cleanser is low.

In some embodiments, the water reservoir 204 may be continuously refilled via water from the water inlet 226 without requiring any user input. For example, upon the sensor detecting that the level of water is the water reservoir 204 is below a certain threshold, the control unit 124 of the toilet seat assembly 100 may control a valve (not shown) of the water inlet 226 to cause more water to flow into the water reservoir 204 to refill the water reservoir 204.

Figure 4A:
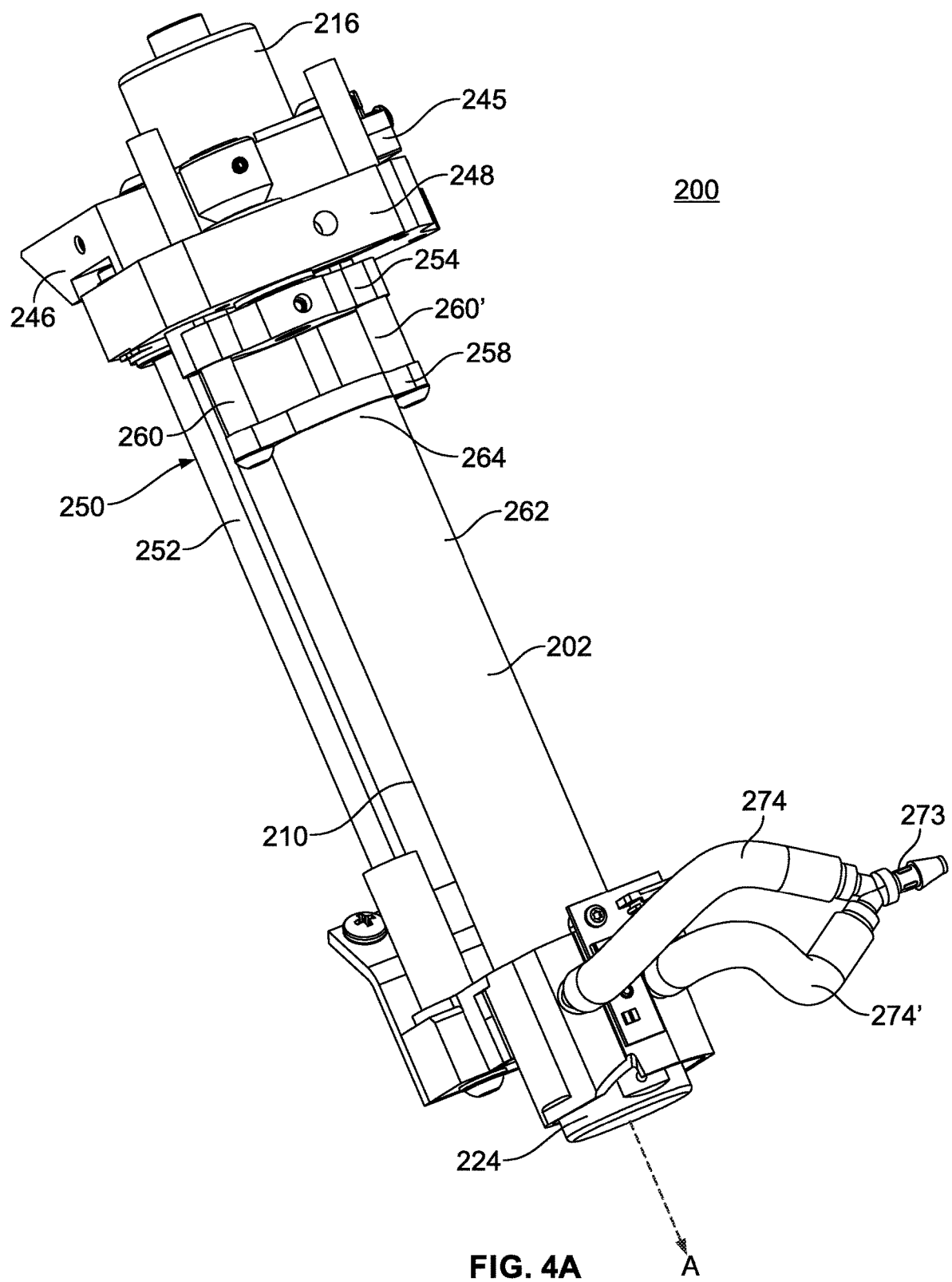
FIG. 4A is a perspective view of the washing apparatus of FIG. 3 isolated from the toilet seat assembly and showing the spray wand, the collar shroud, and a motor, wherein the spray wand is in a retracted position.
Figure 4B:
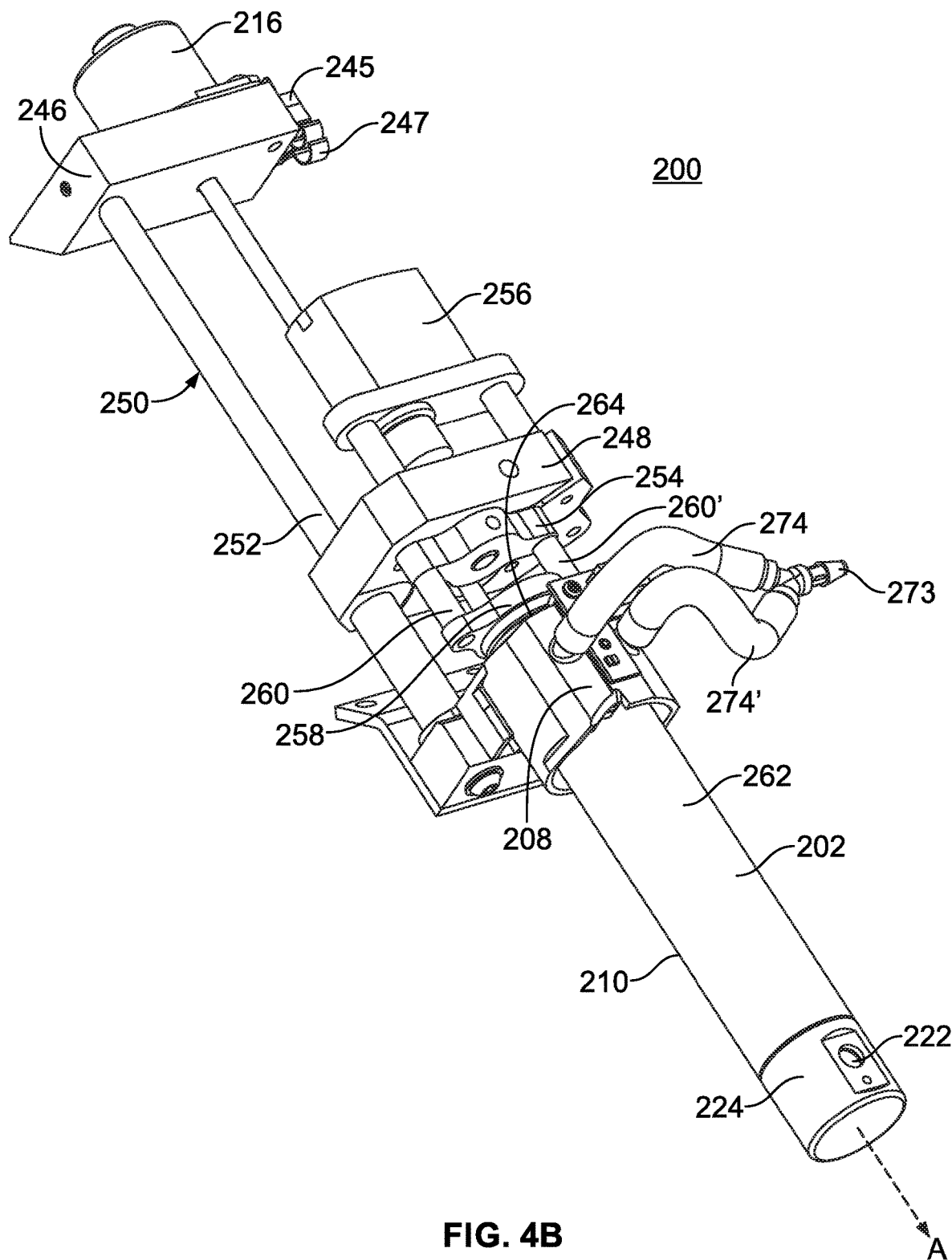
FIG. 4B is a perspective view of the washing apparatus similar to FIG. 4A showing the spray wand in an extended position to spray one or more liquid products from a nozzle thereof.

FIGS. 4A and 4B show the spray wand 202 in the retracted position and the extended position, respectively. As described in further detail below, the one or more motors are configured to move the spray wand 202 between the positions shown in FIGS. 4A and 4B to deliver the water and/or cleanser to the perineal region of the user. In operation, the spray wand 202 is advanced out of the seat base 102, through the collar shroud 208.

As described above, the washing apparatus 200 includes one or more motors such as motor 216. As shown, motor 216 is configured to cause the spray wand to move between the retracted position (seen in FIG. 4A) and the extended position (seen in FIG. 4B). The motor 216 may be mounted in the toilet seat assembly 100 via motor mount 246. In some forms, the motor 216 may be a stepper motor. As illustrated, the motor 216 is configured to cause a slide plate 248 connected to the spray wand 202 to advance in a direction A. In turn, the spray wand 202 coupled thereto is advanced out of the seat base 102 of the toilet seat assembly 100 in direction A towards the extended position. Additionally, in one illustrative approach, a guide 250 such as in the form of elongate rod 252 may be provided such that the slide plate 248 may slide along the guide 250 on a track to inhibit the spray wand 202 from moving in an undesirable direction during operation.

The washing apparatus 200 may further include a force sensor 245 as shown in FIG. 4B having an actuator 247 connected thereto. Upon the spray wand 202 returning to the retracted position, the slide plate 248 may contact and depress the actuator 247 to indicate that the spray wand 202 has been fully retracted. Upon depression of the actuator 247, in some forms, the force sensor 245 may trigger rinsing of the spray wand 202 and illumination of the bactericidal light sources 276 of the collar shroud 208 as described below.

The slide plate 248 described above, in some embodiments, may additionally be coupled to a rotational adapter 254 configured to rotate the spray wand 202 via a second motor, such as motor 256 shown in FIG. 4B. In such a configuration, the rotational adapter 254 is coupled to a flange 258 via spacers 260, 260', and the flange 258 is in turn coupled to a body portion 262 of the spray wand 202 at an end 264 thereof. The spacers 260, 260' are typically used to provide spacing between the rotational adapter 254 and the flange 258 to accommodate the fluidic connections between the spray wand 202 and the water and cleanser reservoirs 204, 206. For example, as shown in FIG. 3, the tube 230 from the water reservoir 204 and tube 240 from the cleanser reservoir 206 deliver the water and cleanser respectively to the spray wand 202 in the space between the flange 258 and the rotational adapter 254 created by the spacers 260, 260'.

The rotational adapter 254 is configured to be rotated by, for example, motor 256 shown in FIG. 4B. Alternatively, a single motor may be configured with multiple gearings such that the single motor may be configured for both moving the spray wand 202 between the retracted position and the extended position and rotating the spray wand 202. As described in additional detail herein, the controller 150 associated with the toilet seat assembly 100 is configured to cause operation of the one or more motors to move and rotate the spray wand 202 of the washing apparatus 200 to deliver the water and/or cleanser.

Figure 5:
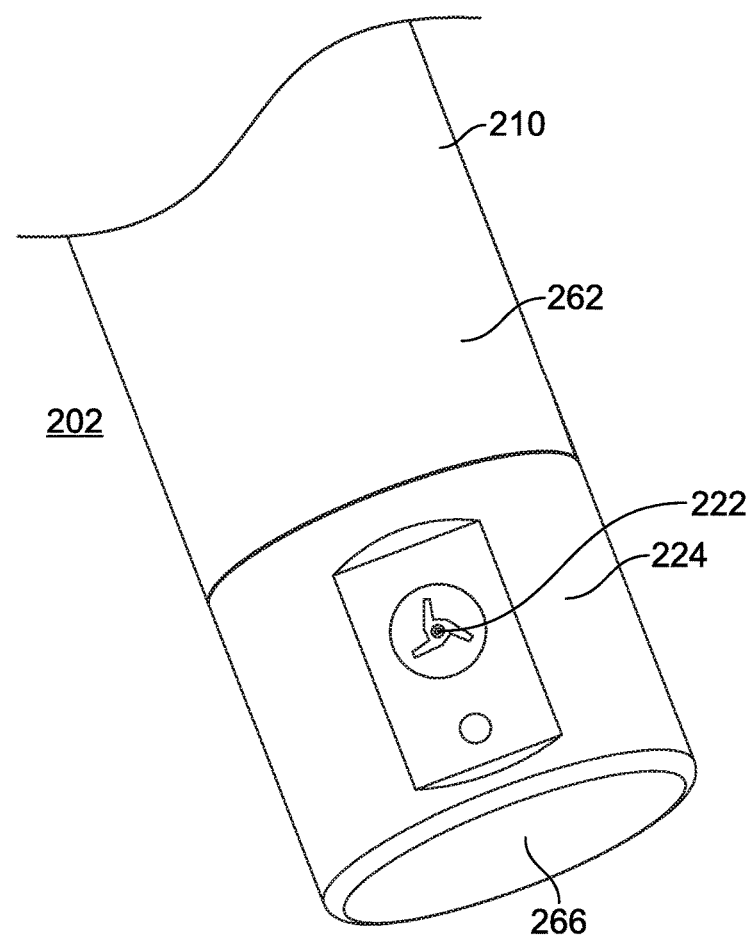
FIG. 5 is a close-up perspective view of a portion of the spray wand showing a body portion and a head portion thereof, the head portion having a nozzle for delivering one or more liquid products to the perineal region of a user.
Figure 6:
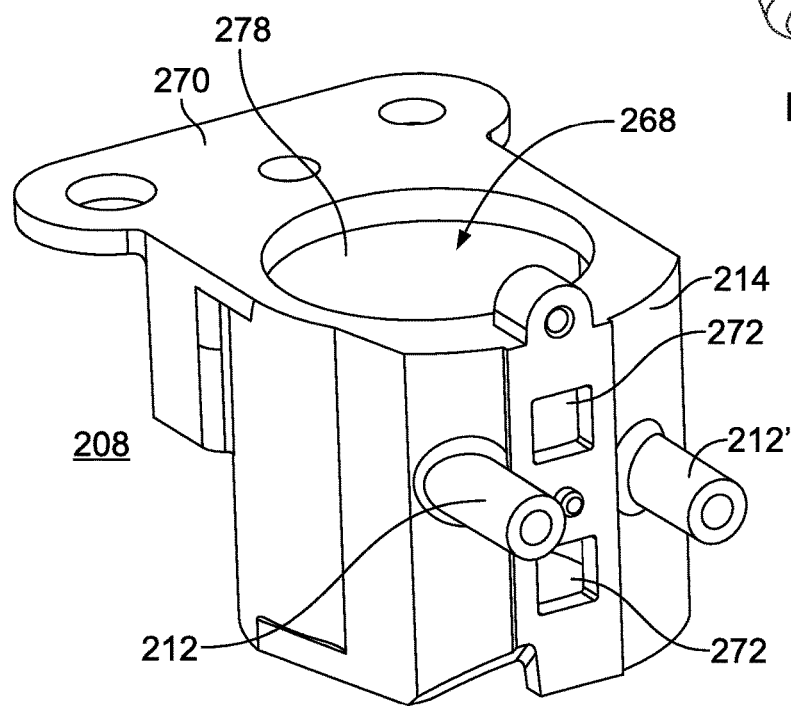
FIG. 6 is a perspective view of the collar shroud of the washing apparatus showing apertures for receiving bactericidal light sources therein, a bracket for positioning the collar shroud in the toilet seat assembly, and apertures for fluidic coupling to the water reservoir.

FIGS. 5 and 6 show close-up isolated views of the spray wand 202 and the collar shroud 208, respectively. Referring now to FIG. 5, the spray wand 202 includes a body portion 262 and a head portion 224. As described above, the spray wand 202 includes an exterior surface 210. The head portion 224 of the spray wand 202 has a top surface 266. As shown, the nozzle 222 is positioned on the head portion 224 of the spray wand 202 such that water and/or cleanser may be sprayed therefrom on the perineal region of the user. In other forms, the head portion 224 of the spray wand 202 may include multiple nozzles for delivering separate liquid products, such as water and cleanser.

As illustrated in FIG. 6, the collar shroud 208 is formed as a generally annular structure having an opening 268 therethrough corresponding with the shape of, and configured to accommodate, the spray wand 202. In some embodiments, the collar shroud 208 includes a bracket portion 270 for mounting the collar shroud 208 in the seat base 102 of the toilet seat assembly 100. As shown, the collar shroud 208 includes apertures 272 configured to receive bactericidal light sources (shown in FIG. 7) therein that may shine bactericidal light into the opening 268 where the spray wand 202 is positioned when the washing apparatus 200 is assembled.

As described above, the collar shroud 208 may further include apertures 212, 212' through a sidewall 214 thereof that are fluidically coupled to the water reservoir 204. In operation, water may be delivered through the apertures 212, 212', via the water pump 218, to rinse off the spray wand 202 after a cleaning operation. Due to the annular shape of the spray wand 202, the pair of apertures 212, 212' are preferably spaced from one another such that both sides of the spray wand 202 may be rinsed with water. As illustrated in FIGS. 3, 4A, and 4B, the single tube 234 from the water reservoir 204 is coupled to a split valve 273 such that two separate tubes 274, 274' extend therefrom to deliver water to each aperture 212, 212', respectively.

Figure 7:
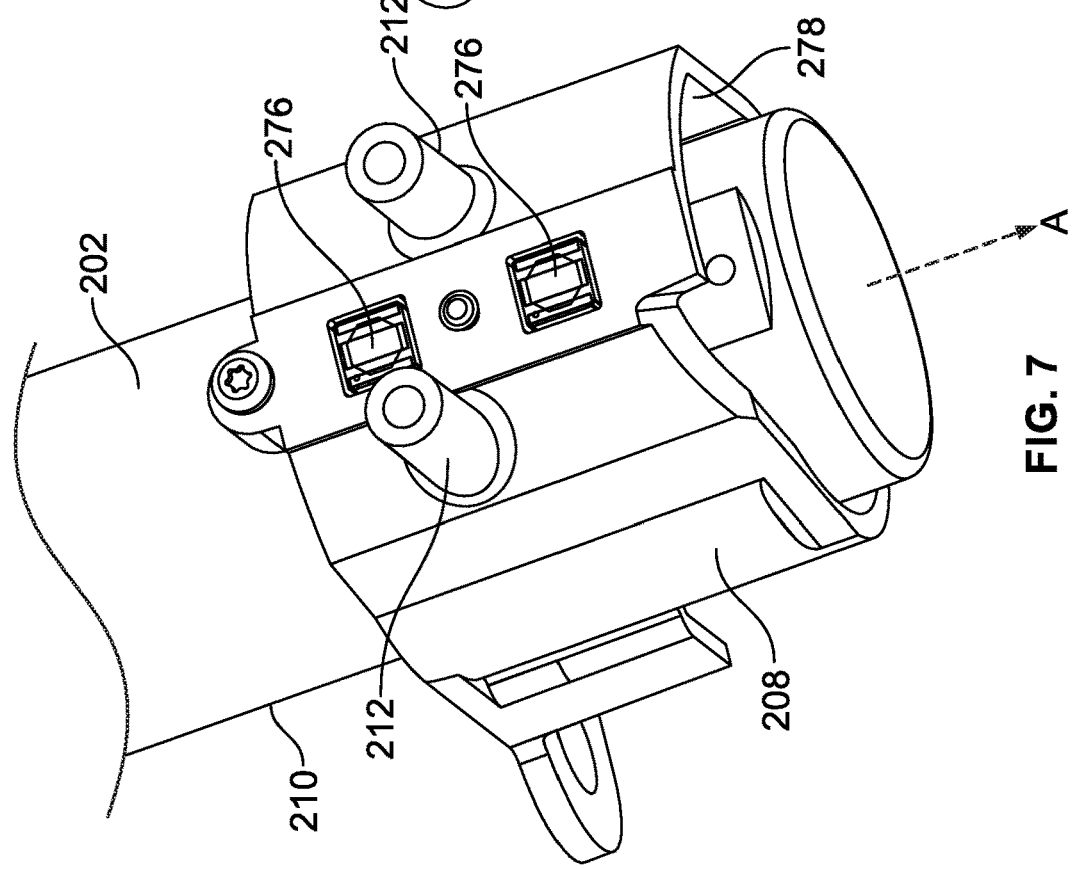
FIG. 7 is a close-up perspective view of the collar shroud of FIG. 6 surrounding the spray wand of FIG. 5, the apertures of the collar shroud having bactericidal light sources placed therein for shining bactericidal light on the spray wand.

With respect to FIG. 7, the collar shroud 208 and spray wand 202 are shown with the collar shroud 208 positioned surrounding the exterior surface 210 of the spray wand 202. As illustrated, in some embodiments, a bactericidal light source 276 is positioned in each of the apertures 272 to illuminate the spray wand 202 with bactericidal light. In some forms, the bactericidal lights sources 276 may be LEDs such as chip-on-board LEDs. Bactericidal light sources 276 should be understood to be light sources configured to produce light known for its bactericidal or disinfecting properties. In some forms, the bactericidal light is ultraviolet (UV) light and the bactericidal light sources 276 are UV LEDs. In other forms, the bactericidal light is any light having a wavelength between about 405 nm to about 470 nm.

As shown, the two bactericidal light sources 276 in FIG. 7 are aligned in the direction A. In other forms, the apertures 272 to receive the bactericidal light sources 276 may be positioned in other configurations. For example, the apertures 272 may be spaced from one another and extend radially about the inner, annular sidewall 278 of the collar shroud 208. In alternative embodiments, the bactericidal light sources 276 may instead be positioned in another structure in the toilet seat assembly 100 proximate the spray wand 202.

A disinfecting operation of the spray wand 202 will now be described below. After a cleaning operation where the spray wand 202 is extended to deliver water and/or cleanser to the perineal region of the user, there is a possibility that either urine, excrement, or other bodily fluids may inadvertently be splashed onto the exterior surface 210 of the spray wand 202. Upon the spray wand 202 returning to the retracted position, as shown in FIG. 4A, the water pump 218 may pump water from the water reservoir 204 to the apertures 212, 212' of the collar shroud 208 through tube 234 to rinse the spray wand 202. Additionally or alternatively, the bactericidal light sources 276 may then illuminate the exterior surface 210 of the spray wand 202 with bactericidal light to promote disinfection of the spray wand 202. So configured, the collar shroud 208 promotes hygienic usage of the toilet seat assembly 100.

Figure 8A:
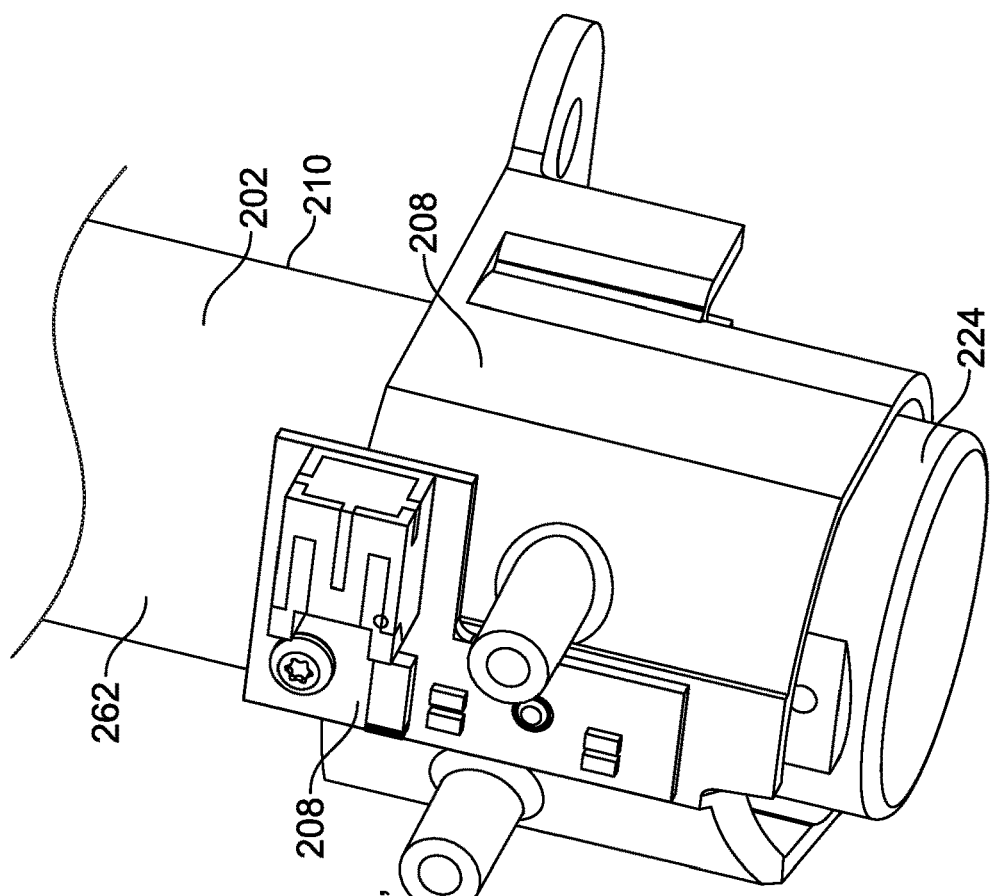
FIG. 8A is a close-up perspective view of the collar shroud of the washing apparatus of FIG. 1 showing a power circuit board for powering the bactericidal light sources positioned on the collar shroud and electrically connected to the bactericidal light sources.
Figure 8B:
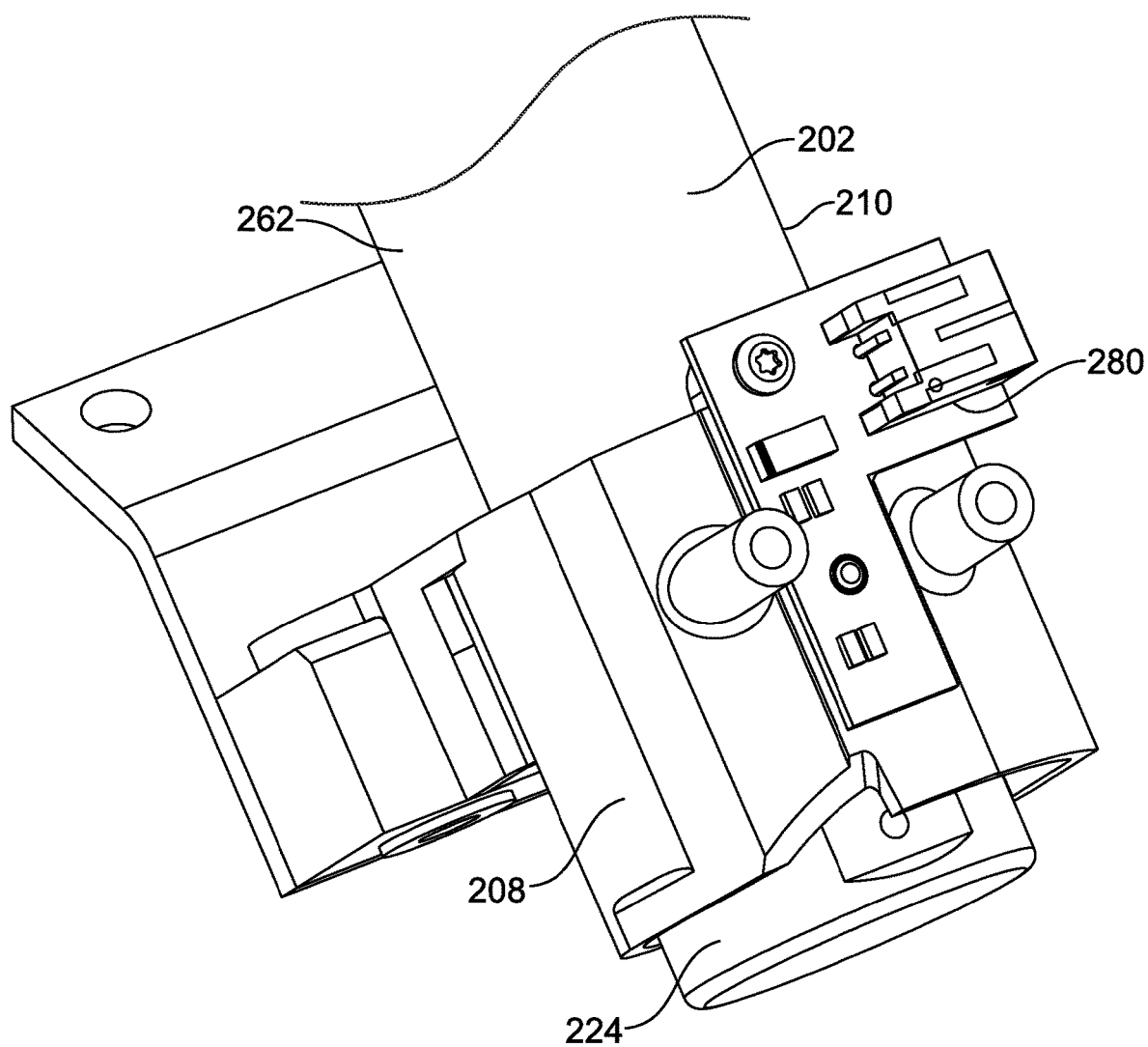
FIG. 8B is a close-up perspective view similar to FIG. 8A of an opposite side of the collar shroud.

FIGS. 8A and 8B show similar views to FIG. 7 of the collar shroud 208 positioned surrounding the exterior surface 210 of the spray wand 202, with the collar shroud 208 including a power circuit 280 that is electrically coupled to the bactericidal light sources 276 via wires, connectors, traces or the like. The power circuit board 280 includes a power circuit that is configured to be closed to provide power to the bactericidal light sources 276 to shine the bactericidal light. So configured, the bactericidal light may be shined on the head portion 224 of the spray wand 202 including the nozzle 222, the body portion 262, or both the head and body portions 224, 262. The power circuit may be configured to be closed to power the bactericidal light sources 276 upon the spray wand 202 returning to the retracted position. In other words, illumination of the bactericidal light sources 276 may be triggered once a cleaning operation is completed. In one approach, the power circuit board 280 of the collar shroud 208 is electrically coupled to the control unit 124 of the toilet seat assembly 100 such that the bactericidal light sources 276 of the collar shroud 208 may be controlled by the control unit 124.

In some forms, the bactericidal light sources 276 may illuminate the spray wand 202 with bactericidal light for a predetermined period of time after each cleaning operation of the toilet seat assembly 100. For example, upon the spray wand 202 returning to the retracted position, the bactericidal light sources 276 may be activated for a period of about 2 minutes to illuminate the exterior surface of the spray wand 202. In other forms, the bactericidal light sources 276 may be activated for a period of time between about 1 minute and about 3 minutes.

As described above with respect to FIG. 4B, actuation of the actuator 247 of the force sensor 245 may be configured to trigger illumination of the bactericidal light sources 276. Particularly, the force sensor 245 may be electrically coupled to the power circuit board 280 of the collar shroud 208 via wires, connectors, traces, or the like such that actuation of the actuator 247 is configured to close the power circuit of the power circuit board 280 to power the bactericidal light sources 276 for a predetermined period of time. So configured, the collar shroud 208 is configured to shine bactericidal light on the spray wand 202, such as, after each cleaning operation, to extend the spray wand 202, spray the water and/or cleanser, and retract the spray wand 202.

Figure 9:
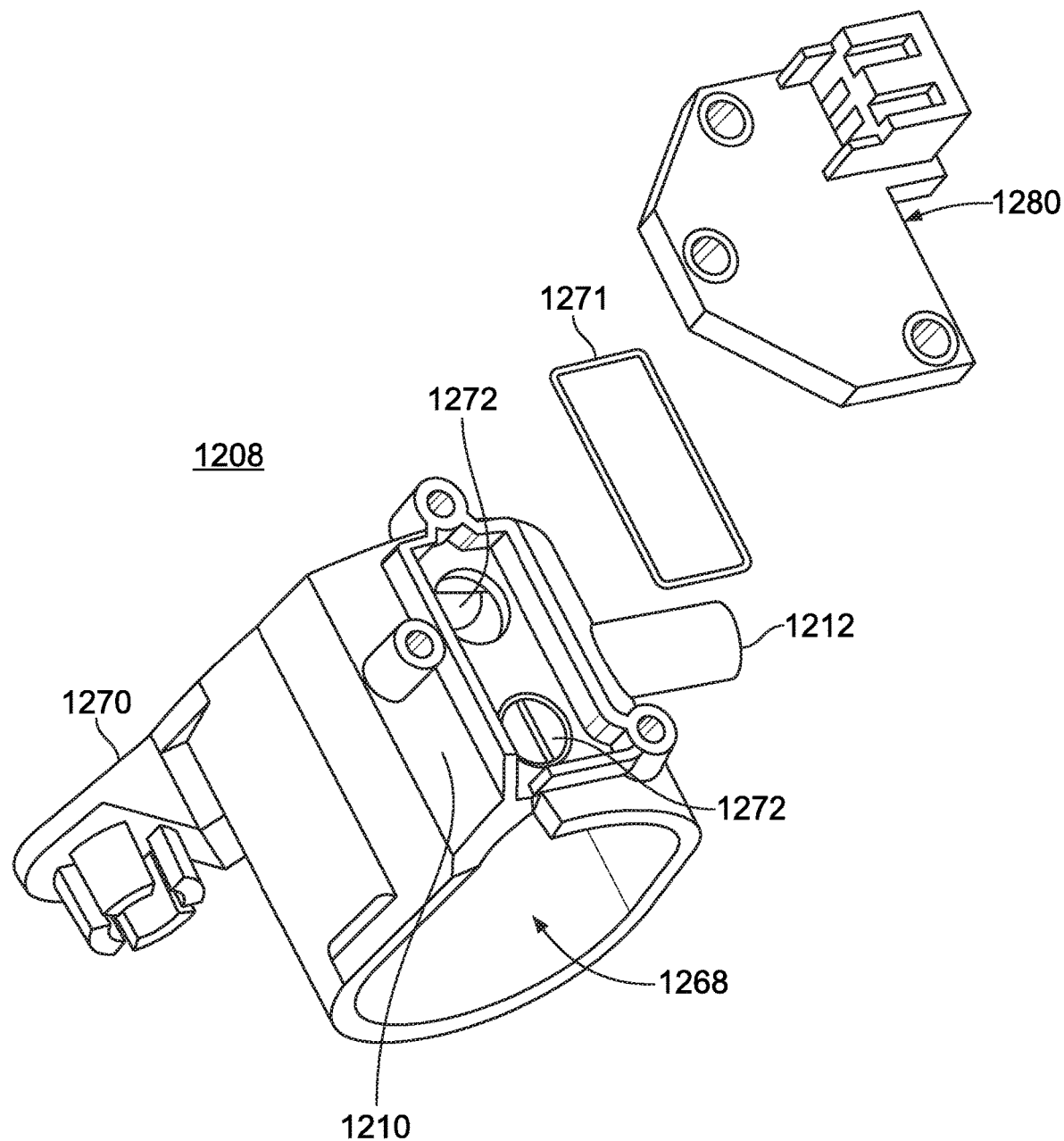
FIG. 9 is an exploded view of an alternative embodiment of a collar shroud, the collar shroud including a single aperture for fluidic coupling to the water reservoir.

An exploded view of an alternative embodiment of a collar shroud 1208 is described with respect to FIG. 9. The collar shroud 1208 includes an annular opening 1268 therethrough configured to receive the spray wand 202. Similar to collar shroud 208, the collar shroud 1208 includes one or more apertures 1272 configured to receive bactericidal light sources therein. As shown, the apertures 1272 are of an annular shape such that the bactericidal light sources positioned therein have a corresponding annular shape. The collar shroud 1208 may also include a bracket portion 1270 to mount the collar shroud 1208 within the seat base 102 of the toilet seat assembly 100. As illustrated, the collar shroud 1208 includes a single aperture 1212 configured to be fluidically coupled to the water reservoir 204 such that water from the water reservoir 204 may be pumped through the aperture 1212 to rinse the exterior surface 210 of the spray wand 202 positioned in the annular opening 1268. The collar shroud 1208 likewise includes a power circuit board 1280, and additionally may include a window portion 1271 that is placed between the bactericidal light sources positioned in apertures 1272 and the power circuit board 1280 such that water is inhibited from splashing on the power circuit board 1280 when water is pumped through the aperture 1212.

Figure 10:
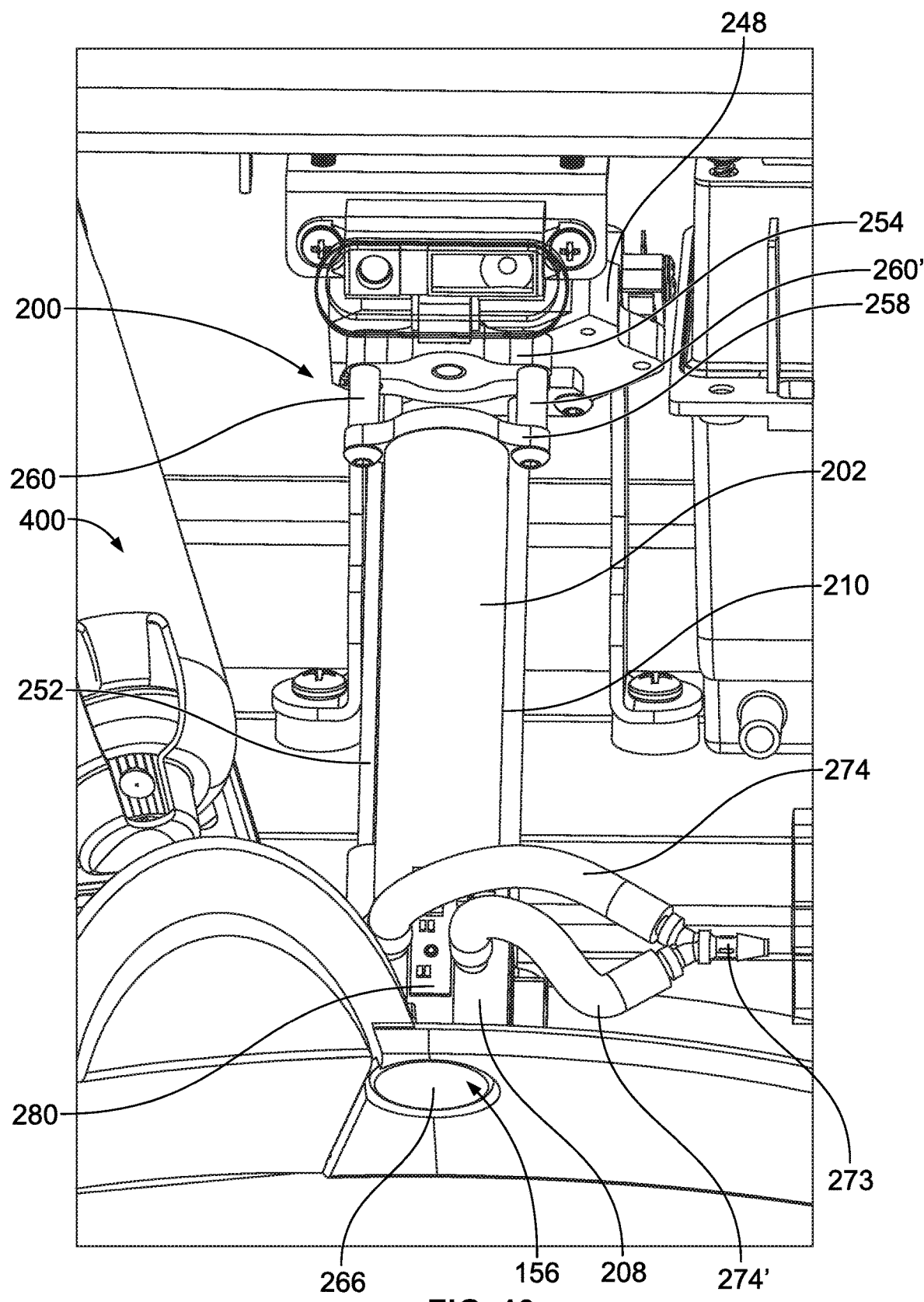
FIG. 10 is a partial perspective view of the washing apparatus of FIG. 2 shown positioned in the toilet seat assembly in a retracted position and showing the spray canister device positioned adjacent the washing apparatus.
Figure 11:
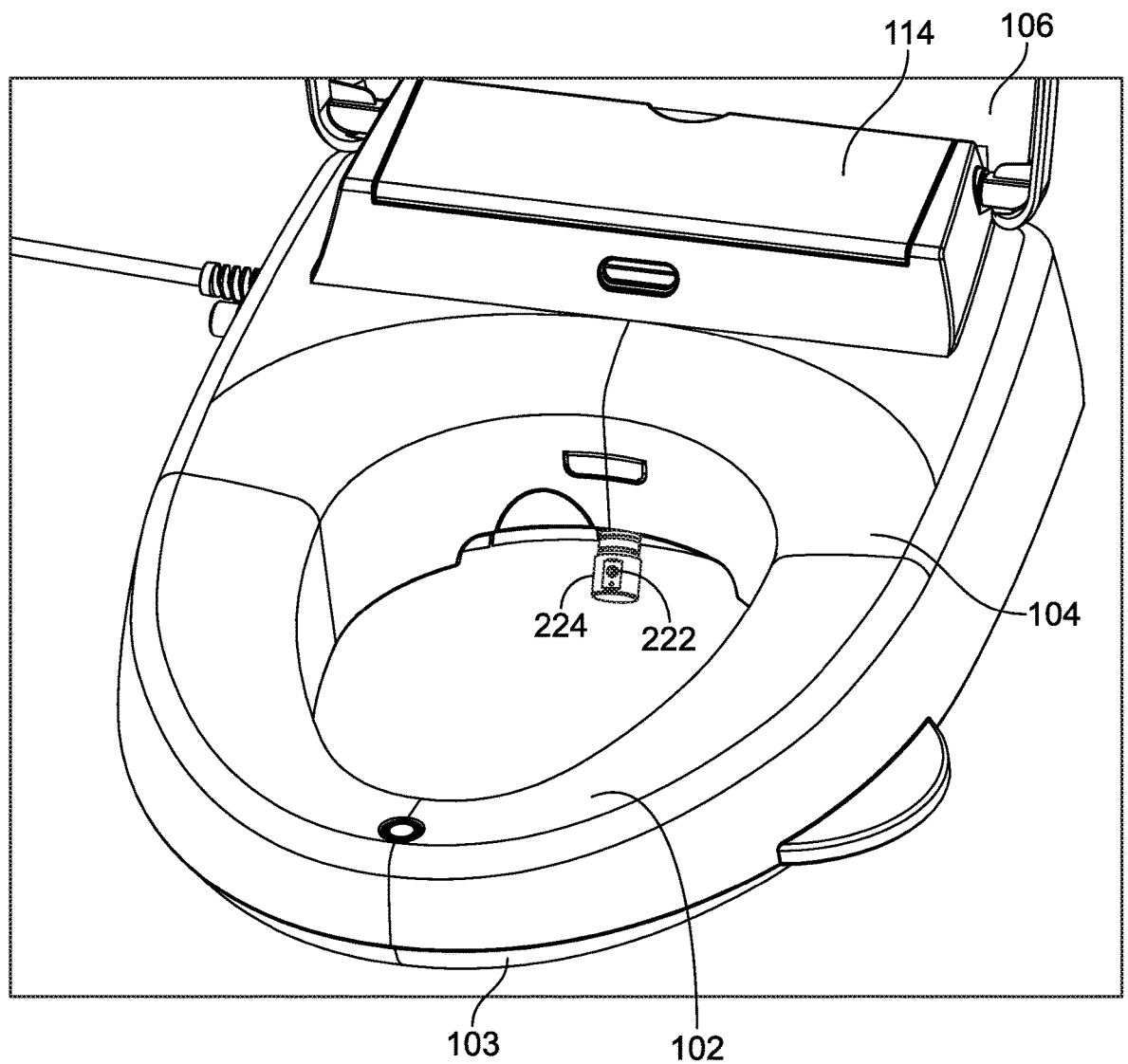
FIG. 11 is a partial perspective view of the toilet seat assembly of FIG. 1 showing the spray wand extending from an aperture of the seat base for delivering a liquid product to the perineal region of a user.

FIGS. 10 and 11 show additional views of the washing apparatus 200 positioned in the toilet seat assembly 100. As illustrated, the seat base 102 includes an aperture 156 through base portion 103 to permit the spray wand 202 to extend and retract therethrough during a cleaning operation. When the spray wand 202 is in the retracted position, the top surface 266 of the head portion 224 thereof is configured to remain flush with the surface of the seat base 102 such that there are no portions extending outward from the seat base 102. In other embodiments, a cover may be used that is opened during a cleaning operation. For example, the cover may be hingedly connected with the seat base 102 and additionally attached to the toilet seat assembly 100 with a spring such that the cover may be pushed to an open position when the motor 216 moves the spray wand 202 to the extended position, and the cover may be biased back via the spring into a closed position when the spray wand 202 is moved to the retracted position. FIG. 11 shows the toilet seat assembly of FIG. 1, including the base portion 103 and housing 104 of the seat base 102, with the head portion 224 of the spray wand 202 extending from the aperture 156 to spray the perineal region of a user. Once the nozzle 222 has sprayed the water and/or cleanser, the spray wand 202 may be returned to the retracted position as shown, for example, in FIGS. 4A and 10.

As described above, the spray wand 202 may be configured to move between the retracted position (i.e., at least partially within the seat base 102) and the extended position (i.e., extending at least partially out of the seat base 102) via the one or more motors, and may be further configured to rotate such that the nozzle 222 thereof may deliver water and/or cleanser to selected locations of the user's perineal region. In some forms, the control unit 124 of the toilet seat assembly 100 may be configured control the one or more motors to alter the trajectory of the nozzle 222 to deliver the water and/or cleanser in one or more predetermined or programmed patterns during a cleaning operation.

Figure 12A:
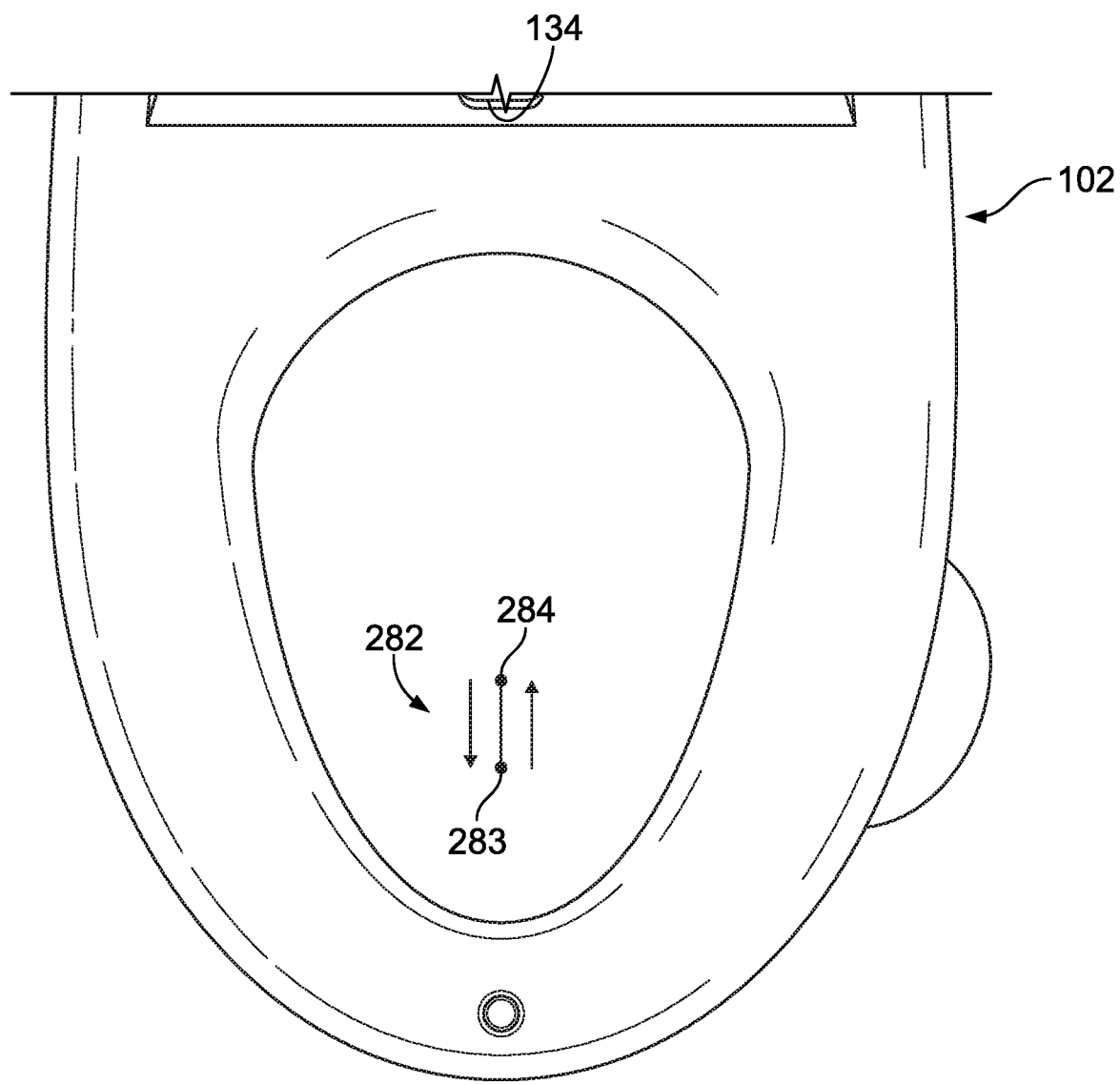
FIGS. 12A-12C show example spray patterns of the spray wand as they would be sprayed in the toilet seat assembly of FIG. 1.

Example patterns for delivering the water and/or cleanser via the spray wand 202 are shown in more detail in FIGS. 12A-C and FIGS. 13A-C. The patterns may be programmed to run for one or more cycles, with each cycle including spraying of the water and/or cleanser between a start point and a stop point following the direction of the illustrated path during the spraying operation. With respect to FIGS. 12A and 13A, a linear spraying pattern 282 is illustrated wherein the spray wand 202 may be moved to an extended position at start point 283, begin spraying via the nozzle 222, and continue spraying while being retracted and extended such that the water and/or cleanser are sprayed in a linear manner between start point 283 and stop point 284. The arrows illustrated adjacent the linear spraying pattern 282 are only intended to show example movement of the spray wand 202 between the start point 283 and the stop point 284. The linear pattern 282 may be configured to begin at a number of different start points or stop points, and may oscillate between the start and stop points any number of times. So configured, the length of the linear pattern 282 and the number of cycles may be adjusted depending on user preference. In typical forms, the linear pattern 282 does not require any rotation of the spray wand 202. In other forms, the spray wand 202 may be rotated such that the linear pattern 282 is offset from the central positioning as shown in FIG. 12A.

In one example, the start point of the linear pattern 282 may be spaced about 200-250 mm from the sensor 134 proximate the seat base 102, and the stop point may be spaced about 175-225 mm from the sensor 134. By one approach, the start point of the linear pattern 282 is about 212 mm from the sensor 134 and the stop point is about 200 mm from the sensor 134. Once the spray wand 202 has been extended, the nozzle 222 may begin spraying water and/or cleanser and oscillate between the start and stop points for a predetermined number of cycles. In other forms, the linear pattern may extend between a start point spaced about 205 mm from the sensor 134 and a stop point spaced about 192 mm from the sensor 134.

Figure 12B:
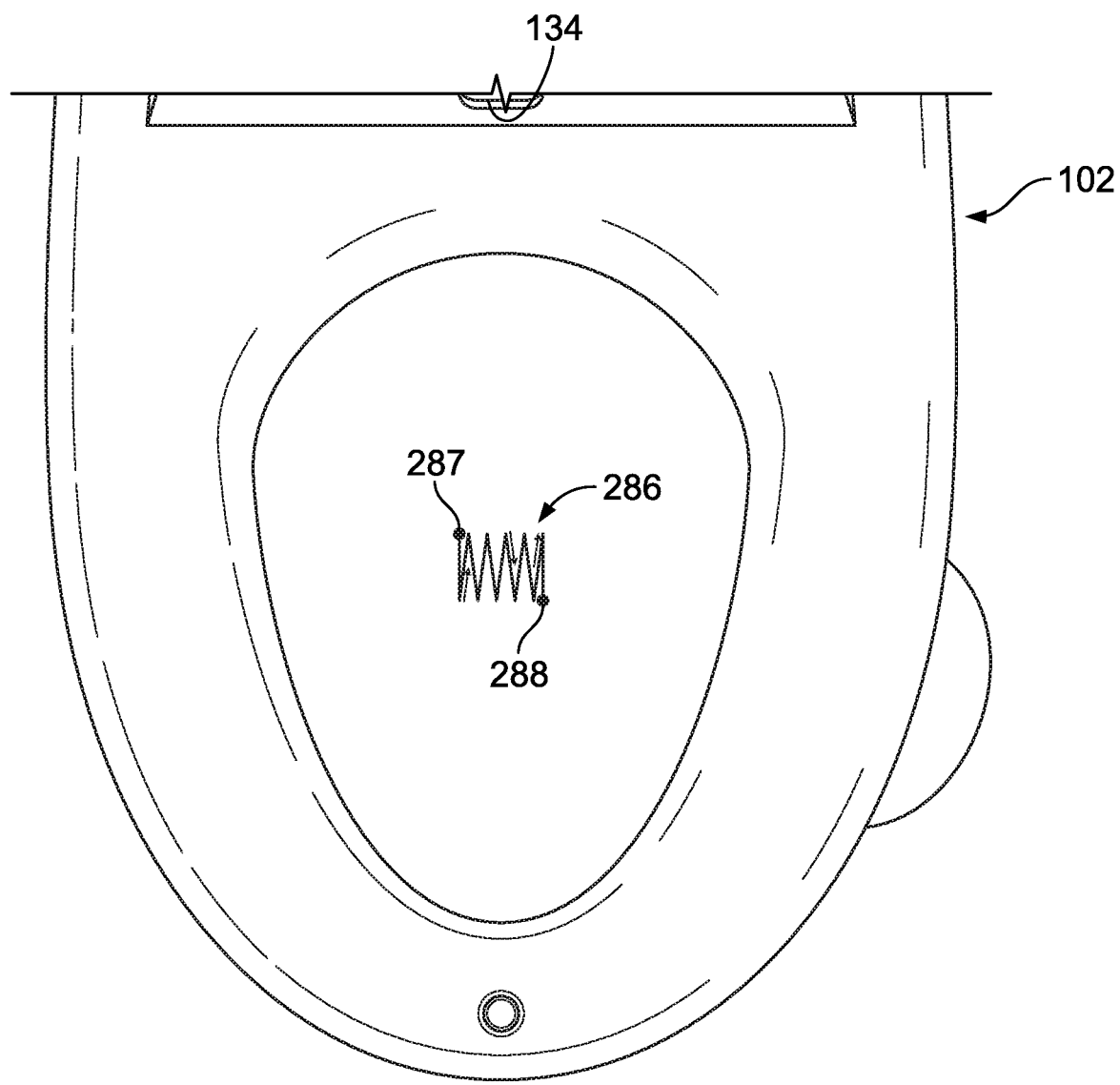
Figure 13A:
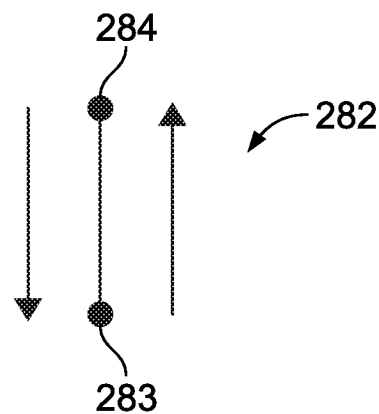
FIGS. 13A-13C show the example spray patterns shown in FIGS. 12A-12C enlarged and isolated from the toilet seat assembly.
Figure 13B:
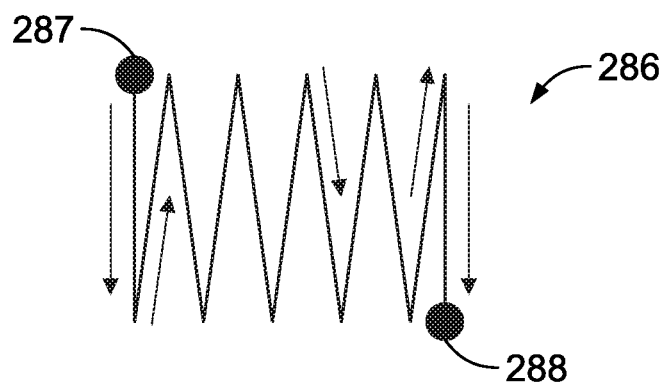

The control unit 124 also may be configured to cause the spray wand 202 to spray in an example "zig-zag" or winding pattern 286 shown in FIGS. 12B and 13B. As shown, the pattern 286 may begin at starting point 287. Thereafter, the spray wand 202 may be moved with a combination of extensions, retractions, and rotations such that the water and/or cleanser is sprayed by the nozzle 222 in the pattern 286 until reaching the stop point 288. The arrows illustrated adjacent the pattern 286 are only intended to show example movement of the spray between the start point 287 and the stop point 288. The pattern 286 may also be configured to start at a number of different start and stop points, and may oscillate between the start and stop points while following the pattern 286 any number of times. For example, the pattern may be reversed, rotated, or otherwise adjusted depending on user preference. In one illustrative example, the spray patterns of FIGS. 12B and 13B my be rotated about 90°, such that the spray wand 202 sprays the fluid in a left-to-right orientation of the user.

In one example, the start point may be spaced about 192 mm from the sensor 134, and offset such that, at the start point, the spray wand 202 is rotated about 3° counterclockwise. Thereafter, the spray wand 202 may be moved linearly to about 205 mm from the sensor 134, and continue to rotate while being extended and retracted in the pattern 286 until the spray wand 202 is rotated to about 3° clockwise at the stop point spaced about 205 mm from the sensor 134.

Figure 12C:
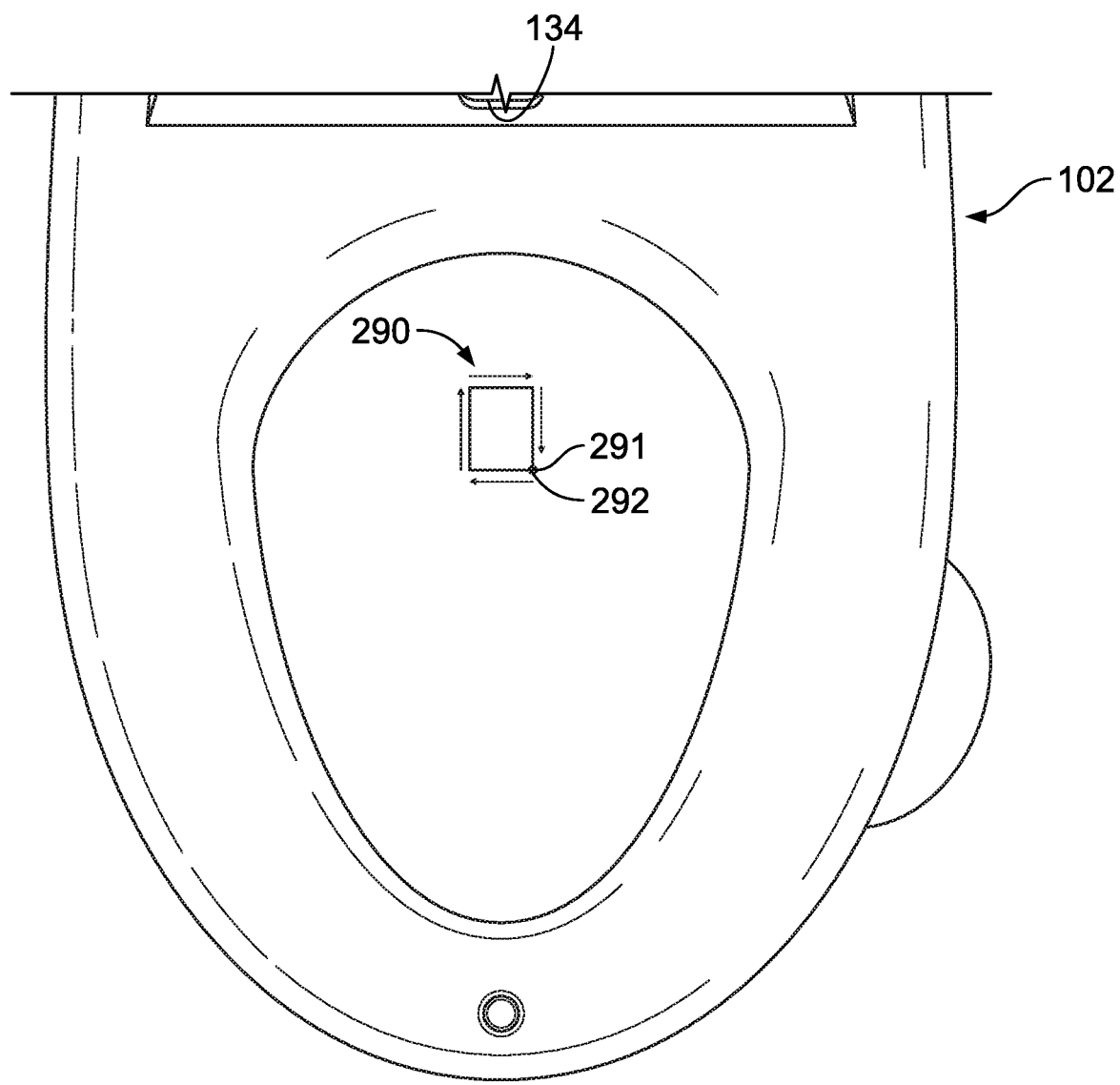
Figure 13C:
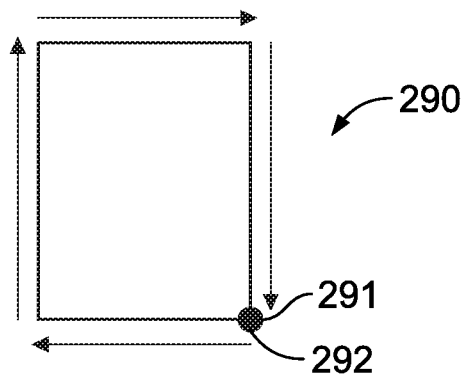

In still other forms, as shown in FIGS. 12C and 13C, the spray wand 202 may be moved by the control unit 124 to spray the water and/or cleanser in a square, rectangular, or box-like pattern 290. The pattern 290 may be configured for cleaning the anal region of a user. As illustrated, the spray wand 202 may be extended and rotated such that the nozzle 222 is positioned to spray at the start point 291, and the spray wand 202 may be moved by the control unit 124 to spray water in the box-like pattern 290 until returning to the stop point 292. The arrows illustrated adjacent the pattern 290 are only intended to show example movement of the spray between the start point 291 and the stop point 292. Similar to the patterns described above, the box-like pattern 290 may be programmed in any shape or size, and may oscillate between start and stop points any number of times. In other forms, the spray wand 202 may be configured to spray patterns in any polygonal, circular, or other shape depending on user preference.

The start point of the box-like pattern 290 may be, for example, about 190 mm spaced from the sensor 134 and offset such that, at the start point, the spray wand is rotated about 4° clockwise. Thereafter, the spray wand 202 may be rotated to about 4° counterclockwise, retracted to about 162 mm from the sensor 134, rotated back to about 4° clockwise, and then extended back to the start point spaced about 190 mm from the sensor 134. So configured, the water and/or cleanser is sprayed in a box-like shape.

Additionally, any of the patterns described above (e.g., the linear pattern 282, the zig-zag pattern 286, and the box-like pattern 290) may be combined in any order during a cleaning operation to target selected areas or combinations of areas in the perineal region. In some forms, the controller 150 may include one or more predetermined pattern settings (described in further detail below with respect to FIG. 23B) that each include one or a combination of different patterns. Such pattern settings may correspond with male cleaning, female cleaning, and/or cleaning of the anal area. For example, one pattern setting selection may be provided for cleaning the female anatomy, and may include (1) a linear pattern for a number of cycles, (2) a zig-zag pattern for a number of cycles, and (3) a box-like pattern for a number of cycles. In another example for cleaning of the male anatomy, the pattern setting may include (1) a first linear pattern of a first length for a number of cycles, (2) a second linear pattern of a second length for a number of cycles, and (3) a box-like pattern for a number of cycles. In still another example, one pattern setting may be specifically designed for cleaning the anal area of the perineal region and may only include a box-like pattern for a number of cycles. In other forms, the users may be able to program or select one or more preferred patterns to customize the pattern settings for spraying via the spray wand 202.

The controller 150 (FIG. 23B) also may include one or more time selections for adjusting a duration of the pattern settings (e.g., 45 second, 60 seconds, or 90 seconds). For example, the user may select a pattern setting of 45 seconds such that the spray wand 202 is configured to spray water and/or cleanser in a variety of patterns over the 45 second interval. Depending on the time selection, each different pattern in the selected pattern setting may oscillate for a different number of cycles. With reference to the pattern setting for cleaning the female anatomy described above, a 45 second time selection may include 10 cycles of the linear pattern, 1 cycle of the zig-zag pattern, and 2 cycles of the box-like pattern. Alternatively, a 90 second time selection may include 20 cycles of the linear pattern, 2 cycles of the zig-zag pattern, and 4 cycles of the box-like pattern. So configured, the number of cycles for each individual pattern may be scaled to accommodate different time selections for the duration of the pattern setting selected by the user.

Figure 14:
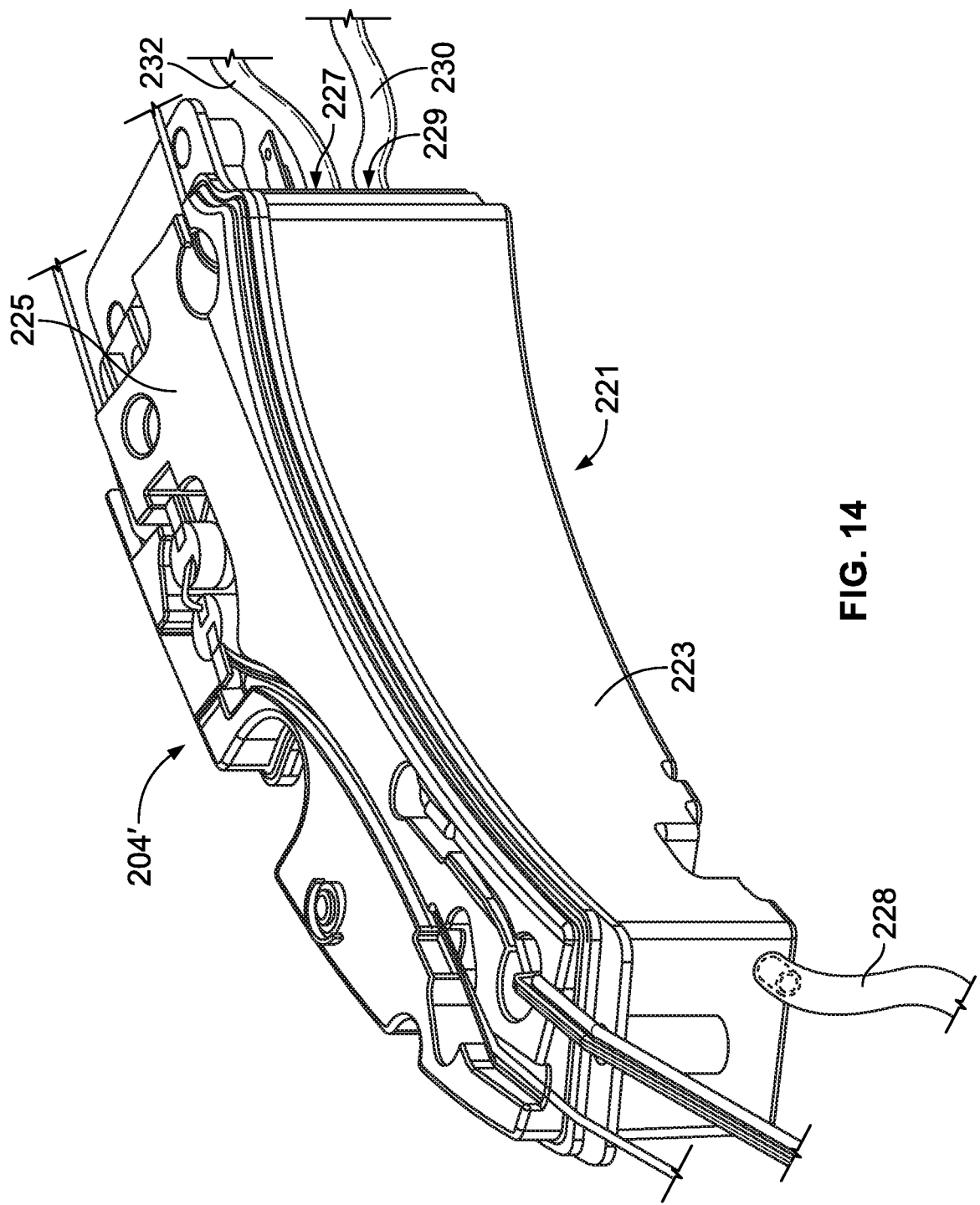
FIG. 14 is a perspective view of the water reservoir of FIG. 3 in isolation from the other components of the toilet seat assembly.

An example water/liquid reservoir 204' for use in the toilet seat assembly 100 and operation thereof is illustrated in more detail in FIGS. 14-17. The water reservoir 204' is substantially similar to water reservoir 204 shown in FIG. 3, such that any differences will be described hereinafter. Referring to FIG. 14, the water reservoir 204' is shown in isolation from the seat base 102. As shown, the water reservoir 204' includes a housing 221 having a base portion 223, a cover portion 225, an inlet 227, and an outlet 229. The housing 221 of the reservoir 204' is configured to contain an amount of liquid, such as water. As described above, the outlet 229 of the water reservoir 204' may be fluidically coupled to the spray wand 202 via one or more tubes (e.g., tube 230) such that water may be delivered to the perineal region of the user via the nozzle 222 thereof. The water reservoir 204' also is coupled to a water pump (e.g., water pump 218 shown in FIG. 3) via tube 228 to pump liquid from the reservoir 204' to the spray wand 202, and additionally to recirculate the liquid contained within the housing 221 of the reservoir 204'. By one approach, the water inlet 226 may be fluidically coupled to the inlet 227 via tube 232 to control ingress of liquid into the reservoir 204'.

Figure 15:
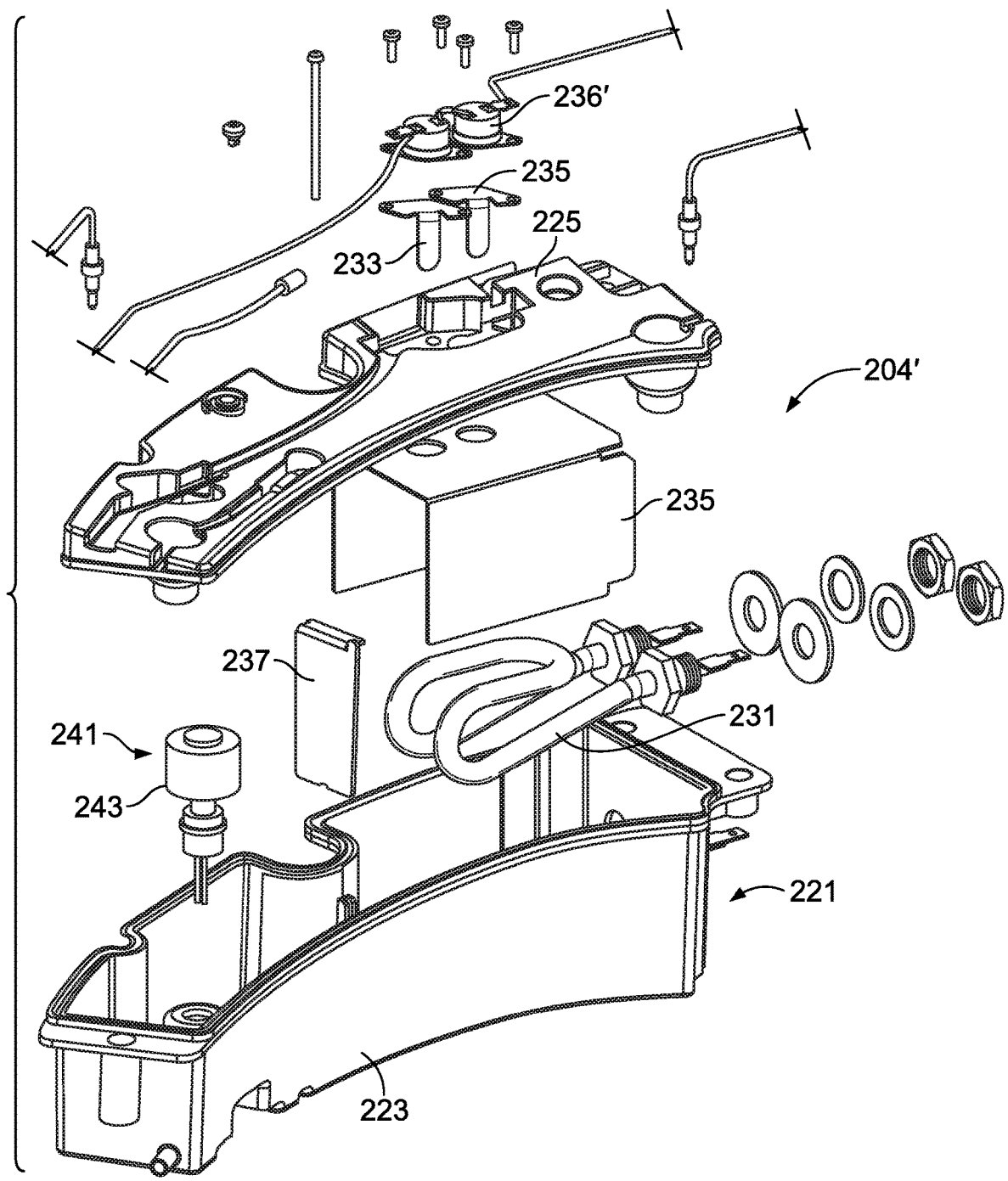
FIG. 15 is an exploded view of the water reservoir of FIG. 14.

FIG. 15 shows an exploded view of the water reservoir 204' shown in FIG. 14 illustrating example internal components thereof. As described above with respect to FIG. 3, a heating member such as immersion heater 231 is positioned in the housing 221 to heat the liquid contained in the housing 221 to a desired temperature. One or more sensors such as temperature probes 233, 235 may be positioned proximate the heater 231 to continuously measure the temperature of the liquid contained in the housing 221. In some forms, the temperature probes 233, 235 may be formed of conductive material, such as copper. In addition, a thermistor 236' (similar to thermistor 236 shown in FIG. 3) may be incorporated in the control circuit to inhibit the washing apparatus 200 from spraying the water through the spray wand 202 when the temperature rises above a certain threshold determined at least in part by the resistance of the thermistor 236'. Alternatively, the control unit 124 may prevent operation of the washing apparatus 200 upon the temperature probes 233, 235 indicating that the temperature is above a predetermined threshold. For example, the threshold may be selected to be a temperature of about 41° C. In other forms, the threshold may be selected to be a temperature of about 35° C. to about 45° C.

Additionally, the housing 221 of the reservoir 204' may include various internal struts and baffles (e.g., baffle 237 and baffle 239) for added support, improved circulation of liquid, and/or dissipation of heat. The water reservoir 204' also may include a level sensor 241 configured to detect an amount of the liquid contained in the housing 221. As illustrated in FIG. 15, the level sensor 241 may be a float switch 243 configured to detect when the level of liquid contained in the housing 221 has dropped below a predetermined threshold as a result of a cleaning operation. The level sensor 241 may be communicatively coupled to the control unit 124 such that the control unit 124 can facilitate ingress of liquid into the reservoir 204' when the liquid level is below the predetermined threshold. In some forms, the water reservoir 204' may begin to refill as soon as a cleaning operation begins.

During standby operation when a user is not currently using the toilet seat assembly 100, the heater 231 may be either turned off or operating at a low-power setting such that the liquid within the housing 221 is not being continuously heated. Upon detecting the presence of a user via sensor 134, the control unit 124 may be configured to cause the heater 231 to turn on or enter a high-power state to heat the liquid in the reservoir 204' to a set temperature selected by the user such that the warmed liquid may be used to wash the user's perineal region after using the toilet seat assembly 100. For example, the control unit 124 may cause the heater 231 to operate between about 30 seconds to about 60 seconds depending on the desired temperature of the liquid, which may be selected via the controller 150 (FIG. 23B). For example, the controller 150 may allow the user to select a low setting (e.g., about 32° C.), a medium setting (e.g., about 35° C.), and a high setting (e.g., about 38° C.) for the set temperature. To promote a more even distribution of heat throughout the liquid, the control unit 124 may cause operation of the pump 218 to recirculate the liquid contained within the reservoir 204' periodically. So configured, the spray wand 202 may be able to deliver consistently warm water throughout the entirety of a cleaning operation.

To facilitate adequate time to heat the liquid within the housing 221 to the desired temperature between a first time when the sensor 134 detects the presence of a user and a second time when the spray wand 202 will operate, the heater 231 may hold the liquid within the housing 221 at a temperature near the set temperature (i.e., the user selected setting described above). In some forms, if the temperature probes 233, 235 detect that the water has dropped below about 2° C. of the set temperature, the control unit 124 may cause the heater 231 to operate and heat the liquid back to the set temperature. Additionally, the control unit 124 may cause the pump 218 to recirculate the liquid in the manner described above to further promote even heat distribution. So configured, the liquid within the reservoir 204' may be held at or near the set temperature for extended periods of time.

In some instances, the control unit 124 may be configured to drain at least a portion of the liquid contained in the reservoir 204' upon the temperature probes 233, 235 detecting that the liquid has exceeded a temperature threshold. For example, such a temperature threshold may be in the range of about 40° C. to about 41° C. Thereafter, the housing 221 may be refilled with liquid via the inlet 227. In some alternative forms, the controller 150 (FIG. 23B) may be configured to cause the control unit 124 to drain the water reservoir 204' for cleaning or service.

The water reservoir 204' also may be configured to flush the fluidic connections between the components before spraying liquid via the spray wand 202 to expel any residual, unheated liquid in the fluid lines (e.g., tubes 228, 230, 232). For example, after a cleaning operation, at least some liquid may remain within tube 230 coupling the outlet 229 of the reservoir 204' to the spray wand 202. Before a subsequent cleaning operation, the control unit 124 may operate the pump 218 at low power to gradually drain the remaining, cold liquid from the tube 230 and through the nozzle 222 of the spray wand 202 into the toilet bowl to inhibit delivery of liquid below the selected temperature to the perineal region of the user.

Figure 17:
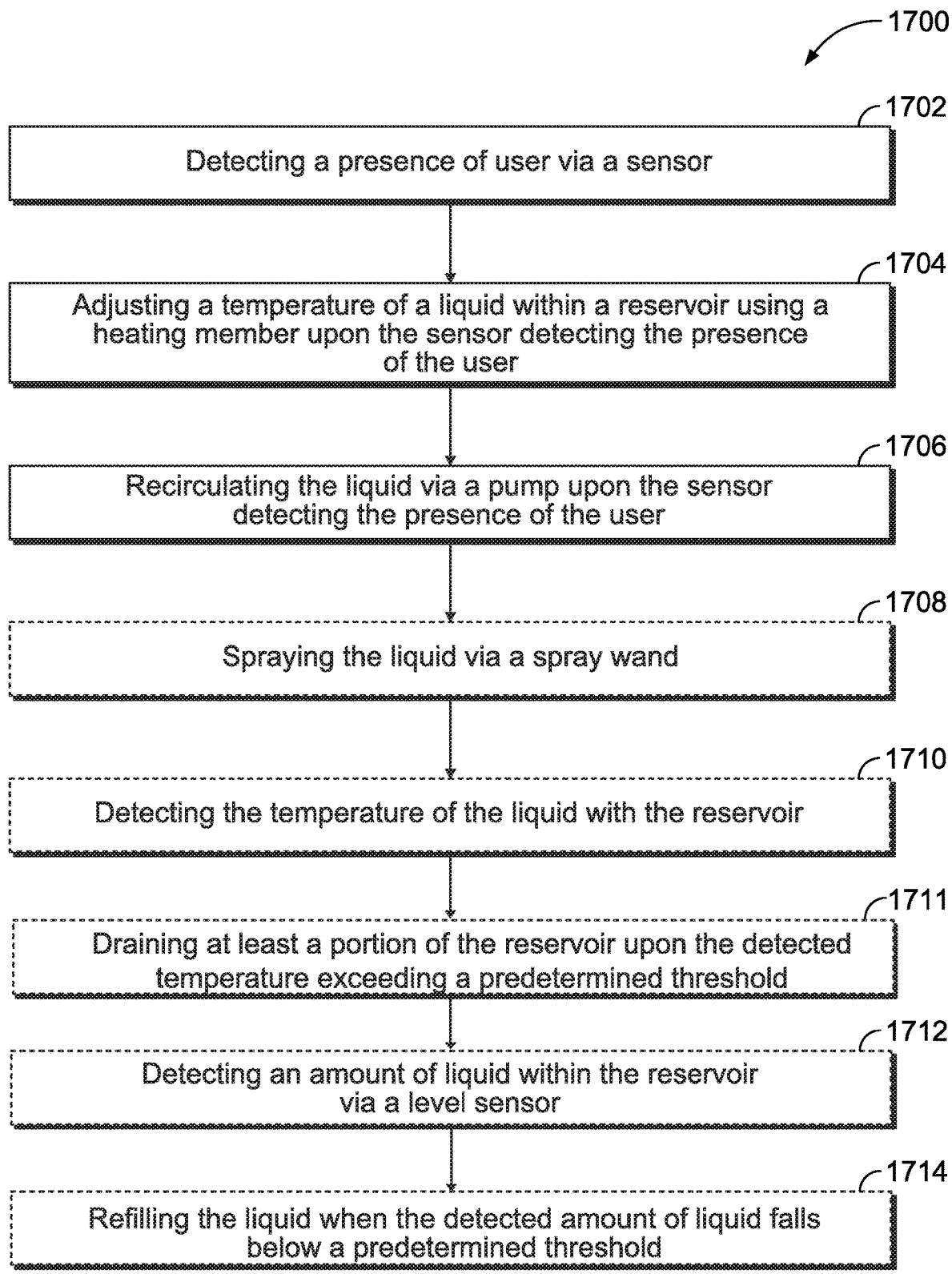
FIG. 17 is a schematic diagram of a method for operating a liquid reservoir system.

As shown in FIG. 17, an example method 1700 of operating the washing apparatus is provided, including the step 1702 of detecting a presence of a user via a sensor, such as sensor 134. Upon detecting the presence of the user, operation of the heater 231 may be adjusted to adjust the temperature of the liquid within the reservoir at step 1704. Additionally, at step 1706, the method includes recirculating the liquid within the reservoir upon the sensor detecting the presence of the user. So configured the method 1700 provides that the liquid within the reservoir be reheated and recirculated before being optionally sprayed from, for example, a spray wand at step 1708. In some forms, the sensor may be an infrared sensor. By another approach, the method 1700 may additionally include the step 1710 of detecting the temperature of the liquid within the reservoir using a temperature sensor. Upon the temperature sensor detecting that the temperature of the liquid has exceeded a predetermined threshold, the control unit (e.g., control unit 124) may be configured to cause the pump to drain at least a portion of the reservoir at step 1712, and optionally refill the reservoir via the inlet thereof. In still another approach, the method may also include step 1712 of detecting an amount of liquid within the reservoir via a level sensor, and step 1714 of refilling the liquid when the detected amount of liquid falls below a predetermined threshold. In some forms, a controller (e.g., controller 150) may be provided to communicate a temperature adjustment signal configured to adjust operation of the heating member to either increase or decrease the temperature of the liquid within the reservoir 204.

Figure 18:
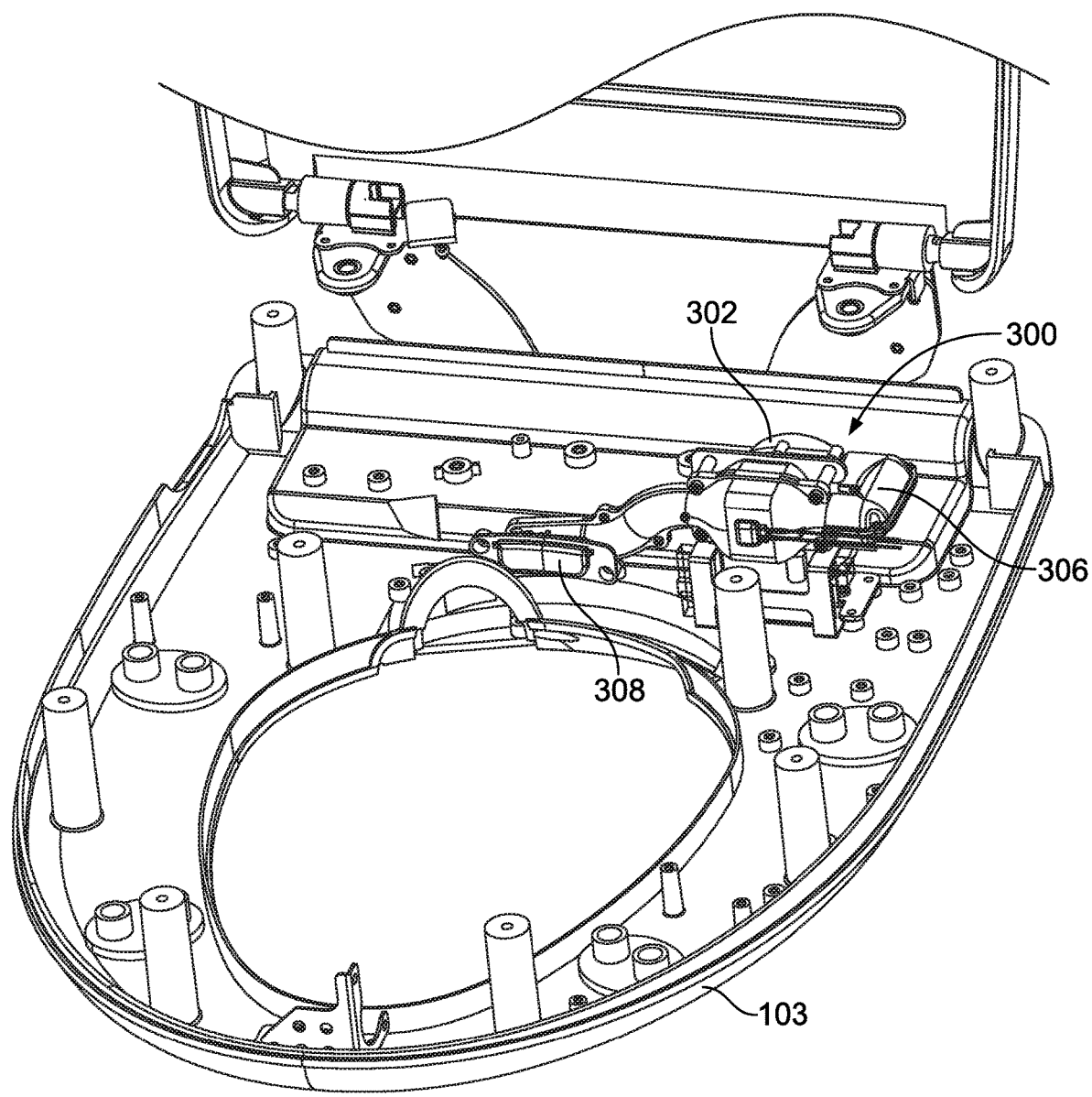
FIG. 18 is a perspective view of the toilet seat assembly of FIG. 2 with various internal components removed to show the drying apparatus having a fan, an elongate conduit, and a heating unit.
Figure 19:
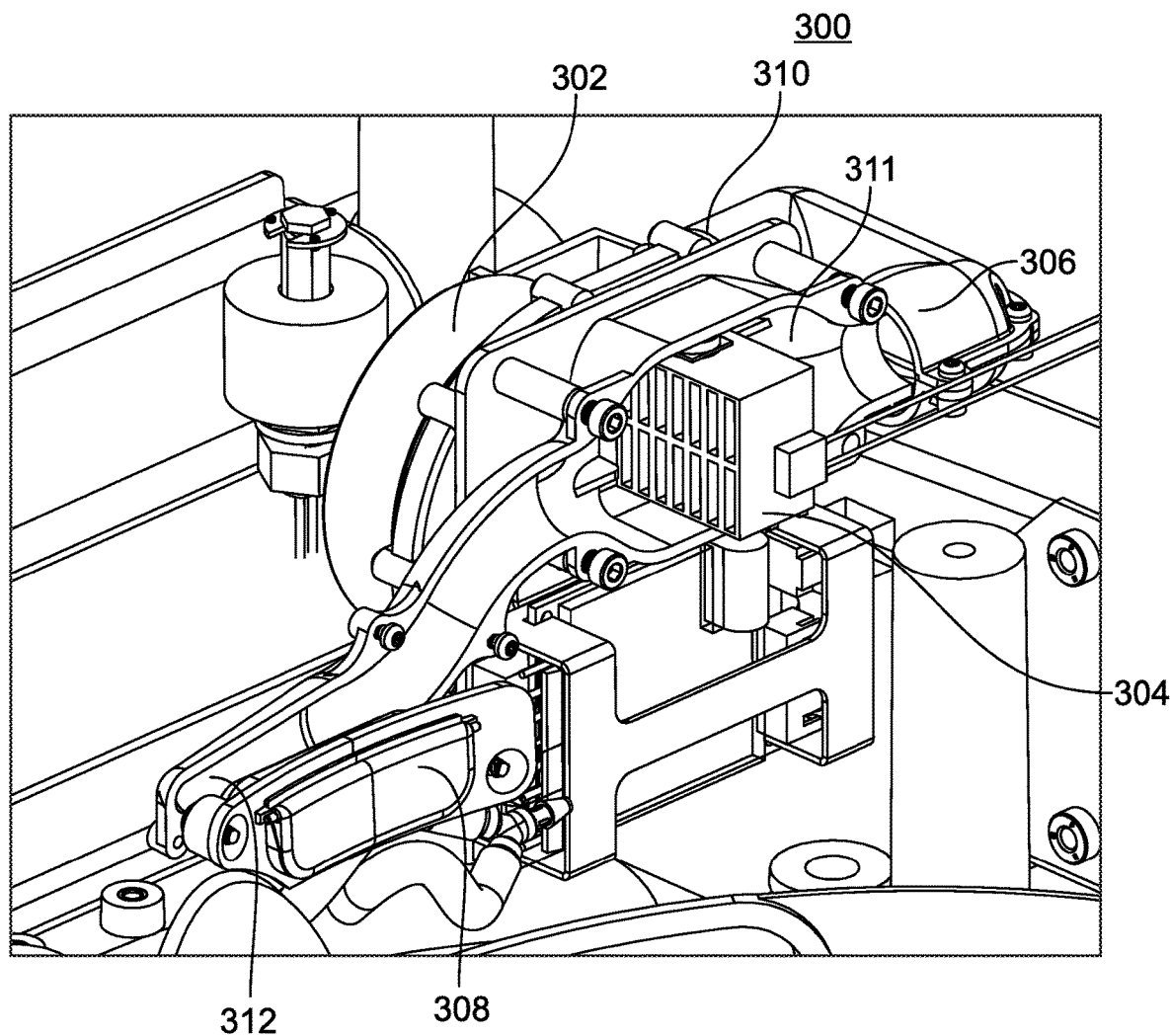
FIG. 19 is a partial perspective cut-away view with a portion of the elongate conduit removed to show the heating unit of the drying apparatus positioned in the elongate conduit for heating the air produced by the fan.

The drying apparatus 300 will be discussed in more detail with respect to FIGS. 18-20. In FIG. 18 various other components of the toilet seat assembly 100 including the housing 104 are removed to show the drying apparatus 300 and the components connected thereto more clearly for simplicity and ease of explanation.

As illustrated, the drying apparatus 300 includes a fan 302, an elongate conduit 306, and a heating unit 304 configured to heat the air produced by the fan 302. In some embodiments, the fan 302 may be an electric impeller blower to provide air at a constant static pressure. The fan 302 is coupled to a first end 310 of the elongate conduit 306 to deliver air therethrough. By one approach, the elongate conduit 306 may be formed at an angle such that water is inhibited from entering the conduit 306 and otherwise interfering with operation of the drying apparatus 300. The heating unit 304, as shown in FIGS. 19 and 20, is positioned in an enlarged portion 311 of the elongate conduit 306 to heat the air to a predetermined temperature before the air is delivered to the perineal region of the user from a second end 312 of the elongate conduit 306. In some forms, the heating unit 304 may be a positive temperature coefficient heater. So configured, the heating unit 304 may be formed of, for example, a ceramic material to provide self-regulation heating characteristics.

The drying apparatus 300 may further include a thermistor or temperature sensor positioned proximate the nozzle 303 of the drying apparatus 300 such that a temperature of the air may be measured. Based at least in part on the measured temperature, the control unit 124, or a separate control circuit board 319 (FIG. 20) coupled to the drying apparatus 300, may be configured to alternate the amount of power supplied to the heating unit 304 to deliver temperatures (e.g., a cyclic high/low temperature pattern) to improve user comfort and reduce heat buildup on the perineal region of the user.

As shown, the drying cover 308 described above is hingedly coupled to a portion of the seat base 102 and covers the second end 312 of the conduit 306 such that the pressure from the air will blow and hold open the drying cover 308 while the air is being delivered therefrom. As described above, the drying apparatus 300 is configured to be controlled by the controller 150 of the toilet seat assembly 100. For example, the controller 150 may turn the fan 302 on or off, adjust the speed of the fan 302, and adjust the temperature of the heating unit 304 depending on the user input received at the user interface 154 of the controller 150. Additionally or alternatively, the user may set a drying time period (i.e., a length of time the drying apparatus is blowing air) via the user interface 154 of the controller 150.

Figure 20:
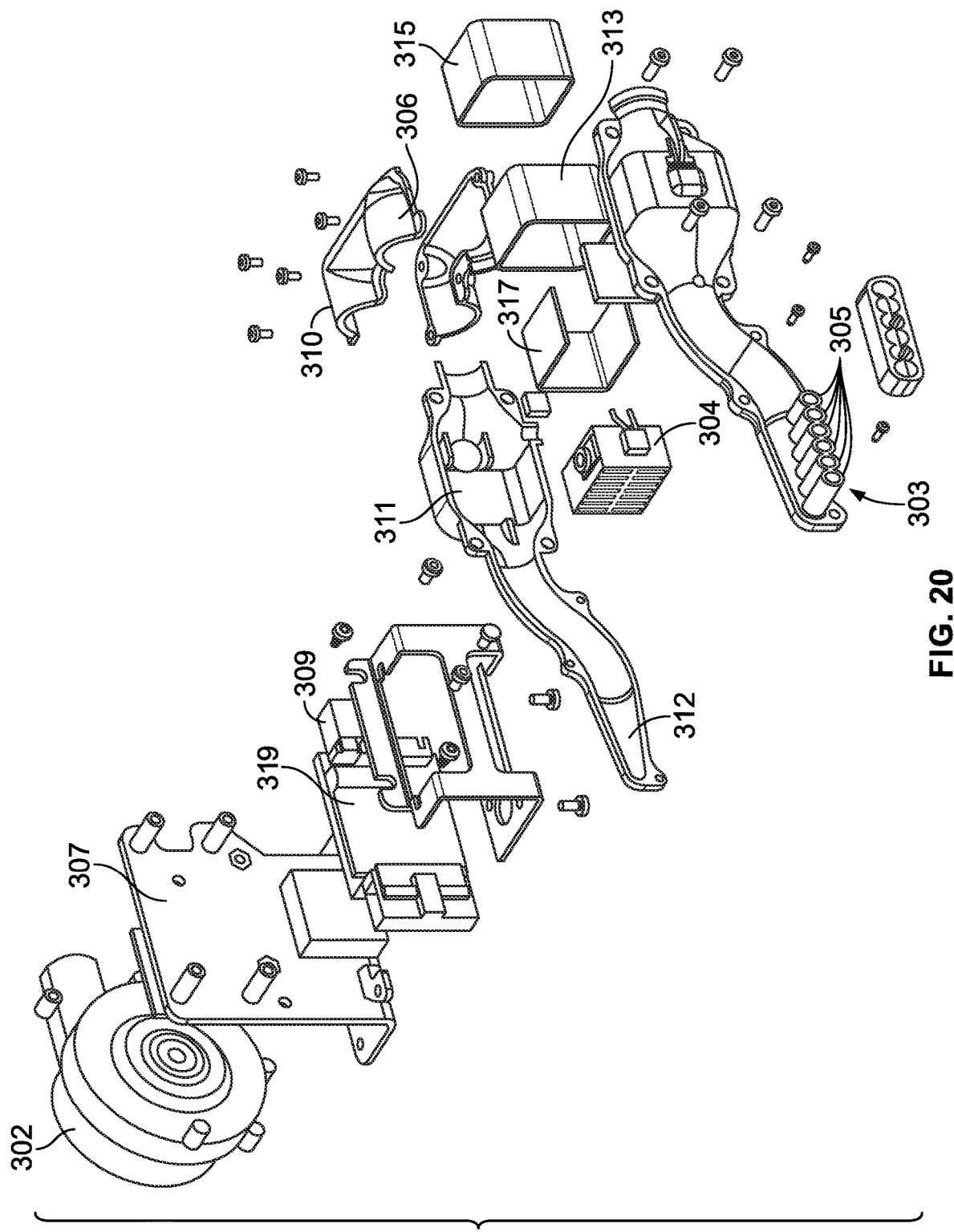
FIG. 20 is an exploded view of the drying apparatus shown in FIG. 18.

In FIG. 20, an exploded view of the drying apparatus 300 is provided showing the individual components thereof in more detail. For example, the nozzle 303 located behind the drying cover 308 in FIG. 19 is shown having a plurality of ports 305 for even distribution of air to the perineal region after a cleaning operation. Additionally, the air velocity may be increased at the nozzle 303 by restricting air flow through the smaller, individual ports 305. Various struts and baffles 307, 309 supporting the drying apparatus 300 components, and the control circuit board 319 for the drying apparatus 300 are shown. Insulation layers 313, 315, 317 also may be included and positioned proximate the heating unit 304 when the drying apparatus 300 is assembled to inhibit the heating unit 304 from overheating or damaging other components.

Figure 21:
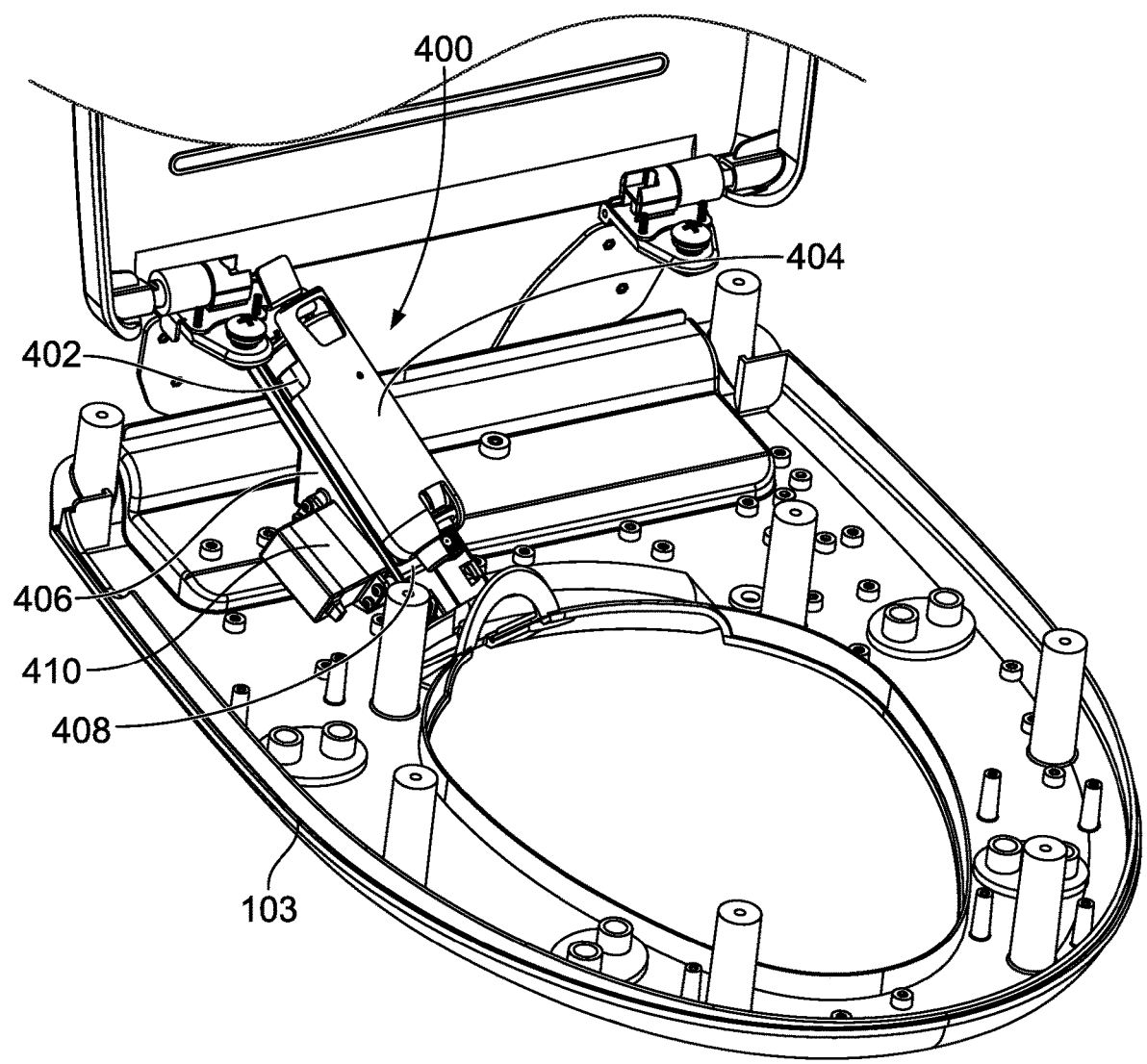
FIG. 21 is a perspective view of the toilet seat assembly of FIG. 2 with various internal components removed to show the spray canister device having a spray canister, a canister housing, a tray, a chassis, and a motor.

The spray canister device will be discussed in more detail with respect to FIGS. 21 and 22. In FIG. 21, various other components of the toilet seat assembly 100 including the housing 104 are removed to show the spray canister device 400 and the components connected thereto more clearly for simplicity and ease of explanation. As discussed above, the spray canister device for use in connection with the disclosed toilet seat assembly is more fully disclosed in U.S. application Ser. No. 16/426,436, filed on May 30, 2019, the disclosure of which is incorporated herein by reference in its entirety.

As shown in FIG. 21, the spray canister device 400 includes a canister 402 containing a liquid product, a canister housing 404 having an opening, a chassis element 406, and a tray 408 slidably coupled to the chassis element 406. A motor 410, which may be operated by the controller 150 of the toilet seat assembly 100, may be operatively coupled to the tray 408 to slidably move the tray 408 between a retracted position within the seat base 102 and an extended position extending outward from an opening in these seat base 102. So configured, the canister housing 404 and canister 402 positioned therein may be moved with the tray 408 between the retracted position and the extended position such that the liquid product may be sprayed onto the perineal region of a user. In some forms, the spray canister device 400 may be configured to spray the liquid product after the perineal region of the user has been washed and dried by the washing apparatus 200 and the drying apparatus 300, respectively.

For example, the liquid product configured to be delivered by the spray canister device 400 may comprise, but is not limited to, one or more of skin protectants, ointments, creams, zinc oxide, calamine, barrier solutions, cleaning solutions, moisturizers, skin sealants, water, medicaments, cleaning solutions, among others. In some approaches, the liquid product is a barrier solution such that the barrier solution may be applied to the perineal region of a user to protect the user's skin and inhibit excessive moisture after cleaning via, for example, the washing apparatus 200.

Figure 22:
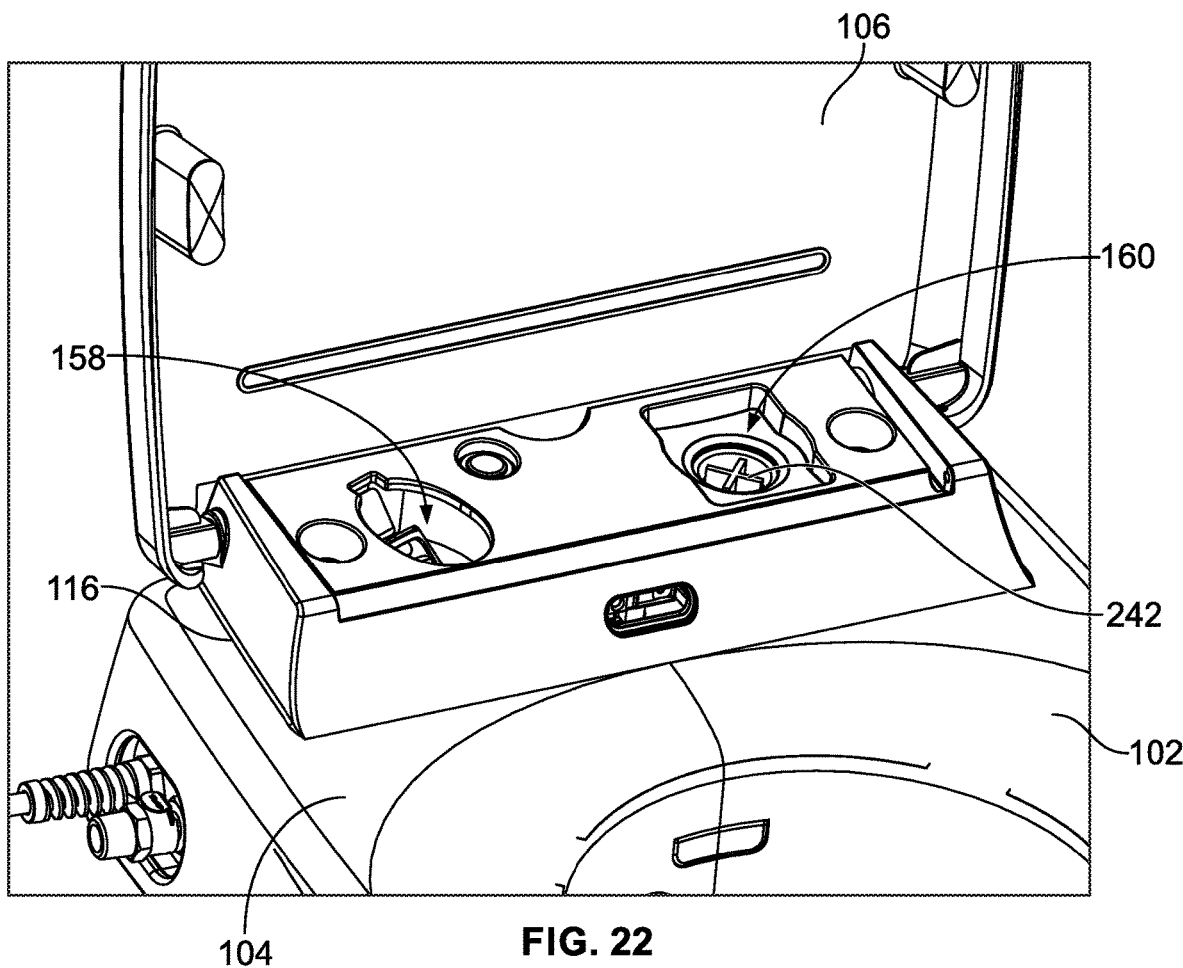
FIG. 22 is a partial perspective view of a rear portion of the housing of the toilet seat assembly of FIG. 1 with the maintenance cover removed to show an aperture for installing the spray canister and canister housing, a valve for refilling the cleanser assembly, and a service button.

FIG. 22 shows the rear portion 116 of the housing 104 of the seat base 102 with the maintenance cover 114 removed to show multiple apertures thereunder. As described above, the maintenance cover 114 is configured to be moved via a hinge or pivot point between a closed position and an open position. Underneath the maintenance cover 114, there is an aperture 158 permitting access to the interior of the seat base 102 for installation and removal of the spray canister 402 and spray canister housing 404. By one approach, the aperture 158 is shaped to facilitate insertion of the canister housing 404 and canister 402 in the seat base 102 for engagement with the tray 408 positioned therein. For example, the aperture 158 may be shaped to correspond with the shape of the canister housing 404 to only permit the canister housing 404 and canister 402 to be inserted in the seat base 102 in a desired orientation, thus simplifying the installation for the user.

The cleanser valve 242 of the cleanser reservoir 206 is also shown positioned in a recessed portion 160 of the housing 104. In order to refill the cleanser reservoir 206, the maintenance cover 114 may be pivoted open and a fill bottle may be used to fill the reservoir 206 as described above. The toilet seat assembly 100 also may include a service button 162 or switch as shown in FIG. 22. Upon actuation of the service button 162, the control unit 124 of the toilet seat assembly 100 may perform one or more service operations including, for example, moving the spray wand 202 to the extended position for cleaning, illuminating bactericidal light on the spray wand 202 via the bactericidal light sources 276, rinsing the spray wand 202, among others.

Figure 23A:
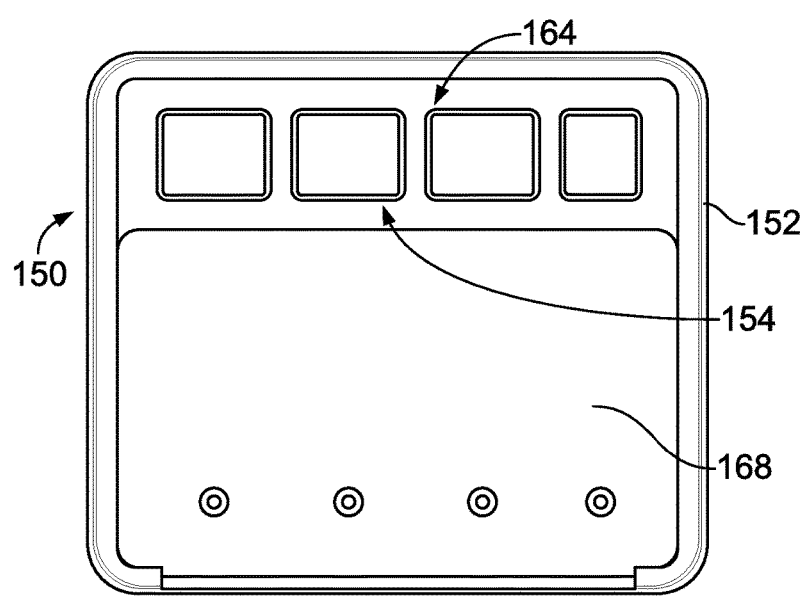
FIG. 23A is a front elevational view of a controller associated with the toilet seat assembly to control operation thereof, the controller including a flip cover.
Figure 23B:
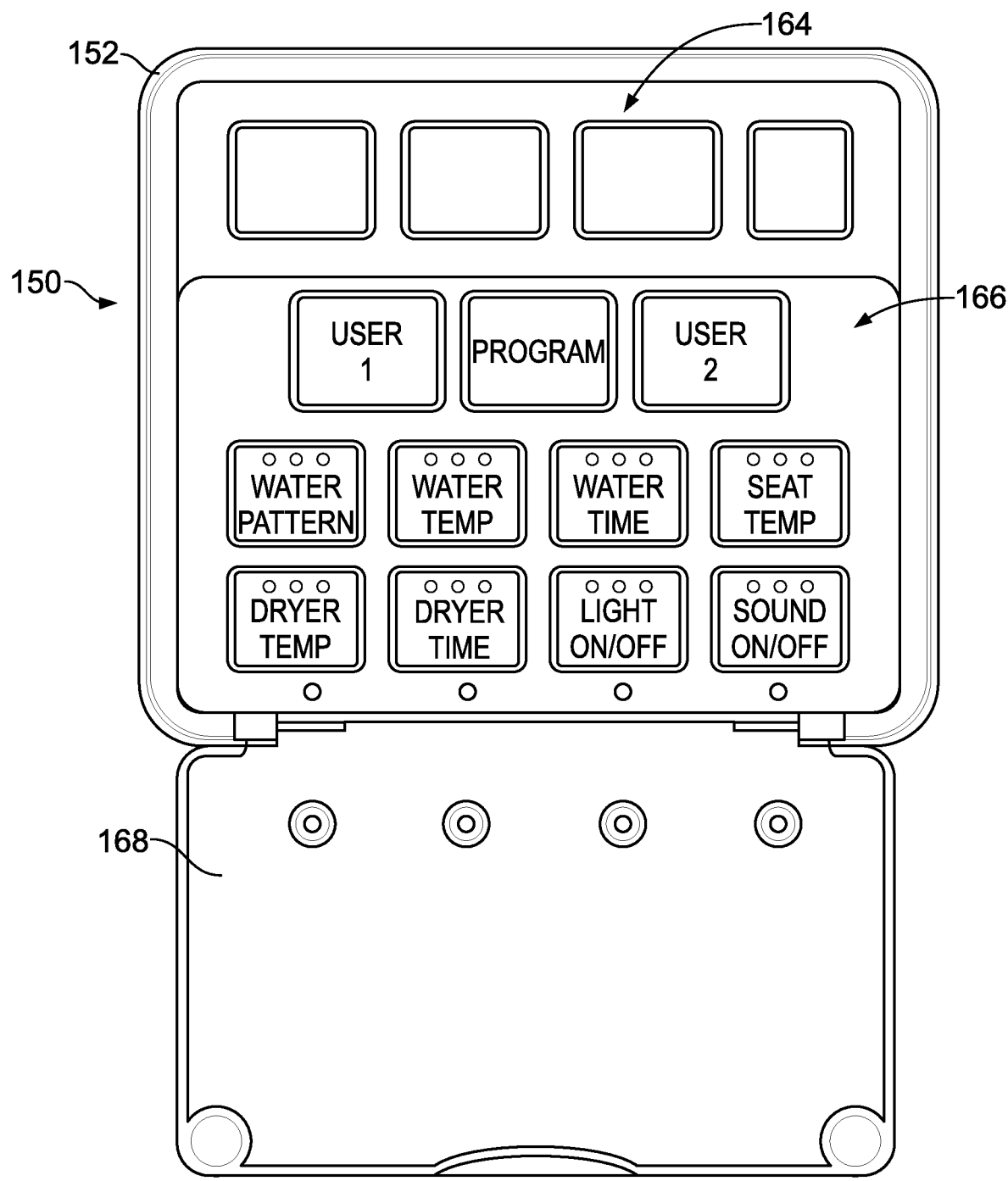
FIG. 23B is a front elevational view of the controller of FIG. 23A showing the flip cover in an open position revealing additional buttons for controlling the toilet seat assembly.

Referring now to FIGS. 23A through 23G, the controller 150 associated with the toilet seat assembly 100 is provided for controlling various operations of the toilet seat assembly 100. As illustrated in FIG. 23A, the controller 150 is in the form of remote control 152 including various buttons, such as primary buttons 164, for adjusting features of the toilet seat assembly 100, and the controller 150 includes or is operatively coupled to user interface 154. In other embodiments, the controller 150 may be, for example, a wall-mounted display including a touch screen, a mobile communication device (e.g., a cellular phone or smart phone), or any other remote control. The controller 150 may be connected to the toilet seat assembly 100 via either a wireless or wired connection.

As shown in FIG. 23B, the user interface 154 of the controller 150 includes primary buttons 164 and secondary buttons 166 concealed by a cover, such as flip cover 168 configured to be pivoted open. In alternative forms, the cover could be a sliding cover and may cover either the primary buttons 164 and the secondary buttons 166, just the primary buttons 164, or just the second buttons 166. In still other forms, the controller 150 may not include a cover.

The primary buttons 164 and the secondary buttons 166 may be positioned on a recessed portion of a front panel of the controller 150 such that the flip cover 168, when in the closed position, covers the secondary buttons 166 and the surface of the flip cover 168 remains substantially flush with the front panel as shown in FIG. 23A. Each primary button 164 may correspond with operation of the washing apparatus 200, the drying apparatus 300, and/or the spray canister device 400.

The secondary buttons 166 may, for example, adjust the features of each component of the toilet seat assembly 100 as described respectively above, including adjusting the positioning of the spray wand 202, the temperature of the water, the pattern setting, the duration of the pattern setting, the amount of liquid sprayed from the spray wand 202, the temperature of heater for the seat base 102, the temperature of the air blown by the drying apparatus 300, the duration of time the air is blown by the drying apparatus 300, turning the sound of the speaker on or off, and/or turning the light associated with the toilet seat assembly 100 on or off. By way of example, the "water pattern" secondary button may have multiple modes corresponding with various pattern settings described above including the patterns show in FIGS. 12A-C and FIGS. 13A-C. In some embodiments, where the water pattern button has three modes, the pattern settings may be configured for cleaning of the female anatomy, cleaning of the male anatomy, and cleaning of the anal area. Additionally, the "water time" secondary button may have various modes that adjust the duration of the pattern settings such that the number of cycles of each individual pattern may be adjusted.

Both the primary buttons 164 and the secondary buttons 166 may include braille thereon to assist visually impaired users in operating the controller 150. FIGS. 23C through 23G show various additional views of the controller 150 such as a top surface 180, a right-side surface 181, and a left-side surface 182

The controller 150 may additionally include one or more indicators or LEDs for conveying information regarding operation of the toilet seat assembly 100 to a user. For example, the indicator may be in the form of an LED similar to the LED 144 of the auxiliary user interface. For example, upon one of the sensors in the water reservoir 204 or the cleanser reservoir 206 detecting that the level of cleanser/water is low, the LED on the controller 150 may be illuminated to indicate the same to the user. In some forms, different colored LEDs may be used for each sensor such that one color may indicate that the liquid in the water reservoir 204 is low and another color may indicate that the liquid in the cleanser reservoir 206 is low. Additionally or alternatively, the indicator may be illuminated to indicate a problem or error in the system to the user. In embodiments of the controller 150 including an indicator, the flip cover 168 may include apertures or window therethrough to visually indicate the indicator to a user.

In other embodiments, the indicator may be in the form of a digital screen interface of the controller 150. In such forms, the screen interface may, for example, display a graphical representation of the amount of water and cleanser in the water and cleanser reservoirs 204, 206 respectively.

An alternative embodiment of a controller 1150 is shown in FIGS. 24A through 24E. Specifically, the controller 1150 is shown including flip cover 1168 hingedly coupled to the controller 1150 and configured to cover one or more secondary buttons 1166 when the flip cover 1168 is in a closed position. Unlike flip cover 168 of controller 150, the flip cover 1168 is configured to cover the front surface of the controller 1150 and includes a window such that the primary buttons 1164 may be seen therethrough. As illustrated, the controller 1150 further includes primary buttons 1164 that, upon actuation, may correspond with operation of the washing apparatus 200, the drying apparatus 300, and/or the spray canister device 400. The controller 1150 and the controller 150 are substantially similar in all respects, such as operation thereof, unless otherwise discussed herein. FIGS. 24C through 24E show various additional views of the controller 1150 such as a top surface 1180, a right side surface 1181, and a left-side surface 1182.

Figure 25:
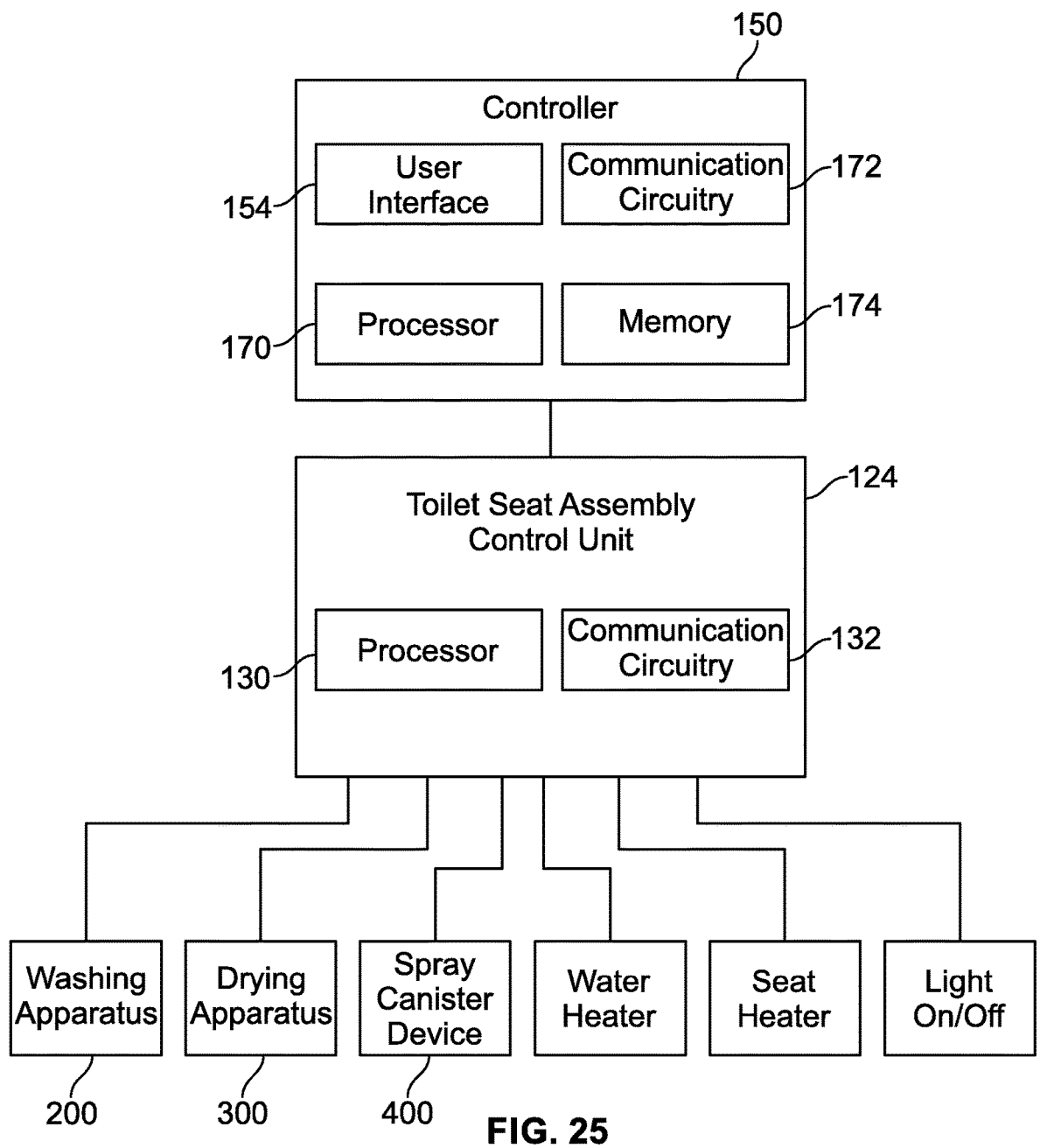
FIG. 25 is a schematic diagram of the controller, a control unit of the toilet seat assembly, and example components of the toilet seat assembly that the control unit is configured to control.

Referring now to FIG. 25 showing a schematic diagram of a control scheme of the toilet seat assembly 100, the controller 150 further includes a processor 170, communication circuitry 172, and a memory 174, and is configured to be programmed to store desired user settings. For example, the user may enter a "program" mode for one or more selected profiles to select the desired settings such as water temperature, air temperature, among others. The processor 170 of the controller 150 may be configured to store the profiles in the memory 174 thereof such that different users of the toilet seat assembly 100 may utilize different settings depending on their profile. For example, one user may program a specific water and/or cleanser delivery pattern (e.g., the spray wand 202 extends, and rotates side-to-side while spraying as it is retracted to clean the user's perineal region with complete coverage).

The communication circuitry 172 of the controller 150 is configured to communicate with the communication circuitry 132 of the control unit 124 in the toilet seat assembly 100 in order to control operation thereof. For example, the communication circuitry 172 of the controller 150 may be configured to communicate one or more control signals to the communication circuitry 132 of the control unit 124 to cause operation of the washing apparatus 200, the drying apparatus 300 and/or the spray canister device 400. As illustrated, the control unit 124 is configured to cause operation of one or more of the washing apparatus 200, the drying apparatus 300, the spray canister device 400, the water heater, the seat heater, the seat base light, among others via one or more control signals from the controller 150.

An example operation of the washing apparatus 200 with respect to FIGS. 23B and 25 will now be described. The user may first select a water pattern, water time, water temp, and/or other desired settings via the secondary buttons 166 of the user interface 154 and then interact with a primary button 164 configured to cause operation of the washing apparatus 200. The processor 170 of the controller 150 (when the user interacts with the user interface 154 of the controller 150) is configured to cause the communication circuitry 172 to communicate a control signal to the control unit 124 of the toilet seat assembly 100. Upon receiving the control signal, the control unit 124 is configured to cause operation of the washing apparatus 200 based at least in part on the selected settings of the user. So configured, the user may control each included aspect of the toilet seat assembly 100 via the controller 150.

As shown in FIGS. 26-29, the toilet seat assembly 100 also optionally includes a bracket assembly 500 for attaching the toilet seat assembly 100 to an existing toilet bowl and water tank structure. For example, the lid of an existing toilet bowl may be removed, and the toilet seat assembly 100 may be affixed therein via the bracket assembly 500, as described below. In some configurations, the bracket assembly 500 is further configured to facilitate attachment to a grab bar assembly 502 for assisting individuals to either sit down on, or stand up from, the toilet seat assembly 100. In addition, the bracket assembly 500 may include hinges 504 for facilitating cleaning of an underside of the seat base 102, as discussed in further detail below.

Figure 26:
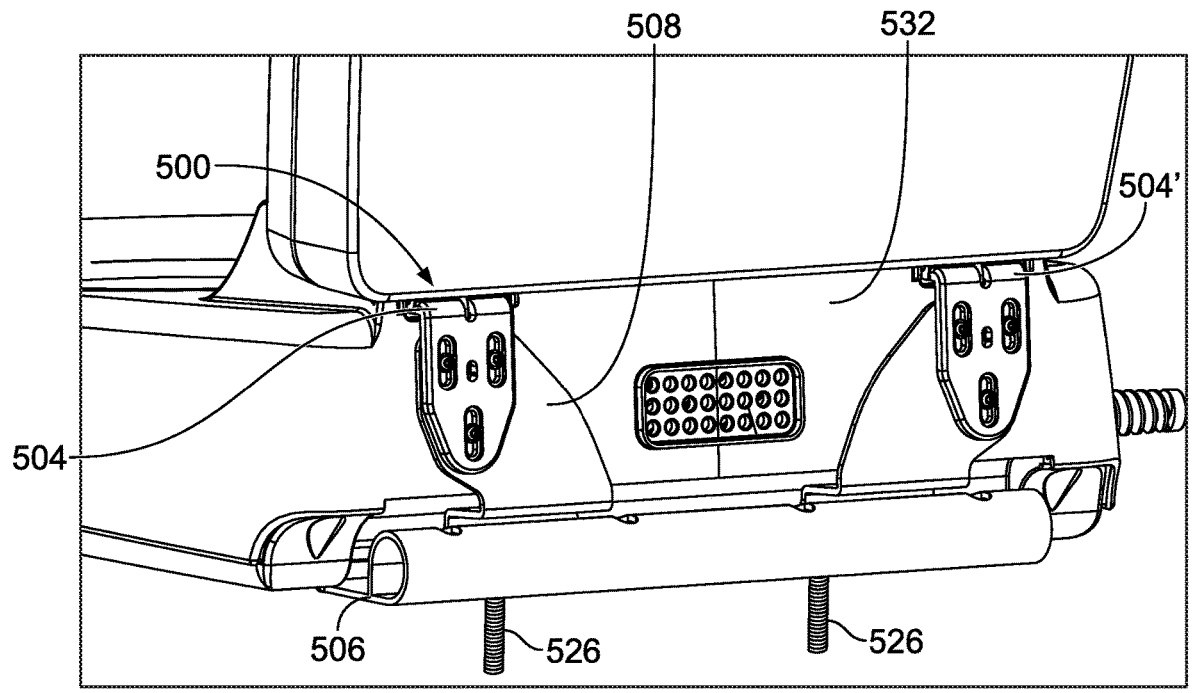
FIG. 26 is a partial perspective view of a rear side of the toilet seat assembly of FIG. 1 showing a bracket assembly coupled to a portion thereof, the bracket assembly including threaded fasteners to attach the toilet seat assembly to an existing toilet bowl structure.

FIG. 26 shows the bracket assembly 500 attached to the rear portion 116 of the seat base 102 with the toilet bowl and water tank removed. As shown, the bracket assembly 500 includes a base plate 506, an arm plate 508, and a pair of adjustable hinges 504, 504'. The bracket assembly 500 may be coupled to the seat base 102 of the toilet seat assembly 100 via threaded fasteners 510, as shown in FIG. 2. The threaded fasteners may be, for example, screws, and may be secured to threaded apertures (not shown) positioned in the seat base 102 to couple the bracket assembly 500 to the toilet seat assembly 100. Once the bracket assembly 500 is coupled to the toilet seat assembly 100, the bracket assembly 500 may be attached to an existing toilet bowl as described below.

Figure 27A:
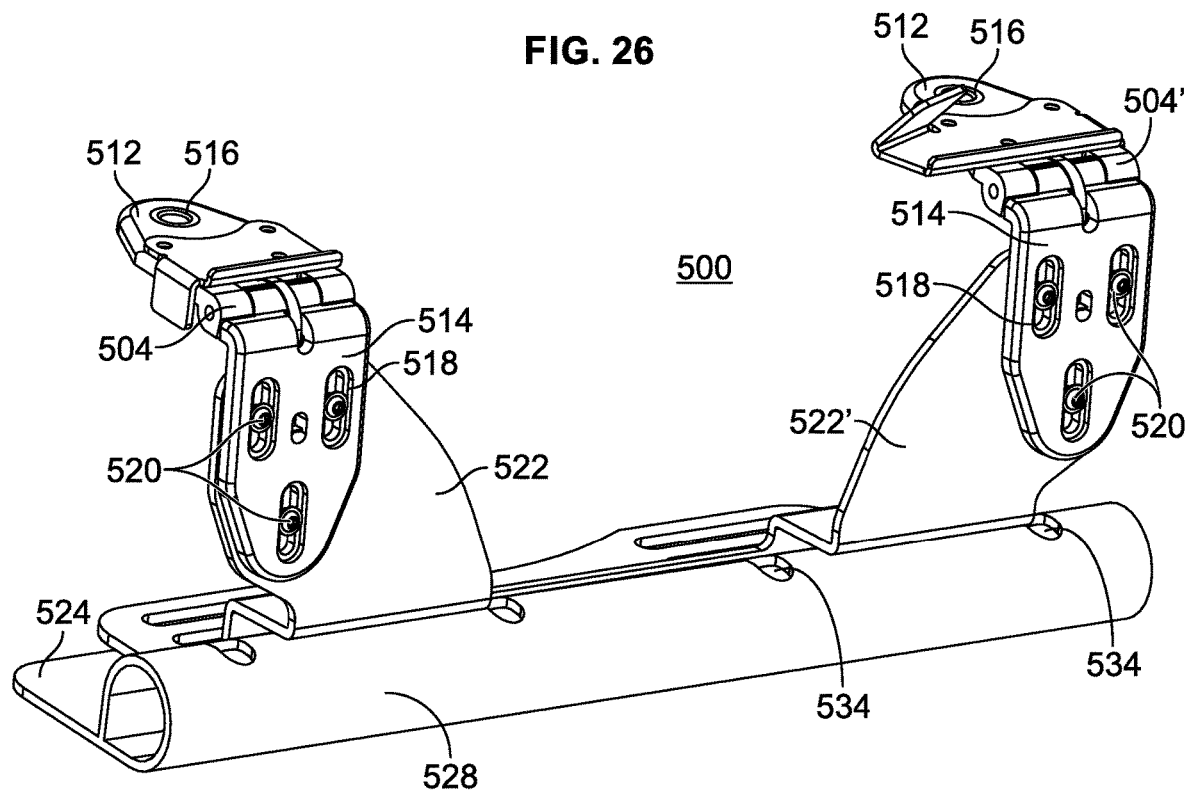
FIG. 27A is a perspective view of the bracket assembly of FIG. 26 removed from the toilet seat assembly, the bracket assembly including a base plate having a flat portion and a sleeve portion for receiving one or more grab bars, an arm plate having a base portion and two arms, and a pair of hinges each having an adjusting portion and a mounting portion.
Figure 27B:
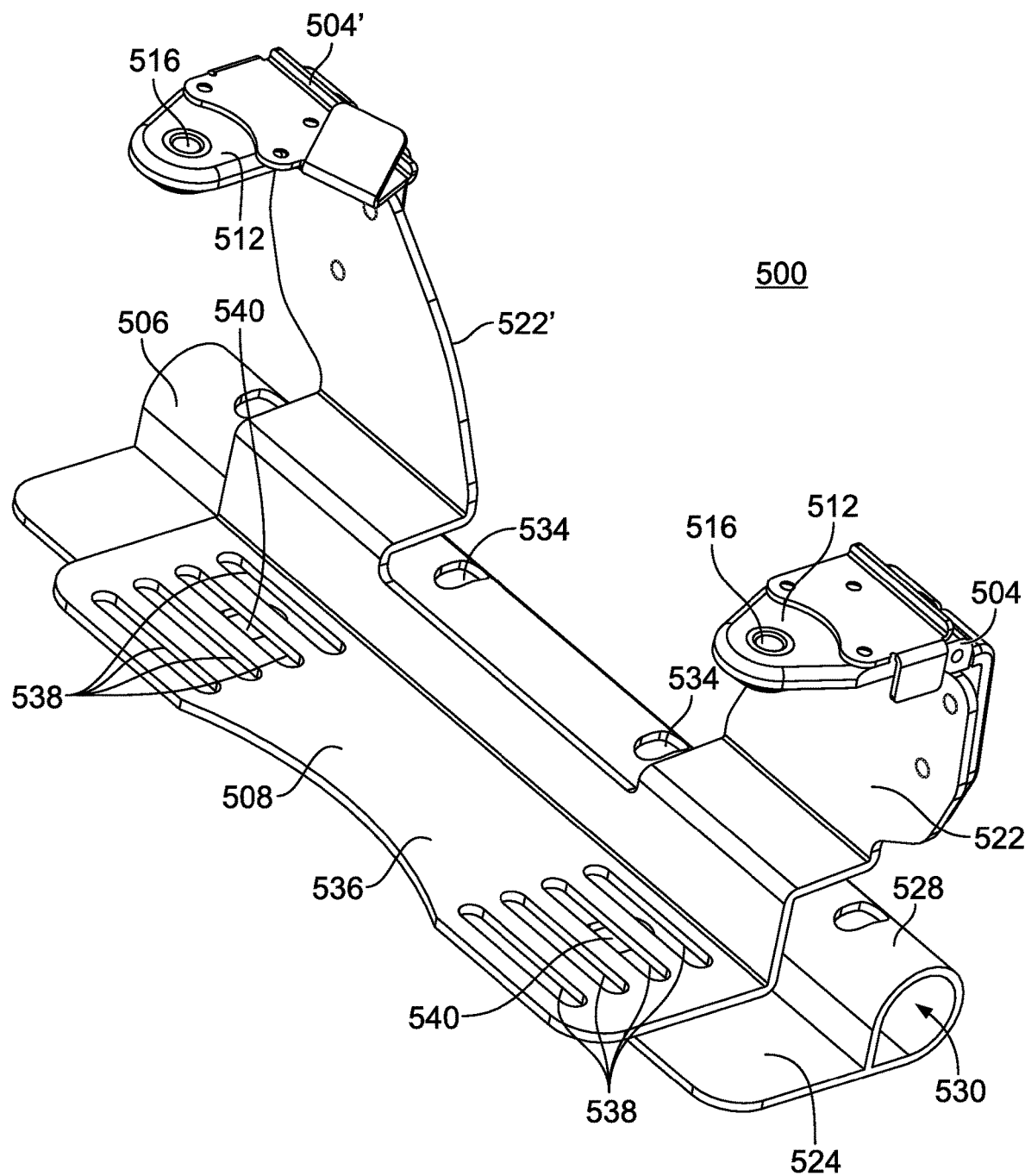
FIG. 27B is a perspective view of an opposite side of the bracket assembly of FIG. 27A showing slots of the base portion of the arm plate for adjusting the positioning of the toilet seat assembly.
Figure 27C:
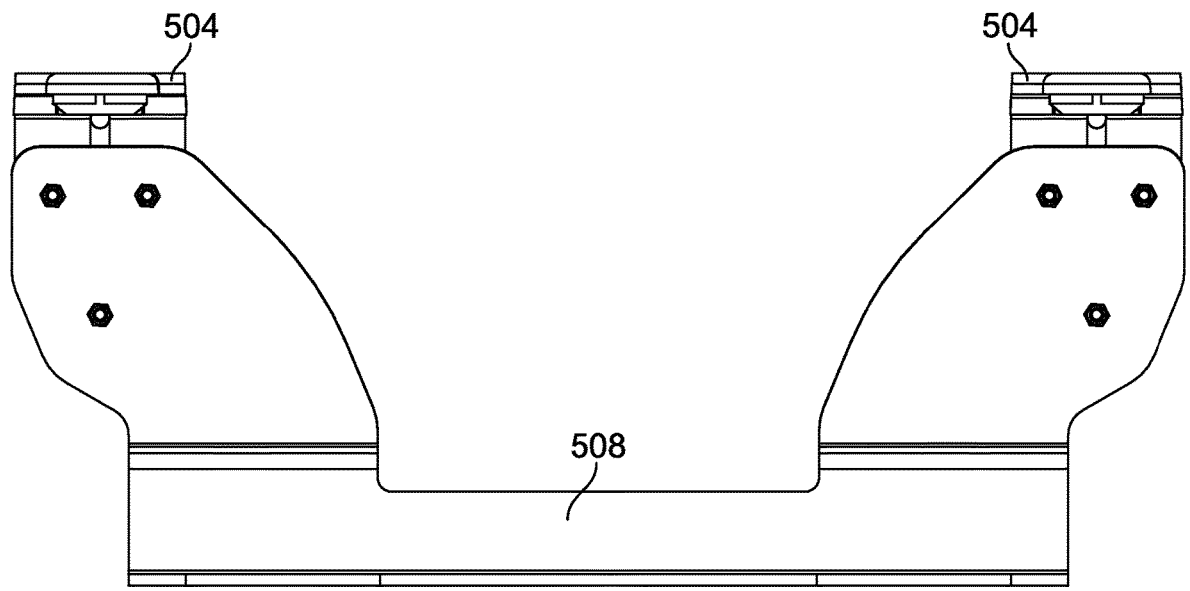
FIG. 27C is a front-side elevational view of the bracket assembly of FIG. 27A not including the base plate.
Figure 27D:
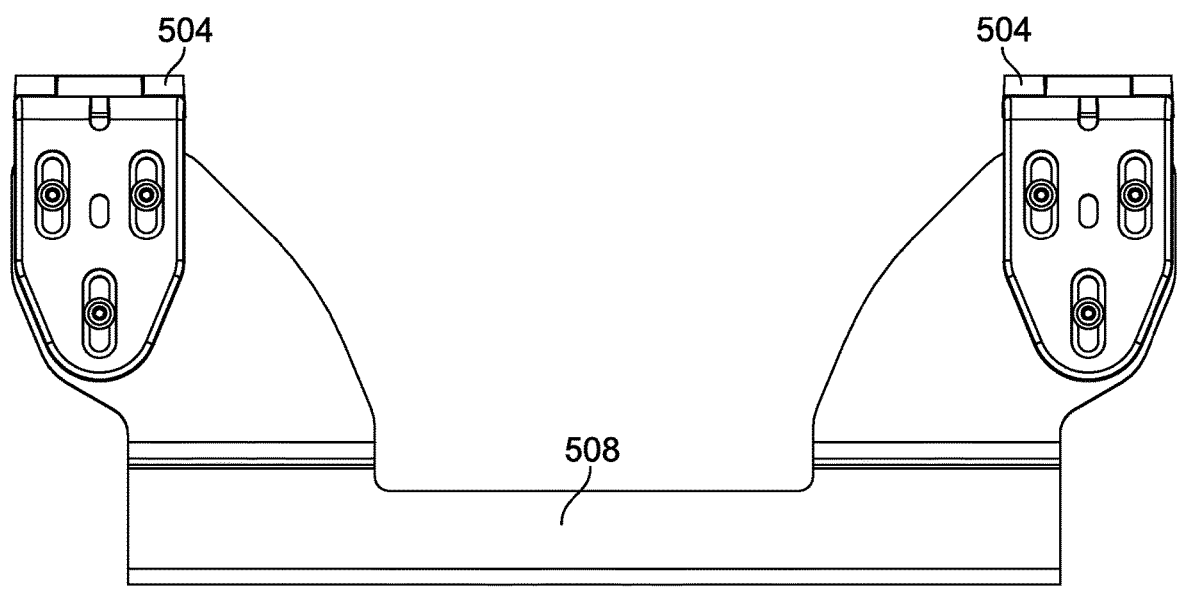
FIG. 27D is a rear-side elevational view of the bracket assembly of FIG. 27A not including the base plate.
Figure 27E:
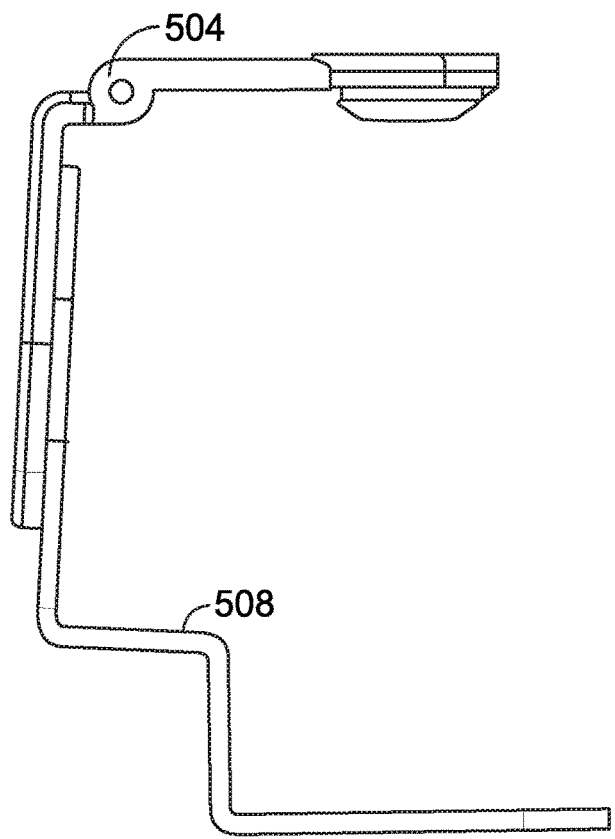
FIG. 27E is a left-side elevational view of the bracket assembly of FIG. 27A not including the base plate.
Figure 27F:
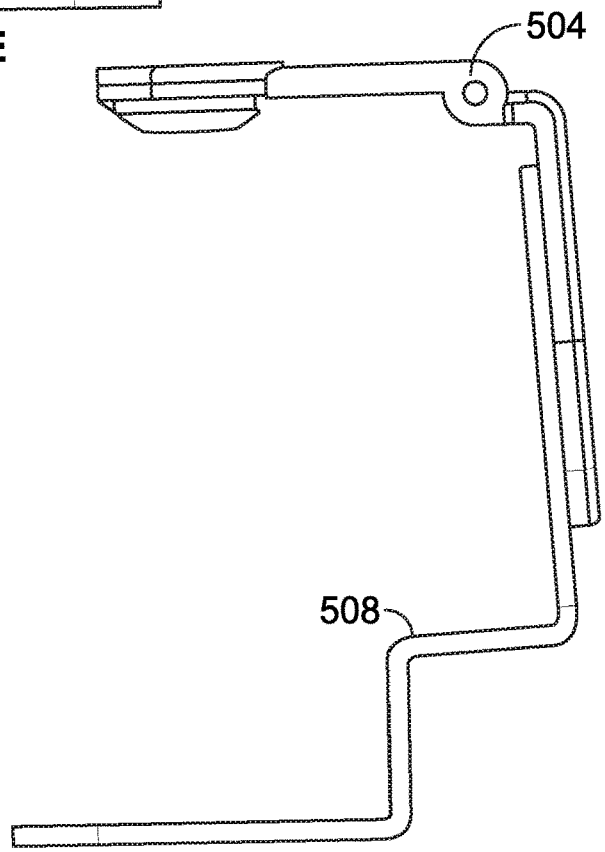
FIG. 27F is a right-side elevational view of the bracket assembly of FIG. 27A not including the base plate.

FIGS. 27A and 27B show perspective views of a front side and a back side of the bracket assembly 500. As shown in FIG. 27A, the bracket assembly 500 includes two hinges 504, 504'. In other embodiments, the bracket assembly 500 may include more than two hinges. As illustrated, each hinge 504, 504' has a mounting portion 512 and an adjusting portion 514. Each mounting portion 512 includes an aperture 516 to receive a threaded fastener 510 for coupling to a structure inside the seat base 102 as described above. Each adjusting portion 514 includes one or more slots 518 configured to receive threaded fasteners 520 therethrough to secure the adjusting portion 514 to an arm 522 of the arm plate 508. So configured, the adjusting portion 514 may be adjusted such that the threaded fasteners 520 are secured in a different portion of the one or more slots 518 to adjust the height of the bracket assembly 500 to facilitate attachment to different sized existing toilet bowls.

As shown in FIGS. 27A and 27B, the base plate 506 typically includes a substantially flat portion 524 including one or more apertures for accepting threaded fasteners 526 (shown in FIG. 26) and a sleeve portion 528 extending from the flat portion 524, the sleeve portion 528 having an aperture 530 extending therethrough along an axis parallel to a rear surface 532 of the seat base 102. As illustrated, the sleeve portion 528 of the seat base 102 includes apertures 534 therethrough, transverse the aperture 530, at spaced intervals to receive threaded fasteners or biasing pins (not shown). The apertures 534 will be discussed in more detail with respect to FIG. 28.

The arm plate 508 includes a base portion 536 configured to be positioned adjacent the flat portion 524 of the base plate 506, and the arm plate 508 additionally includes two arms 522, 522'. The base portion 536 includes several slots 538, similar to the adjusting portion 514 of the hinges 504, 504', to adjust the positioning of the bracket assembly 500. The slots 538 may be positioned such that the toilet seat assembly 100 may be placed in a desired position, and thereafter, the threaded fasteners 526 may be advanced therethrough and through apertures 540 of the flat portion 524 of the base plate 506 to secure the toilet seat assembly 100 to the toilet bowl. The arms 522, 522' extend upward, and outward over the sleeve portion 528 of the base plate 506 such that the arms 522, 522' are supported thereon as shown in FIG. 27B.

Once the toilet seat assembly 100 has been secured to the existing toilet bowl via the bracket assembly 500, the positioning of the hinges 504, 504' secured higher up on the rear portion 116 of the seat base 102 permits the entire toilet seat assembly 100 to pivot about the hinges 504, 504' such that the toilet seat assembly 100 is pivoted upwards and parallel to the water tank of the existing toilet to facilitate access to the underside of the seat base 102 for servicing or cleaning. FIGS. 27C through 27H show additional example views of the bracket assembly 500 and do not include the base plate 506.

Figure 28:
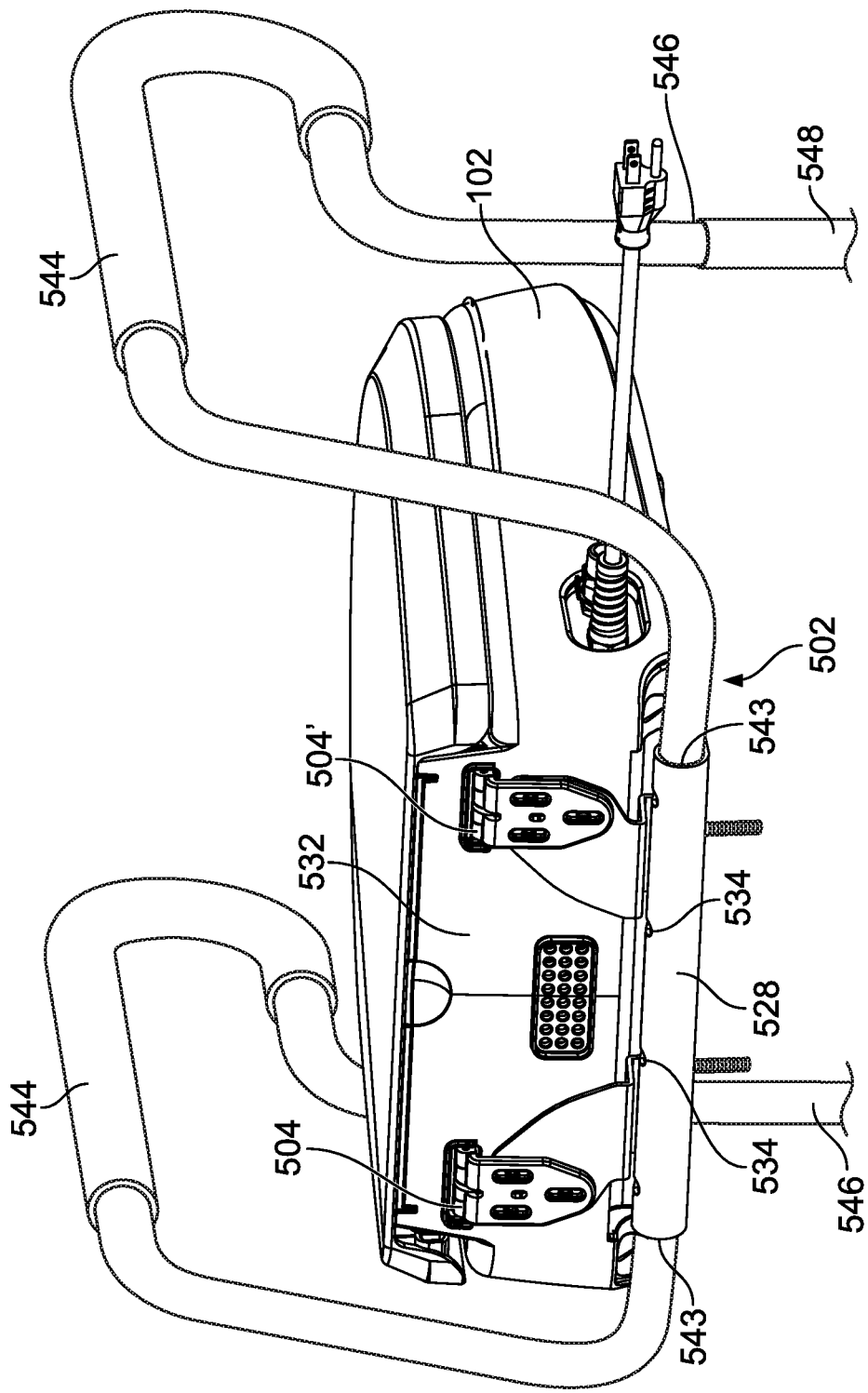
FIG. 28 is a perspective view of the rear side of the toilet seat assembly with the bracket assembly attached and a pair of grab bars coupled thereto at a first end thereof for assisting individuals sit down on, and stand up from, the toilet seat assembly.
Figure 29:
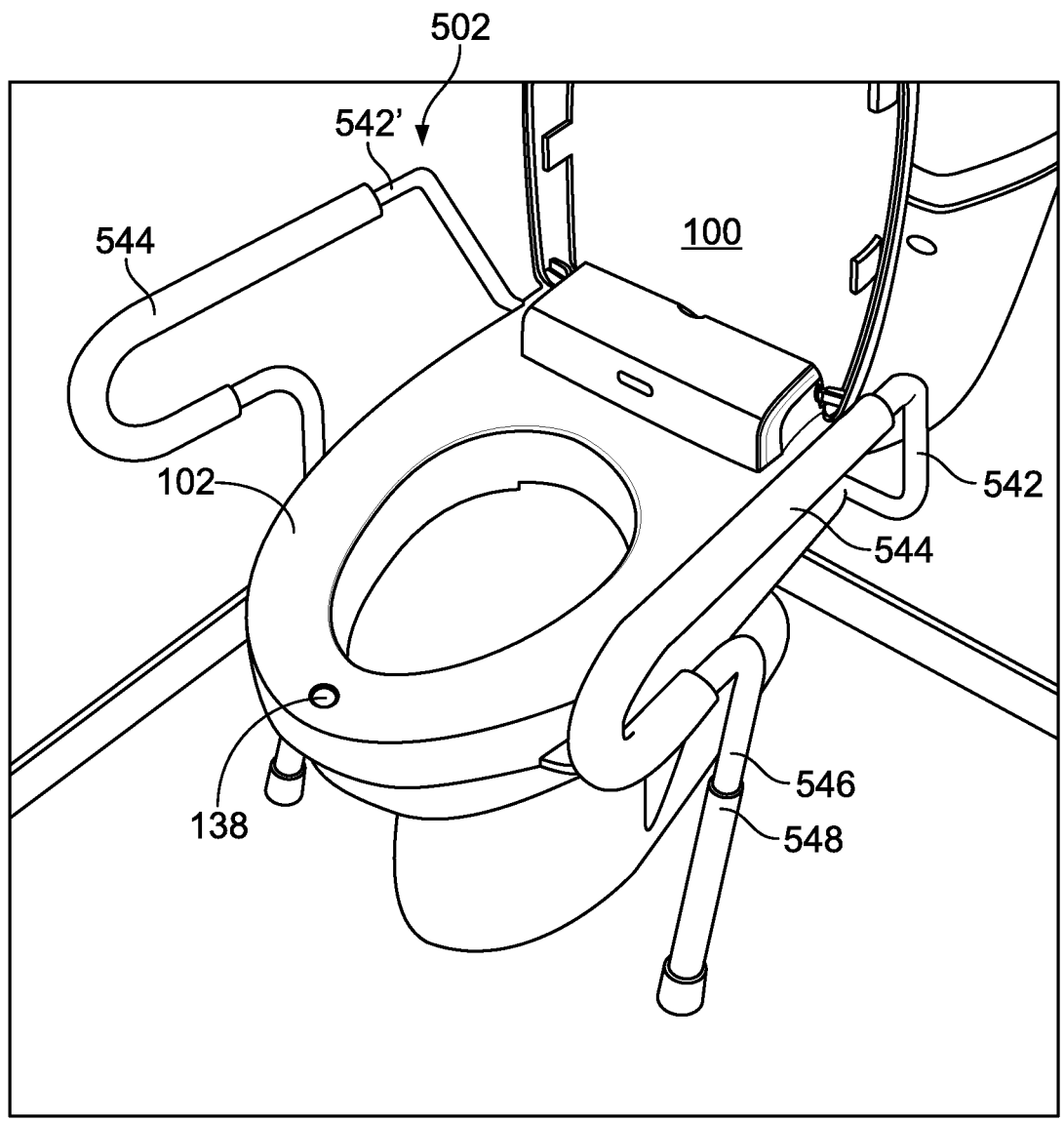
FIG. 29 is a perspective view of the toilet seat assembly including the grab bars, the grab bars having an adjustable second end depending on the height of the toilet seat assembly.

Referring now to FIGS. 28 and 29, grab bar assembly 502 of the bracket assembly 500 is shown including two elongate bars 542, 542' that may be coupled to the bracket assembly 500 in the sleeve portion 528 of the base plate 506 at first ends 543 thereof. In some forms, the base plate 506 may be included in the grab bar assembly 502 such that the bracket assembly 500 is usable to secure the toilet seat assembly to an existing toilet without the base plate 506. As illustrated the elongate bars 542, 542' extend parallel to one another on the respective sides of the toilet seat assembly 100 such that an individual using the toilet seat assembly 100 can use the elongate bars 542, 542' to assist in standing up or sitting down. The elongate bars 542, 542' may include a cover 544 on a portion thereof, such as a foam of soft plastic cover, to increase comfort for the user. The first ends 543 of the elongate bars 542, 542' may include aperture (not shown) corresponding with the apertures 534 of the sleeve portion 528 of the base plate 506 such that a threaded fastener may be advanced therethrough to secure the grab bar assembly 502 to the bracket assembly 500. In other embodiments, the elongate bars 542, 542' may include biasing pins that the user may press inwards for insertion into the sleeve portion 528, slide the first end of the elongate bars 542, 542' into the sleeve portion 528, and the biasing pins may bias up, via known means, upon reaching one of the apertures 534 to lock the grab bar assembly 502 into place. A second end 546 of the elongate bars 542, 542' extends downwards towards the ground near the toilet seat assembly 100 as shown in FIG. 29. In a similar manner, the second end 546 of the elongate bars 542, 542' may include an adjustment feature such that the grab bar assembly 502 may be installed on existing toilets of varying heights. Such an adjustment feature could include a telescoping sleeve 548 surrounding the second end 546 of the elongate grab bars 542, 542' and configured to lock in place at predetermined points such that the grab bar assembly 502 contacts the ground to provide a sturdy and secure hold.

Figure 30:
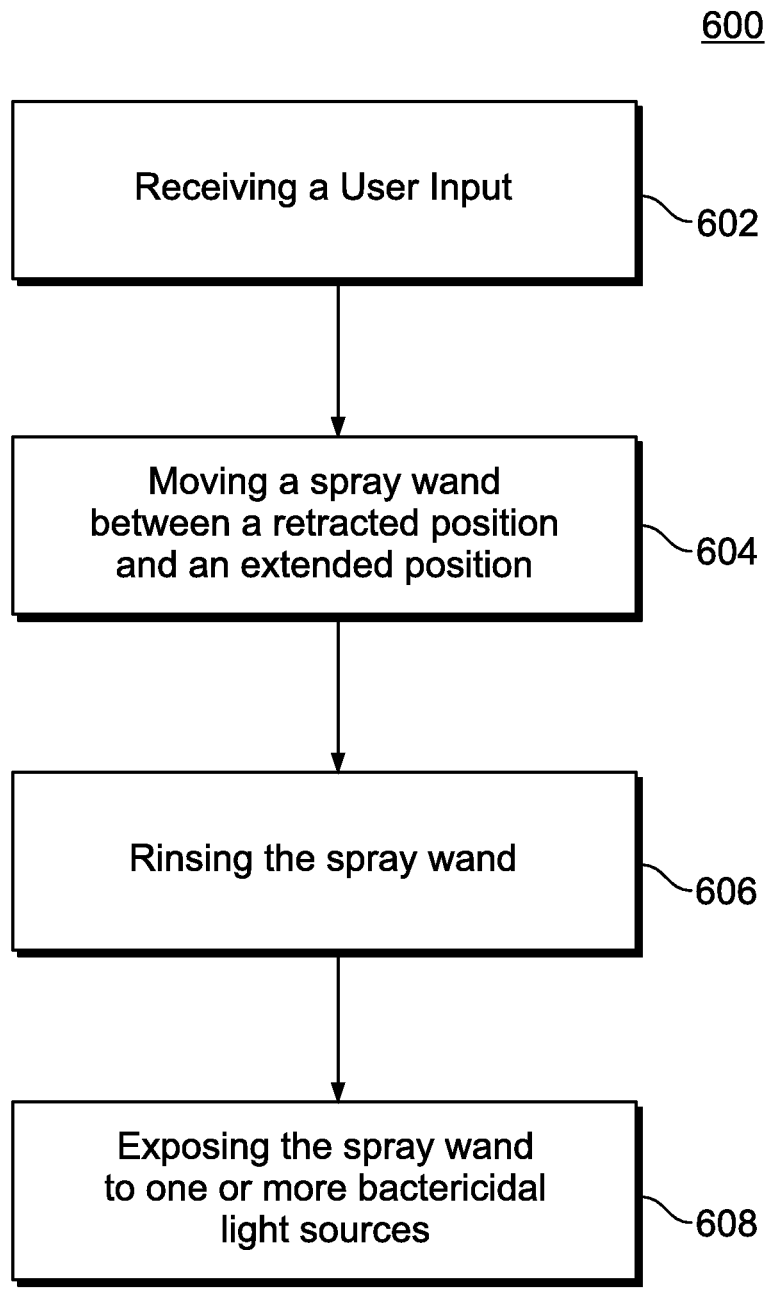
FIG. 30 is a schematic diagram of a method for disinfecting a spray wand after a cleaning operation of the toilet seat assembly.

A schematic diagram of an example method 600 of disinfecting a spray wand 202 of a toilet seat assembly 100 is provided in FIG. 30. The disclosed method includes step 602 of receiving a user input. The user input may be received, for example, by the user interface 154 of the controller 150 associated with the toilet seat assembly 100 or may alternatively be received by the auxiliary user interface 138. Upon receiving the user input, in step 604, the control unit 124 of the toilet seat assembly is configured to move the spray wand 202 of the washing apparatus 200 between the retracted position and the extended position to deliver water and/or cleanser to the perineal region of the user. In step 606, once the spray wand 202 has returned to the retracted position, the exterior surface 210 of the spray wand 202 may be rinsed with water from, for example, the water reservoir 204 positioned in the seat base 102. Additionally, in step 608, the spray wand 202 is exposed to one or more bactericidal light sources 276 to promote disinfection thereof. In some forms, the bactericidal light sources 276 are UV light sources selected for their bactericidal properties. In some embodiments, the method 600 of disinfecting the spray wand 202 further includes the step of delivering air, via the drying apparatus 300 of the toilet seat assembly 100, to dry the perineal region of a user.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The disclosure is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the disclosure and does not pose a limitation on the scope of the disclosure. Any statement herein as to the nature or benefits of the disclosed device or of the preferred embodiments is not intended to be limiting. This invention includes all modifications and equivalents of the subject matter recited herein as permitted by applicable law. Moreover, any combination of the above-described elements in all possible variations thereof is encompassed by the disclosure unless otherwise indicated herein or otherwise clearly contradicted by context. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. An apparatus comprising:
    a reservoir including:
        a housing configured to contain a liquid therein;
        an inlet;
        an outlet; and
        a heating member configured to adjust a temperature of the liquid;
    a pump;
    a sensor configured to detect a presence of a user; and
    a control unit including a processor and communication circuitry, the communication circuitry communicatively coupled to the sensor and the pump;
    wherein the processor is configured to adjust operation of the heating member to adjust the temperature of the liquid in the housing upon the sensor detecting the presence of the user; and
    wherein the processor is further configured to cause the pump to recirculate the liquid within the housing upon the sensor detecting the presence of the user.

2. The apparatus of claim 1, further comprising a spray wand having a nozzle, the spray wand fluidically coupled to the outlet of the reservoir and configured to deliver the liquid through the nozzle thereof.

3. The apparatus of claim 1, wherein the sensor is an infrared sensor.

4. The apparatus of claim 1, wherein the heating member is an immersion heater.

5. The apparatus of claim 2, wherein the reservoir further includes a temperature sensor configured to detect a temperature of the liquid contained in the housing.

6. The apparatus of claim 5, wherein the temperature sensor includes one or more copper probes positioned proximate the heating member.

7. The apparatus of claim 5, wherein the processor is configured to adjust operation of the heating member upon the temperature sensor detecting that the liquid in the housing is below about 2° C. of a set temperature.

8. The apparatus of claim 5, wherein the processor is configured to inhibit operation of the spray wand upon the temperature sensor detecting that the liquid in the housing is above a set temperature.

9. The apparatus of claim 1, wherein the liquid comprises one or more of water and a cleanser.

10. The apparatus of claim 1, wherein the reservoir further includes a level sensor configured to detect an amount of the liquid in the housing, the level sensor communicatively coupled to the communication circuitry of the control unit; and
    wherein the processor is further configured cause the ingress of additional liquid into the housing via the inlet based at least in part on the detected amount of the liquid in the housing.

11. The apparatus of claim 10, wherein the level sensor includes a float switch.

12. A method of operating a liquid reservoir system, the method comprising:
    detecting, via a sensor, a presence of a user;
    adjusting a temperature of a liquid within a reservoir using a heating member positioned therein upon the sensor detecting the presence of the user; and
    recirculating the liquid within the reservoir via a pump upon the sensor detecting the presence of the user.

13. The method of claim 12 wherein the sensor is an infrared sensor.

14. The method of claim 12, further comprising spraying the liquid via a spray wand, the spray wand fluidically coupled to an outlet of the reservoir.

15. The method of claim 12, further comprising:
    detecting the temperature of the liquid within the reservoir via a temperature sensor; and
    draining at least a portion of the reservoir upon the detected temperature exceeding a predetermined threshold.

16. The method of claim 12, further comprising:
    detecting, via a level sensor, an amount of liquid within the reservoir; and
    refilling the liquid within the reservoir when the detected amount of liquid falls below a predetermined threshold.

* * * * *